United States Patent [19]
Phillips et al.

[11] Patent Number: 6,072,994
[45] Date of Patent: *Jun. 6, 2000

[54] DIGITALLY PROGRAMMABLE MULTIFUNCTION RADIO SYSTEM ARCHITECTURE

[75] Inventors: William C. Phillips, Ellicott City; Charles L. Hilterbrick, Aldelphi; Ronald W. Minarik, Lutherville; Kenneth M. Schmidt, Ellicott City; Michael V. Pascale, Millersville, all of Md.; Robert S. Prill, Allenwood, N.J.

[73] Assignee: Northrop Grumman Corporation, Los Angeles, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/522,050

[22] Filed: Aug. 31, 1995

[51] Int. Cl.$^7$ ...................................................... H04B 1/40
[52] U.S. Cl. .......................... 455/84; 455/129; 455/140; 455/277.1; 455/280; 455/349; 375/219; 375/295; 375/316
[58] Field of Search .................................. 455/7, 8, 11.1, 455/73, 77, 78, 82, 83, 84, 87, 91, 349, 103–5, 129, 132, 140, 269, 277.1, 272, 561, 562; 370/310; 364/464.06; 375/219, 222, 239, 261, 262, 259, 260, 269, 279, 295, 316, 340

[56] References Cited

U.S. PATENT DOCUMENTS

| | | | |
|---|---|---|---|
| 3,130,401 | 4/1964 | Murphy . | |
| 3,332,080 | 7/1967 | Verwey . | |
| 3,495,248 | 2/1970 | Raether et al. . | |
| 3,525,979 | 8/1970 | Kunkel et al. . | |
| 3,581,073 | 5/1971 | Visher | 235/150.26 |
| 3,946,393 | 3/1976 | Dunne et al. | 343/6.8 R |
| 3,981,440 | 9/1976 | Richardson | 235/92 FQ |
| 4,097,922 | 6/1978 | Vito et al. | 364/443 |
| 4,137,531 | 1/1979 | Pell | 343/6.5 R |

(List continued on next page.)

FOREIGN PATENT DOCUMENTS

| | | |
|---|---|---|
| 0170793A2 | 5/1985 | European Pat. Off. . |
| 0399200A2 | 4/1990 | European Pat. Off. . |
| 0511511 | 11/1992 | European Pat. Off. . |
| 0511730 | 11/1992 | European Pat. Off. . |
| 0513443 | 11/1992 | European Pat. Off. . |
| 0534255 | 3/1993 | European Pat. Off. . |
| 0553862A2 | 8/1993 | European Pat. Off. . |
| 3-165634 | 7/1991 | Japan . |
| WO 9510889 | 4/1995 | WIPO . |

*Primary Examiner*—Wellington Chin
*Assistant Examiner*—Philip J. Sobutka
*Attorney, Agent, or Firm*—Terry J. Anderson; Karl J. Hoch, Jr.

[57] ABSTRACT

A system that partitions or divides the functions of a radio into channels and divides the functions of each channel into two major functions: 1) antenna interface and power amplification; and 2) hardwired mixing, modulation/demodulation and signal processing and further partitions the mixing through signal processing functions into the functions of a) programmable analog mixing and b) programmable digital modulation/demodulation and signal processing. Control and user interface functions, if needed for a particular application can also be functionally partitioned. A typical received signal pathway will encounter an antenna module, an antenna interface and power amplification module, a receiver module partitioned into an analog submodule that performs mixing and down conversion to produce a common intermediate frequency signal and a digital submodule that further down converts the intermediate frequency signal, demodulates the signal and performs the other signal processing necessary to provide a useful information signal. A typical transmitter pathway includes a transmitter module partitioned into a digital submodule that performs signal processing and modulation and an analog submodule that performs upconversion and mixing, followed by a power amplification and interface module and an antenna module. Control and user interface modules can also be provided along with modules that perform additional processing and information security functions.

28 Claims, 41 Drawing Sheets

U.S. PATENT DOCUMENTS

| | | | |
|---|---|---|---|
| 4,215,346 | 7/1980 | Smith, 2nd. | 343/113 R |
| 4,435,711 | 3/1984 | Ho et al. | 343/389 |
| 4,525,865 | 7/1985 | Mears | 455/186 |
| 4,533,917 | 8/1985 | Reed | 343/379 |
| 4,658,359 | 4/1987 | Palatucci et al. | 364/424.06 |
| 4,694,484 | 9/1987 | Atkinson et al. | 455/561 |
| 4,843,399 | 6/1989 | Bongiorno et al. | 343/404 |
| 4,984,295 | 1/1991 | Engstrom et al. | 455/186 |
| 5,019,910 | 5/1991 | Filmer | 358/188 |
| 5,052,049 | 9/1991 | Andros et al. | 455/186 |
| 5,117,422 | 5/1992 | Hauptshein et al. | 370/310 X |
| 5,144,314 | 9/1992 | Malmberg et al. | 342/44 |
| 5,165,055 | 11/1992 | Metsler | 333/12 |
| 5,220,557 | 6/1993 | Kelley | 455/103 X |
| 5,317,316 | 5/1994 | Sturm et al. | 342/30 |
| 5,323,332 | 6/1994 | Smith et al. | 364/571.01 |
| 5,334,982 | 8/1994 | Owen | 342/36 |
| 5,390,360 | 2/1995 | Scop et al. | 340/285.54 X |
| 5,471,509 | 11/1995 | Wood et al. | 375/350 |
| 5,488,356 | 1/1996 | Martinovich et al. | 340/825.22 |
| 5,533,072 | 7/1996 | Georgiou et al. | 375/371 |
| 5,584,051 | 12/1996 | Göken | 455/68 |
| 5,590,404 | 12/1996 | Sato et al. | 455/561 |
| 5,604,927 | 2/1997 | Moore | 455/266 |

DIGITALLY PROGRAMMABLE MULTIFUNCTION RADIO SYSTEM ARCHITECTURE

CROSS REFERENCE TO RELATED APPLICATIONS

This application is related to currently filed U.S. Applications entitled Common Transmit Module For A Programmable Digital Radio, having U.S. Ser. No. 08/522,058; and Common Receive Module For A Digital Programmable Radio System, having U.S. Ser. No. 08/528,206, both incorporated by reference herein.

BACKGROUND OF THE INVENTION

1. Field of the Invention

The present invention is directed to a radio that can include a receiver and possibly a transmitter and that can be digitally reconfigured to operate over a broad radio band and with different signal formats, and, more particularly, to an architecture of a system that provides dynamically programmable and configurable channels with major portions of digital and analog channel components combined at the signal frequency translation and waveform processing stages to simplify reconfiguration flexibility and to be scalable to many different types of integrated radio system applications.

2. Description of the Related Art

At one extreme conventional communication, navigation and identification (CNI) multi-radio suites are comprised of an independent and different type radio channel for each radio functional thread. At the other extreme, integrated programmable radio systems cross-couple various elements of multiple channels, which results in a highly complex system of tightly coupled resources. Both approaches, including hybrids of the two approaches, have advantages as well as major disadvantages. For example, the independent channel systems must have complete backup systems for all critical systems, such as instrument landing systems. This is very costly. The cross-coupled systems are extremely difficult to maintain because fault isolation is difficult. These cross-coupled systems are also difficult to control. Maintaining secure channel isolation is also a problem.

Many commercial and military applications require multiple communication, navigation, identification (CNI), or telemetry radio frequency (RF) functions as well as other types of RF signal functions to be performed at a single location, for example, air vehicles, ships, space platforms, ground-mobile vehicles and personnel, fixed stations, communication hubs of various types, etc. all require multiple radio functions at a single location. Thus, there is a need for a better partitioning of radio system elements that allow the use and reuse of identical common programmable components or modules to significantly reduce the cost and eliminate other disadvantages of prior art implementations.

SUMMARY OF THE INVENTION

It is an object of the present invention to provide a programmable multifunction radio with an architecture that allows maximum flexibility at minimum cost.

It is another object of the present invention to provide a radio that can be quickly reconfigured for many different types of radio functions.

It is an additional object of the present invention to provide a radio which will operate over a frequency range of approximately 2 MHZ to 2000 MHZ.

It is also an object of the present invention to provide a system that can operate in frequency ranges outside of the preferred range using simple block frequency converters in interface units.

It is a further object of the present invention to provide common identical modules that can be easily reconfigured allowing reduction in the number of spares or backup modules required for a given level of system availability.

It is still another object of the present invention to provide a receive radio channel that is assigned to and programmed for a basic functional thread for a particular radio function from a wide variety of radio functions; and where the receive radio channel can be quickly (i.e., dynamically) reprogrammed for different radio functions.

It is an object of the present invention to provide a receive radio channel from RF input to a digital (usually serial) bit stream output that is normally comprised of an RF interface unit, usually an antenna interface unit, that contains hardware that is specific to one or relatively few radio functions, and a common receive module that can be programmed for many different types of radio functions, and where most of the radio channel functionality is contained in the common receive module; and where the receive radio channel can also be comprised of channelized message processing (CMP) modules, information security (INFOSEC) modules and/or applique processing modules as defined below.

It is a further object of the present invention to provide the definition of a programmable (i.e., common) receive module that accepts different types of radio signals over a very wide radio frequency range (e.g., the approximate 2 MHZ to 2000 MHZ frequency range), performs the necessary frequency translation, analog-to-digital conversion and digital processing, including demodulation of waveforms of various combinations of amplitude, frequency and phase modulation, and outputs a digital bit stream of information that is usually serial and of relatively low speed in order to simplify physical interconnections and reduce the complexity of physical interconnections among system modules.

It is also an object of the present invention to provide the definition of a common receive module having analog circuitry (e.g., frequency translation circuitry) and high speed digital circuitry in the same small unit such that the relatively noisy digital circuits do not corrupt the sensitive analog circuits.

It is an additional object of the present invention to provide the definition of an integrated radio architecture with suitable isolation such that the relatively noisy digital circuits do not corrupt the sensitive analog circuits.

It is another object of the present invention to provide a radio architecture where a common receive module can be switched among different interface units (usually antenna interface units) each dedicated to one or relatively few radio functions in order to provide receive radio channels for many different radio functions.

It is a further object of the present invention to provide a transmit radio channel that is assigned to and programmed for a basic functional thread for a particular radio function; where the transmit radio channel can be dynamically reprogrammed for different radio functions.

It is an object of the present invention to provide a transmit radio channel from a digital (usually serial) bit stream input to RF output that is normally comprised of a common transmit module that can be programmed for many different types of radio functions and an interface unit, usually an antenna interface unit, that contains hardware that is specific to one or relatively few radio functions, and where most of the radio channel functionality is contained in the common transmit module; where the transmit radio channel can also be comprised of channelized message processing (CMP) modules, information security (INFOSEC) modules and/or applique processing modules as defined below.

It is a further object of the present invention to provide the definition of a programmable (i.e., common) transmit module that accepts a digital (usually relatively low speed serial) bit stream of information, performs the necessary digital processing including carrier modulation of various combinations of amplitude, frequency and phase modulation waveforms, digital-to-analog conversion and frequency translation, and transmits different types of radio signals over a very wide radio frequency range (e.g., the approximate 2 MHZ to 2000 MHZ frequency range).

It is another object of the present invention to provide the definition of a programmable transmit module having analog circuitry (e.g., frequency translation circuitry) and high speed digital circuitry in the same small unit such that the relatively noisy digital circuits do not corrupt the sensitive analog circuits.

It is also an object of the present invention to provide a radio architecture where a common transmit module can be switched among different interface units (e.g., usually antenna interface units) each usually dedicated to one or relatively few radio functions in order to provide transmit radio channels for many different radio functions.

It is an object of the present invention to provide the definition of a programmable transmit module having analog circuitry (e.g., frequency translation circuitry) and high speed digital circuitry in the same small unit such that the relatively noisy digital circuits do not corrupt the sensitive analog circuits.

It is also an object of the present invention to provide the definition of external analog, signal and power interfaces to antenna interface units such that the relatively noisy digital circuits in the rest of the system do not corrupt the sensitive analog circuits in the antenna interface unit.

It is an object of the present invention to provide a control interface to a antenna interface unit such that any noisy digital signals associated with the control such as high-speed clocks for data synchronization is turned off during RF signal reception and transmission.

It is still another object of the present invention to optimally divide or partition the functions of a radio to reduce the size and cost of the modules.

It is also an object of the present invention to provide a radio system in which the modules can be easily replaced.

It is an object to provide a system in which the channels can be dynamically reprogrammed.

It is a still further object of the present invention to provide a programmable radio architecture whereby programmable receive and transmit modules can be quickly reprogrammed for different radio functions.

It is an object of the present invention to provide a programmable radio architecture whereby programmable receive and transmit modules can be quickly reprogrammed from internally stored application programs.

It is a still further object of the present invention to provide a programmable radio architecture whereby programmable receive and transmit modules can be quickly reprogrammed by downloading from externally stored application programs via a suitable bus.

It is an object of the present invention to provide a radio architecture where certain types of reconfiguration or control of channel resources including the associated antenna interface unit module and common receive or transmit module (frequency channel select, antenna select, BIT initiation, etc.) can take place by downloading from external memory or can be manually loaded (e.g., from a keyboard or display menu) via a suitable system bus the parameter data necessary to perform the limited reconfiguration or control.

It is a further object of the present invention to provide a universal backup receiver module and a universal backup transmit module capable of performing many of the functions within the radio frequency band of interest.

It is an object of the present invention to provide modules that can be programmed for future waveforms.

It is another object of the present invention to provide modules in which hardware and software upgrades can be made at the module level rather than impacting the hardware of two or more modules or the whole system.

It is also an object of the present invention to provide modules that can be easily specified for an open architecture.

It is another object of the present invention to provide a system in which there are fewer programmable module types than prior art programmable systems.

It is an object of the present invention to provide modules that are arranged in such a way (i.e., a dedicated hardware channel per radio function(s) in use) that permits a simple radio control architecture compared to prior art programmable systems.

It is an object of the present invention to provide a radio architecture where channelized message processing (CMP) modules associated with the common receive and transmit module channels can, if needed, perform additional message processing on the digital (usually relatively low speed serial) bit stream signal connections to the common receive and transmit module.

It is also an additional object of the present invention to provide a radio architecture where information security (INFOSEC) modules, sometimes combined in the same module with channelized message processing, can be inserted in receive and transmit channels to perform information security and simplify security isolation in integrated programmable radio systems.

It is a further object of the present invention to provide a radio architecture where information security (INFOSEC) modules, can be combined in the same module with channelized message processing.

It is an object of the present invention to provide a radio architecture where applique modules associated with the common receive and transmit modules can, if needed, be added in modular fashion to perform additional high speed signal processing beyond the capability of the common receive and transmit modules.

It is also an object of the present invention to provide a controller to manage the multiple module assets of an integrated radio system, and to provide an interface with other equipments.

It is also an additional object of the present invention to provide a control architecture where the highest speed processing is self-contained within the separate programmable common receive or transmit modules, and, if employed the separate CMP, INFOSEC and applique modules.

It is an object of the present invention to provide a simplified control architecture where control of the RF processing resources in a radio channel, including the common receive or transmit module in the channel and the antenna interface unit module associated with the channel comes from the programmable common receive or transmit modules in the radio channel.

It is a further object of the present invention to provide a programmable radio architecture where spare receive or transmit channels can be dynamically programmed to replace failed receive or transmit channels.

It is an additional object of the present invention to provide a programmable radio architecture where receive or transmit channels already assigned to a radio function or functions can be dynamically programmed to replace failed receive or transmit channels of a higher priority.

It is an object of the present invention to provide a programmable radio architecture where receive or transmit channels, the modules associated with the channels, and modules or other functionality of the overall radio architecture such as the radio controller or module interconnections can be easily monitored for faults and in the event of such faults the system can be automatically reconfigured to correct the fault by reprogramming spare or lower priority modules, assigning nonprogrammable spare modules, or assigning spare interconnections.

It is another object of the present invention to provide programmable common receive and transmit modules with programmable external interfaces that can be used for a variety of interface applications, including for both control functions and for signal flow, where such interfaces may be serial or parallel, synchronous or asynchronous, unidirectional or bidirectional, to include both standard or custom protocols; where such external interfaces may utilize transceivers, receivers or transmitters (i.e., drivers) for differential (i.e., dual rail) connectivity in order to reduce noise pickup.

It is an additional object of the present invention to provide an architecture where the CMP modules, INFOSEC modules and applique modules can be easily inserted into the modular architecture, regardless whether such modules are programmable for different CMP, INFOSEC and applique functions or whether such modules incorporate off-the-shelf hardware specific to one or several of these functions.

It is an object of the present invention to provide a radio architecture where applique modules associated with the common receive and transmit modules can, if needed, perform additional high speed signal processing beyond the capability of the common receive and transmit modules.

It is another object of the present invention to provide modules arranged so that simplified BIT/FIT is possible.

It is also an object of the present invention to provide modules that are arranged in a way that permits relatively easy maintenance and checkout.

It is a further object of the present invention to provide a system in which the modules have simplified external interfaces.

It is an object of the present invention to provide the modules that permit simplified interfaces between modules.

It is an object of the present invention to provide a radio architecture with flexible interconnections between the various system units and external equipments that can be used for a variety of interface applications, where such interfaces may be serial or parallel, synchronous or asynchronous, unidirectional or bidirectional, to include both standard or custom protocols; where such interfaces include, for example: message busses and control/data busses that are used to pass raw data information and control signals between the programmable common receive or transmit modules (or, if used, channelized message processing modules, INFOSEC modules and/or applique modules), the system controller and various external equipments; an antenna interface unit (AIU) control bus between the programmable common receive module and the AIU to control the receive assets in the AIU associated with the same channel as the programmable receive module; a transmit bus plus various discretes to control the transmit assets in the AIU associated with the same channel as the programmable transmit module; a transpond bus between associated receive and transmit modules for transponder or repeater applications, or to share processing hardware; an applique bus to an associated applique module to perform additional signal processing beyond the capability of the digital processing portions of the receive or transmit modules; and busses to other external elements or modules as provided by the flexible programmable interfaces of the programmable receive, transmit, channelized message processing, or INFOSEC module.

It is also an object of the present invention to provide the modules arranged to make changes in system capacity for different applications easy by adding or deleting modules.

It is another object of the present invention to provide modules arranged in a way that simplifies the certification process for a new radio function.

It is a still further object of the present invention to provide modules that permit less analog (i.e., RF, IF or video) switching between modules.

The above objects can be accomplished by a radio system architecture that partitions or divides the functions of a radio into channels and divides the functions of each channel into two major functions: 1) antenna interface dedicated to certain radio functions, and 2) mixing, (i.e., frequency translation or conversion) and signal processing to/from a digital bit stream that can be programmed for many different types of radio functions, and may further partition the mixing through signal processing functions into the functions of: a) programmable analog mixing and b) programmable digital signal processing. Control and user interface functions needed for a particular application are also functionally partitioned. A typical received RF signal pathway will encounter an antenna, an antenna interface module that contains several receiver front end elements dedicated to certain radio functions and a receiver module that can be programmed for many different radio functions. The receiver module may be further partitioned into an analog submodule that performs frequency translation to produce analog common intermediate frequency signals and a digital submodule that converts the analog intermediate frequency signals into a digital signal, further frequency translates the intermediate frequency signal, demodulates the signal and performs the other signal processing necessary to provide a useful relatively low speed digital information signal version of the information signal of the received RF signal. A typical transmitter pathway includes a transmit module partitioned into a digital submodule that performs digital signal processing and modulation of a relatively low speed digital information signal to be transmitted into a common intermediate frequency signal which is converted into an analog intermediate frequency signal, and an analog submodule that performs analog frequency translation, followed by a power amplification and interface module that contains several transmit elements dedicated to one or more specific radio functions and an antenna. Digital control and user interface modules can also be provided along with modules that perform additional channelized message processing functions, modules that perform information security functions on the low speed digital information signal, or in rare cases, which perform higher-speed signal processing directly on the radio waveform. Various combinations and quantities of the above modules can be used to satisfy many different types of multifunction radio applications.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
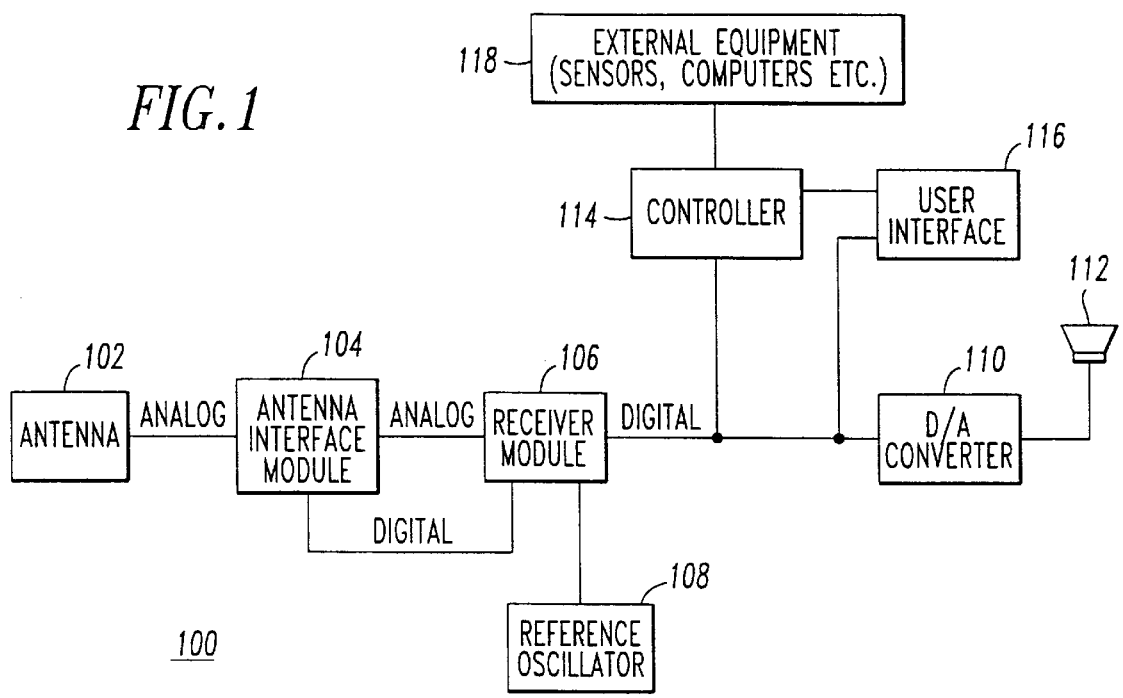
FIG. 1 illustrates the components of a simple receiver system 100 according to the present invention.

Although the discussion of the present invention usually refers to CNI radio functions and applications, the programmable nature of the invention enables the invention to be applied to RF signals modulated with any combination of amplitude, phase and/or frequency modulation that can be programmed by the programmable RF channel modules (i.e., the common receive module and the common transmit module) discussed later. Such RF signals not only include CNI radio functions but, for example, radio signals associated with radar, electronic warfare (for example electronic surveillance, electronic countermeasures, electronic intelligence), telemetry or positioning. Furthermore, the ability of the RF interface unit (usually referred to as the antenna interface unit also described later) to perform frequency conversion permits the programmable RF channel modules to service electromagnetic wave signals of potentially any frequency.

A radio channel is a single physical path for transmitting electrical signals from a single source (e.g., a microphone input to a distant transmitter) to a single destination (e.g., a speaker output from a local receiver). A receive radio channel includes all the hardware and software required to accept the incoming RF signal and convert it to a form suitable for human or equipment interface. A transmit radio channel is the converse of the receive channel and sometimes a receiver and transmitter operating on the same frequency are together referred to as a "channel". At some point in the receive channel the signal is reduced (i.e., demodulated and perhaps decoded, decrypted, etc.) to the basic information that is to be received (analog or digitized voice or data).

An end-to-end (i.e., distant transmitter to local receiver) channel contains only a single radio channel at any given time, although a large portion, but not the entire portion, of the hardware in an end-to-end channel can service multiple channels at the same time. An example of the latter is where a distant transmitter takes a single carrier and, with different portions of a hardware channel, frequency multiplexes multiple frequency channels, each with a different source, so that all pass through the rest of the transmitter's bandwidth, through antennas, through space to receive antennas, through most of the receiver until finally different hardware portions demultiplex the separate channels onto separate lines for different human or equipment end users. The transmitter's frequency multiplexing, for example, either separates the different channels into different frequency bands that are usually contiguous, or the multiplexing is "direct sequence" where all the channels overlap the same frequency region with orthogonal codes. In this way all the channels can be simultaneous, but either way, separate hardware is eventually needed to multiplex and demultiplex each channel. Even if all the multiple multaneous channels are buffered and operated on one at a time with the same hardware a different hardware buffer would be needed for each channel. Thus, each end-to-end hardware channel contains only one source and one destination.

The one-to-one relationship of a single end-to-end hardware link versus a single channel is more complicated when time multiplexing (TMUX) is included. All the same end-to-end hardware for multiple channels could be used if non-simultaneous channels are allowed, such as when each channel has a separate time slot on the same "line," which includes the airwaves. For TMUX systems separate hardware for multiple channels is not needed. For example, a single radio could be used and tuned to different channels, one at a time. But no matter how it is done, separate hardware is still needed, or at least an allocated portion of hardware, to access a different channel. For example, even a single coil that is tuned to different frequencies needs a "longer" tuning rod for more channels. Similarly, a digital radio that is programmed for different channels at different times needs a portion of circuitry allocated to the different parameters and characteristics of each channel such as operating frequency. Of course, if more than one channel is needed simultaneously, separate speakers, etc. would be needed. Thus, regardless of the implementation, it appears a separate end-to-end hardware channel is needed for each source-to-destination link.

Previously it was noted that a large portion of an end-to-end hardware channel plus minimal additional hardware (e.g., buffers, correlators, demodulators) can service multiple channels at the same time. In the case of the present invention where one of the "hardware channels" comprised of a single common receive or transmit module can service multiple channels provided the channels fit within the designed bandwidth. This is accomplished by configuring small but different portions of digital circuitry in a transmit or receive module to multiplex or demultiplex information for different channels. For example, multiple contiguous frequency channels (i.e., slots), as well as multiple direct-sequence coded channels, can be received and demodulated provided the total bandwidth of multiple channels fits within receive module's bandwidth.

A receive (or transmit) radio channel is defined as one in which one or more modules in the channel are connected in series and are dedicated or programmed to pass a particular type of signal or information. A hardwired module (or simply "module") is defined as one in which all the elements are dedicated to passing a particular signal or type of information, and for which none of the elements are ever used (e.g., switched) in series with elements in another channel to process a particular signal or flow of information.

An example of two separate channels each comprised of a single module is two separate AM/FM table radios, which can be of the same type or of different types. Each radio can be tuned to receive any number of radio channels (i.e., radio stations), one at a time. However, during normal operation none of the circuitry in one radio is used in conjunction with some of the circuitry in the other radio. Each radio consists of a "hardwired" module, that is, all circuit elements are contained in a box and none of these elements are routinely used in conjunction with the elements in another box. Note that circuit elements can be switched inside the box for different radio frequency channels or for different radio waveforms like AM versus FM. But, as noted, the circuit elements are not shared between modules. These types of radios are "federated".

The benefits of having everything federated in one radio box is that once the radio is built and tested, there are no additional problems uncovered when different circuits in one channel are connected to work with circuits in another channel. Everything is controlled in one box.

These AM/FM radios are programmable—not so much because they can be tuned to different channels but because they can be "programmed" for different waveforms, i.e., AM and FM, even if this "programming" only involves throwing a switch that switches between internal AM and FM circuits.

The digitally programmable radio system architecture of the present invention allows for a much wider variety of waveforms over a much wider frequency range than AM and FM radios. To do so the invention does not attempt to place all the necessary channel functionality for a wide variety of radio functions into one oversized module because the module would be extremely large and costly. This oversized module would not be size and cost effective for radio channels in system applications that needed only the functionality for a subset of radio functions, including system applications which require many multiple simultaneous radio channels of arbitrary radio functions from a wide library. Instead, the digitally programmable radio system architecture optimally partitions radio channels into antenna interface unit (AIU) modules, each of which are usually dedicated to specific radio functions and which comprise a relatively small portion of a channel's functionality, and into a receive (or transmit) module that is programmable to receive (or transmit) a wide variety of radio functions and which comprises a relatively large portion of the channel functionality for these radio functions. Furthermore, these programmable, or common, receive and transmit modules have a minimal amount of unused hardware when servicing any particular radio function. During operation, and depending upon the radio function being serviced, common receive or transmit modules are connected to different radio functionally-specific AIU modules, each of which are tailored for particular radio function(s) and for particular system applications. Multiple simultaneous receive or transmit channels are obtained by providing multiple common receive or transmit modules (although, in some cases, multiple simultaneous radio channels can be serviced by a single common receive or transmit module as explained later). Also, the common receive and transmit modules can be quickly reprogrammed, via either internal program memory or by downloading programs (including modified or new programs) from external memory.

Thus, in the architecture of the present invention an AIU plus a common receive or transmit module does not have a totally hardwired channel because common receive or transmit modules can work in series with different AIUs, and because, for redundancy, a single AIU can work with different (primary or spare) common receive or transmit modules, sometimes simultaneously for hot redundancy. The present invention has optimally partitioned a radio channel into hardwired modules to gain the benefits that such partitioning affords.

The present invention partitions the architecture so that a considerable amount of circuitry is contained in one box and never shared with circuitry in another box. This affords the benefits of having most of the common stuff in one box that can be built the same way for every communication, navigation and identification (CNI) radio function in every channel and built the same way for many different system applications. There are fewer module types for the bulk of the channel functionality for a wide variety of CNI radio functions and other types of RF signal functions compared to the prior art federated approach that uses many different types of nodules for the same number of CNI radio functions.

In contrast to federated radios, cross-channel radios share circuits among channels, i.e., some of the elements are used (e.g., switched) in series with elements in another channel to process a particular signal or information. The digitally programmable radio system architecture also has cross-channel capability type features. In the present invention the partitioning of the cross-channelization is important.

At the extreme of cross-channelization, one could partition the circuitry in a channel such that every basic element (resistors, capacitors, transistors, etc.) is separate, and put in switches between each of these elements such that any of them can be used in combination any of the other basic elements to perform a wide variety of electrical functions, some of them simultaneously. Obviously the switching networks would be horrendous and would be much larger than the elements themselves. Performance would also be poor because of electrical isolation, conflicts between resources (i.e., circuit elements) needed, difficulty in testing every combination and isolating faults in the event of a failure, etc.

On the other hand, the "cross-channel" approach of the present invention limits the number of separate modules in a channel to an AIU plus hardwired common receive and transmit modules where the interfaces to the common receive and transmit module units is only RF and a low-speed serial bit stream. Most of the channel functionality is contained in these hardwired common receive and transmit modules. The present invention provides for additional processing on relatively low serial bit streams with additional modules (channelized message processor-CMP or information security processor—INFOSEC) that, for the most part, are hardwired in the same channel and are not shared with other channels unless reasons of redundancy (or INFOSEC control) make it appropriate to do so. The invention architecture is flexible enough to accommodate this latter type of sharing if desired.

Another way of saying that channels are partitioned is that they are optimally connected, i.e., a channel comprised of an AIU plus a receive or transmit module, each with only an RF/serial data interface for the information) that can be programmed to service a wide variety of CNI functions, and additional CMP modules that are usually connected only to the common receive or transmit modules they support unless the benefits of cross-switching the CMP modules proves beneficial from a system standpoint.

An important feature of the present invention is not only that the architecture is channelized but that the hardware is also partitioned into hardwired modules. All architectures, including federated and cross-channel, have hardware strings or "channels" that are hardwired (for the federated) or switch/allocated (for the cross-channel) to a particular CNI function. But in the case of the present invention the hardware channels are partitioned as explained later, where most of the radio functionality in a channel is contained inside one of two modules which form the heart of a hardware channel: Either a common receive module or a common transmit module.

The prior art federated architecture dedicates a single box (sometimes with the option of a remote control unit and perhaps a separate power amplifier) to one (or a few) CNI functional channels. The box contains most or all of the elements that the present invention places in separate AIUs that are dedicated to each CNI function or group of functions. But the federated channel is not programmable for a wide range of CNI functions.

None of these federated schemes utilize a relatively large block of common circuitry that services and performs a wide range of functionality (frequency conversion, analog-to-digital or digital-to-analog, modulation/demodulation, etc.) for different radio functions. Federated boxes require a considerable amount of hardware overhead to account for multiple radio functions, which makes these boxes relatively large and costly, albeit some of these federated boxes try to reduce overall size and cost for one particular application by making it possible to manually plug in different submodules to service different CNI functions or modes. But this plug-in approach precludes the availability of multiple radio functions by simply reprogramming the units. The interfaces of these submodules are not simple. Furthermore, unlike the digitally programmable radio system of the present invention, the boxes only service a limited number of communication, navigation or identification functions, but not a wide variety of all three types of functions.

A cross-channel architecture is designed to service more than one or a few CNI radio functions. Prior-art programmable cross-channel architectures consist of many different type modules, each of which contain less channel functionality than the common transmit or receive modules of the present invention. This approach requires considerable RF switching and high-speed parallel bus switching, both of which are undesirable, in order to eventually dedicate a string of modules to a particular CNI function. Because the modules at each point of the string, e.g., frequency translation, receiver preprocessing, are comprised of different module types depending on the CNI functions to which the string is programmed, there is minimal commonalty between channels. That is, each channel can be programmed for only one or a few types of CNI functions. Also, much of the digital processing is partitioned in relatively large processors that service multiple CNI functions at the same time, thus making channel isolation (e.g., for security purposes) and resource allocation/control of the entire string a virtual nightmare. Prior art cross-channel architectures are difficult to scale to different size multifunction radio applications.

On the other hand, the architecture of the present invention is channelized with partitioning of the functions of the radio into several module types, AIU and common receive module (for a receive channel) and two module types (AIU and transmit module) for a transmit channel (albeit the AIU for the receive channel is almost always combined with the AIU. for the transmit channel to form a single AIU).

The receive module is "common" in the sense that it can accept RF and be programmed, either by analog switching or digital software or both, to perform frequency translation and signal processing down to a low-speed serial bit stream in a channel that is programmed to one of a wide variety of CNI functions. Conversely, the transmit module is "common" in the sense that it can accept a low-speed serial bit stream and be programmed to perform signal modulation and frequency translation to RF for wide variety of CNI functions. It is also desirable that the common modules can be rapidly programmed for different communication, navigation and identification (CNI) functions by loading a new program.

The partitioning of the radio channels in the architecture of the present invention includes as follows: (1) all the functionally-specific hardware that drives up hardware overhead in a common receive module or a common transmit module is contained in the AIU, which, incidentally, contains relatively few functional elements compared to the rest of the channel, that is, the bulk of the radio channel processing is performed in the common modules and a small part in CNI functionally-specific AIUs; and (2) the signal path of the common receive or transmit modules requires only a single RF connection to the AIU, and only relatively low-speed, usually serial interfaces between the modules and the rest of the system. The latter (2) avoids undesirable analog switching between modules of different types, eliminates parallel high-speed busses, reduces isolation problems between channels that share the same processor, and avoids the other disadvantages of the cross-channel approach previously noted.

In the partitioned architecture of the present invention, message processing over and above what can be performed in a common receive or common transmit module can be performed in additional modules, namely channelized message processing (CMP) or information security (INFOSEC) modules, that are allocated to the same channel. But these additional modules need only operate on relatively low speed, usually serial data. In particular, adding INFOSEC modules in this manner simplifies security isolation in integrated programmable radio systems. Also, in the rare cases that may be needed for some system applications, applique modules can be connected to common receive and transmit modules via relatively short parallel busses of moderate speed to perform additional high speed signal processing beyond the capability of the common receive and transmit modules.

The present invention, by properly partitioning the various elements in each radio channel and providing appropriate signal isolation and filtering, provides a minimal size, weight and cost solution for a communication, navigation and identification (CNI) multi-function radio suite. It can be tailored in a modular fashion to many types of applications. It also affords all the advantages and essentially none of the disadvantages of the above "individual" and programmable "cross-channel" approaches previously mentioned. Moreover, the architecture uniquely scales to single-channel radio applications where the single channel can be programmed for any subgroup of CNI functions selected from a much wider library than prior art programmable radios.

See Table A for some of the possible radio function applications of the invention architecture.

TABLE A

CNI and Telemetry Radio Functions

| Communication | Identification |
|---|---|
| HF Clear Voice/Data | ATCRBS/IFF Transpond |
| HF AJ | IFF Interrogate |
| HF Link 11 | Mode S |
| VHF AM | TCAS |
| VHF AM Encrypted | |
| VHF FM | Navigation |
| VHF Encrypted | Omega Nav* |
| SINCGARS | Loran-C* |
| VHF ACARS | ILS Localizer |
| UHF Clear | ILS Glideslope |
| UHF Encrypted | ILS Marker Beacon |
| Havequick Versions | VHF Omni-Range (VOR) |
| Military UHF SATCOM | PLRS/EPLRS |
| Airphone | Tactical Air Nav System |
| (TACAN) | |
| JTIDS | Distance Measuring |
| Equipment (DME) | |
| Commercial SATCOM | Precision DME |
| RAM Mobile Data | Global Positioning System |
| Cellular | GLONASS (Soviet GPS) |
| Citizens Band | Radar Altimeter* |
| PCS | Microwave Landing System |
| (MLS)* | |
| Commercial TV | |
| VHF Data Radio (VDR) | |
| Industrial, Medical and Scientific (IMS)* | |
| Telemetry | |

ACMI: Air Combat Maneuvering Instrumentation

*Indicates that a block converter is used in the antenna interface unit to convert the radio signal to the input range of analog submodule 104. Other RF functions too numerous to mention can also be accommodated using a block converter. ACARS: Aircraft Communication Addressing and Reporting System ATCRBS: Air Traffic Control Radar Beacon System EPLRS: Enhanced Position Location Reporting System IFF: Interrogate Friend-or-Foe ILS: Instrument Landing SystemJTIDS: Joint Tactical Information Distribution System PCS: Personal communication system SINCGARS: Single-Channel Ground-to-Air Radio TCAS: Traffic Collision Avoidance System The architecture's optimal partitioning of channels allows easy fault isolation, module replacement and module backup as well as allowing security isolation to be easier to provide. The architecture also utilizes a special partitioning of radio elements of a channel in integrated CNI radio system applications, along with guidelines for bus interconnections between the elements, that makes practical the use of identical programmable common-module channels with minimal hardware overhead. Each channel is partitioned functionally by dividing signal capture or radiation, receive signal preconditioning and/or transmit power amplification, radiation, frequency conversion, modulation/demodulation, additional signal processing, security processing and special message processing into different modules.

Hardware that is common among many different types of CNI radio functions and many different types of multi-function radio system applications is placed inside common programmable modules. High-overhead hardware (i.e., hardware that is specific to only a single or relatively few CNI functions, or specific to a particular application, that is, non-common components) is housed separately outside the common programmable modules. So doing reduces common-module overhead to the point where the size of the common RF/IF and digital processing hardware is small enough to place in a single plug-in housing of reasonably small size. All the high-speed processing and parallel interconnects are completely contained inside the common module housings, thereby greatly reducing backplane complexity, EMI and crosstalk.

Although the goal is to make various modules as common as possible among different CNI radio functions and different integrated CNI radio system applications, it may be beneficial to "tailor" a common module such that it is common among different CNI functions in a particular system application but the module is functionally different among applications. An example is where receive and transmit common module circuitry to handle wideband CNI functions is not included in the receive and transmit common modules for an application that only requires narrowband CNI functions. (In this case the original common modules have been "depopulated.") Note, however, that the latter modules can still be common among different narrowband CNI functions in the same application. Another important example is where some applications require bus isolation circuitry to be contained internal to the various modules to protect the bus from module failure. Because such circuitry is relatively bulky, especially when there are many bus I/O connections, it may not be desirable to contain the isolation circuitry in modules not requiring it. Also, because modules are programmable to handle multiple CNI functions, the internal isolation circuity may not be necessary as discussed later with respect to bus interface units.

The present invention provides common modules (receive and/or transmit) that are programmable to operate over a range of approximately 2 MHZ to 2 GHz.

If the disclosed architectural partitioning is not employed, the programmable common modules would carry excessive size and cost overhead, and such overhead would preclude their utility in practical applications.

Within this description the major radio elements that are partitioned are indicated as modules or submodules. Elements enclosed by dotted or dashed lines are not necessarily required for all applications. The indicated modular partitioning (with the minor exception discussed later) eliminates the need for relatively high speed (greater than several MHZ) parallel bus interconnections between modules. The partitioning also characterizes an open architecture of a particular type, where the interface requirements of each module are defined such that modules can be developed, upgraded and procured from competitive suppliers. Module and bus configurations for various type example applications are discussed later herein.

A channelized receiver system 100 which is programmably dedicated to a single channel, according to the present invention, is illustrated in FIG. 1. The system includes an antenna 102 that can be as simple as an MM antenna or as complex as a multifunction (or multielement) antenna such as one that services some or all the L-band commercial or military communication navigation and identification (CNI) functions. The antenna 102 is coupled to an antenna interface unit, (AIU) module 104 that includes all the control, amplification, filtering and other receiver front-end circuitry necessary to interface with the particular antenna 102 being used, and which provides the analog output signal from the antenna 102 to a common receive module 106 in a state that permits the subsequent common receiver module to process the signal of interest commensurate with performance requirements. Depending upon the actual AIU implementation, the AIU module 104 can have a capability for performing changes in received signal level, received interference levels, transmit/receive connectivity and signal connectivity to/from various common receive or transmit modules under the control of a common receive module 106. The common receive module 106 performs the analog functions of converting the received baseband signal into an intermediate frequency signal using a reference oscillator signal from reference oscillator 108, converts the intermediate frequency analog signal into a digital signal, performs any further down-converting, demodulation and special signal processing in the digital domain and provides a digital information signal, as a low speed digital signal, preferably on the order of one megabit per second, suitable for subsequent interface to various equipment including equipment operated by a human user. For example, if the antenna signal is a navigation signal the system would output demodulated and decoded navigation signals while if the signal is an AM broadcast radio signal the output would be a digital version of the sound produced by an AM radio. The digital output of the receiver module 106, if necessary, would be converted into a useable form. In the navigation example, a positioning display may be produced. In the case of an AM radio output, a digital-to-analog converter in an audio interface 110 converts the digital signal to an analog sound signal which is converted into sound by a conventional speaker 112 or amplifier speaker system if necessary. When the receiver is a fixed frequency channel system, such as is required for a radio repeater, the programmable characteristics of the common receiver module 106 can be programmed through ROM, dip switches, jumpers, etc. albeit the common receive module is preferably software programmable via controller 114. The system 100 can include a controller 114, which can be as simple as a digital channel selector unit, such as when module 106 is used in a simple application such as changing frequencies in an AM radio, or as complicated as a workstation computer when multiple CNI programs are to be downloaded and controlled among multiple channels. The system 100 can also have a user interface 116 coupled to the controller 114 and the receiver module 106. Like the controller 114, this interface can be as simple as a digital channel selector or a complicated as a workstation computer. In the case of the AM radio the interface would include a channel selector. The controller 114 and/or receive module 106 can also be connected to other external equipment 118 examples of which will be described later. The common receive module 106 will be discussed in more detail later with respect to FIGS. 6A and 6 B.

Figure 2:
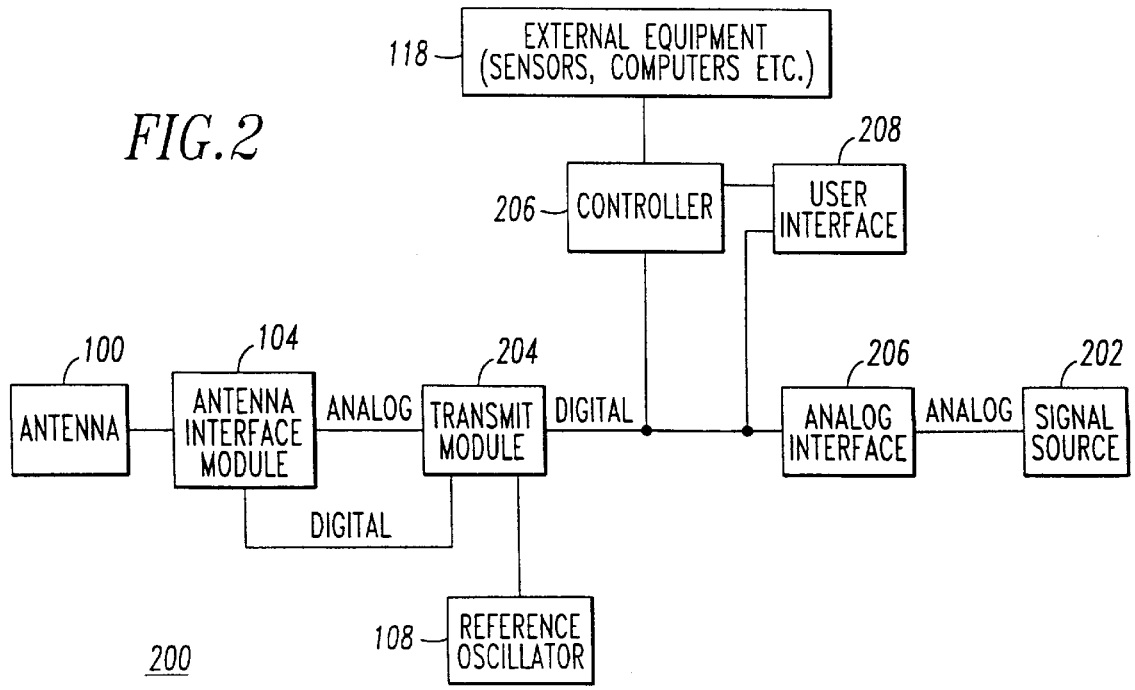
FIG. 2 illustrates the components of a simple transmitter system 200 according to the present invention.

A channelized transmitter system 200, as illustrated in FIG. 2, includes some of the same type components as the receiver system 100. A signal source 202 provides an information signal for the transmitter system to transmit. The signal can be a digital signal, such as would be received from the receiver side of a repeater, or could be an analog signal as shown in FIG. 2. If digital it can be input directly into a common transmit model 204 and, if analog, the information signal is converted by an analog-to-digital converter in the analog interface 206 into a low speed digital signal. The transmitter module 206, like the receiver module 106 can be controlled by ROM, dip switch, etc. programming in those situations where the characteristics of the channel are fixed, such as a repeater radio, or can be programmably controlled by a controller 206, which can be the same controller 114 as shown in FIG. 1, under the control of the user interface 208, which can be the same user interface 116 as is in FIG. 1, in other situations. The controller 206 as well as the other modules that appear in both FIGS. 1 and 2 can be shared between the receive and transmit sides in situations where appropriate, such as a two-way (transceiver type) radio systems found in air traffic control systems and military communications. These modules that are shared between receive and transmit paths may perform the same functions for each path, e.g., reference oscillator or channel control, or they may perform different functions. For example, the antenna interface unit module 104 may perform antenna switching and filtering for both receive and transmit paths; but the AIU may perform tunable filtering, receiver protection, automatic gain control, etc., for the receive path, but perform separate transmit filtering to remove unwanted signal emissions and perform signal power amplification to raise the power of the transmitted signal to the desired level before the RF signal is provided to the antenna 100. It is also possible to share some of the AIU functionality among different CNI functions, for example, the same power amplifier in AIU 104 can be used to transmit various radio functions in the same band such as IFF, Mode S, ATCRBS, TACAN and DME by sharing the same channel among these radio functions on either a simultaneous or time-multiplexed basis. The common transmit module 204 will be discussed in more detail later with respect to FIGS. 7A and 7B.

Figure 3:
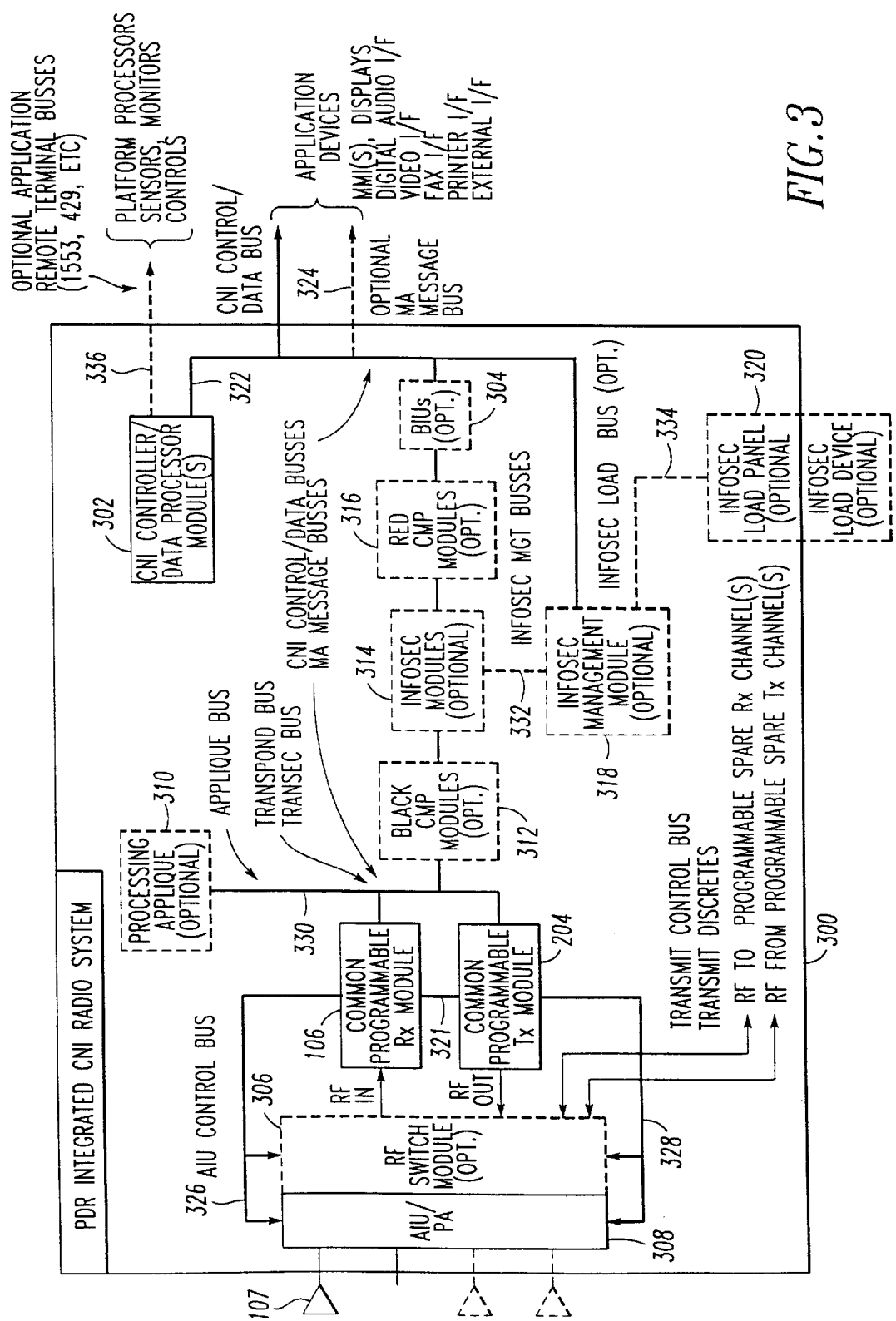
FIG. 3 illustrates a more complex transmitter and receiver system 300.

FIG. 3 illustrates a combined channelized transmitter/receiver system 300 suitable for communication, navigation and identification (CNI) applications. Only a single channel is shown but it applies to any CNI application and can be replicated to form parallel channels. In this more complex embodiment, the same programmable common transmit 204 and receive 106 modules as found in the less complex systems of FIGS. 1 and 2 are used, but have the programmable characteristics suitable for the more complex application set accordingly. In these more complex applications the controller becomes the more complex controller/data processor module 302, the simple interface is replaced by a bus system 322 that allows multiple channels to be addressed and controlled. System bus 322 can be segregated into physically separate buses as dictated by bus traffic considerations and/or formats and protocol requirements of the various system elements including external units. The bus interface unit (BIU) 304 may be employed between various system elements in systems requiring special hardware for electrical connection considerations such as isolation and line voltages, and where it is impractical to place such hardware in a common receive or transmit module. The BIU functionality could be housed in a separate module or could be contained in a backplane or wiring harness assembly that connects the various modules. In certain applications a RF switching module 306 is necessarily added to the antenna interface module 308, thus changing the particular components of the module 308. The channel can also be provided with special signal processing modules 310, a channelized message processing (CMP) module 312, information security modules 314, 318, and 320 necessary for secure communications, and, when secure channelized message processing is required, a channelized message processing module 316 on the secure side of the information security (INFOSEC) module 314. When signals requiring a very rapid response time are received, such as the pulse position demodulation and pulse position reply within one microsecond required in identify friend or foe (IFF) communications, a transpond bus 321, which can be either a serial bus or parallel bus of moderate speed, can be used to provide the input pulse position to the transmitter module 204 where the pulse position reply is produced and transmitted. This output/input between the receiver 106 transmitter 204 is in addition to the system bus 322 that is provided for configuration control, input/output of information signals, etc. Transpond bus 321 can also be used for radio repeater applications as well as to share digital processing hardware among the receive module 106 and the common transmit module 204.

Figure 4A:
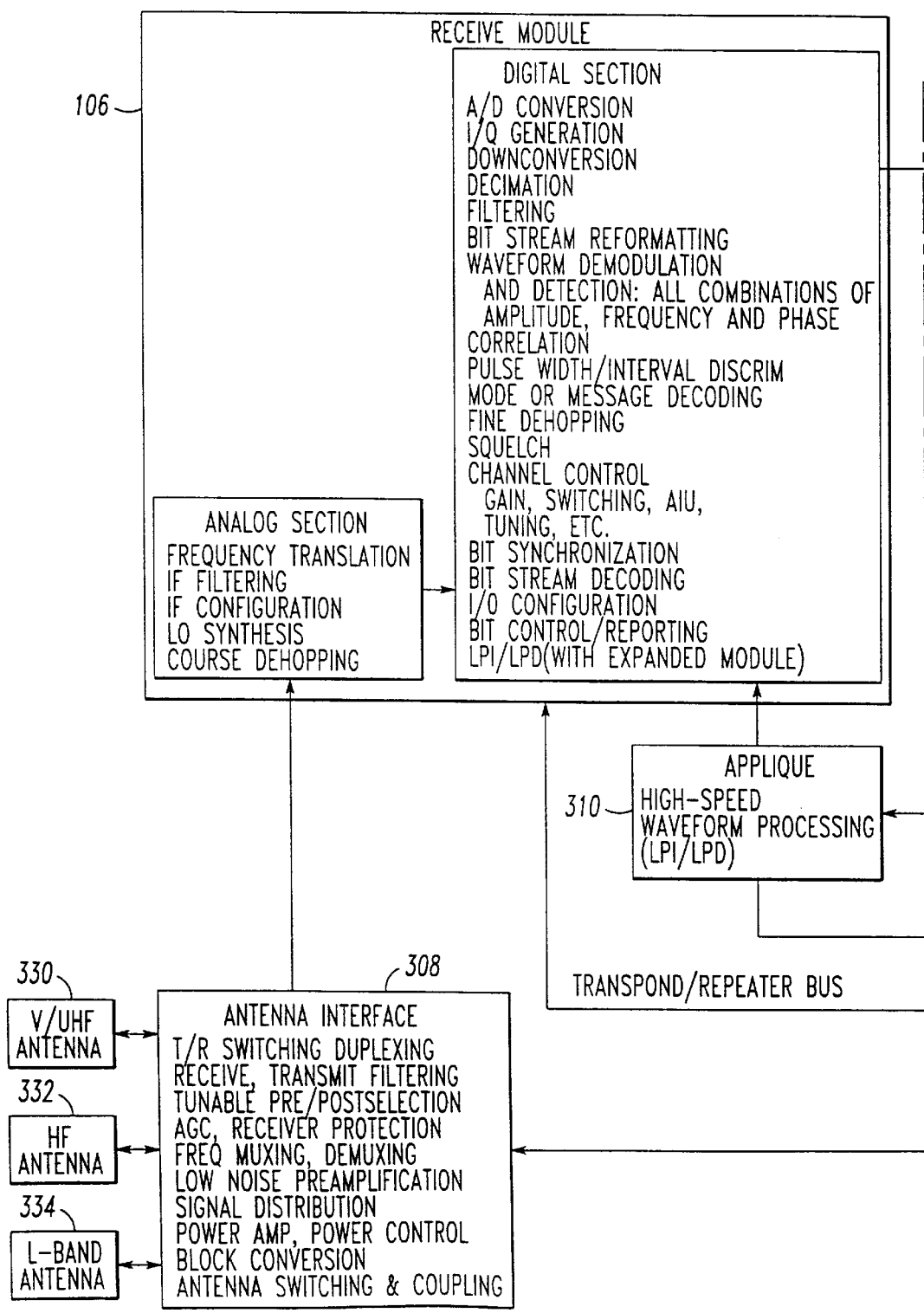
FIG. 4 illustrates the functional processing that can be performed in a system such as illustrated in FIG. 3.
Figure 4B:
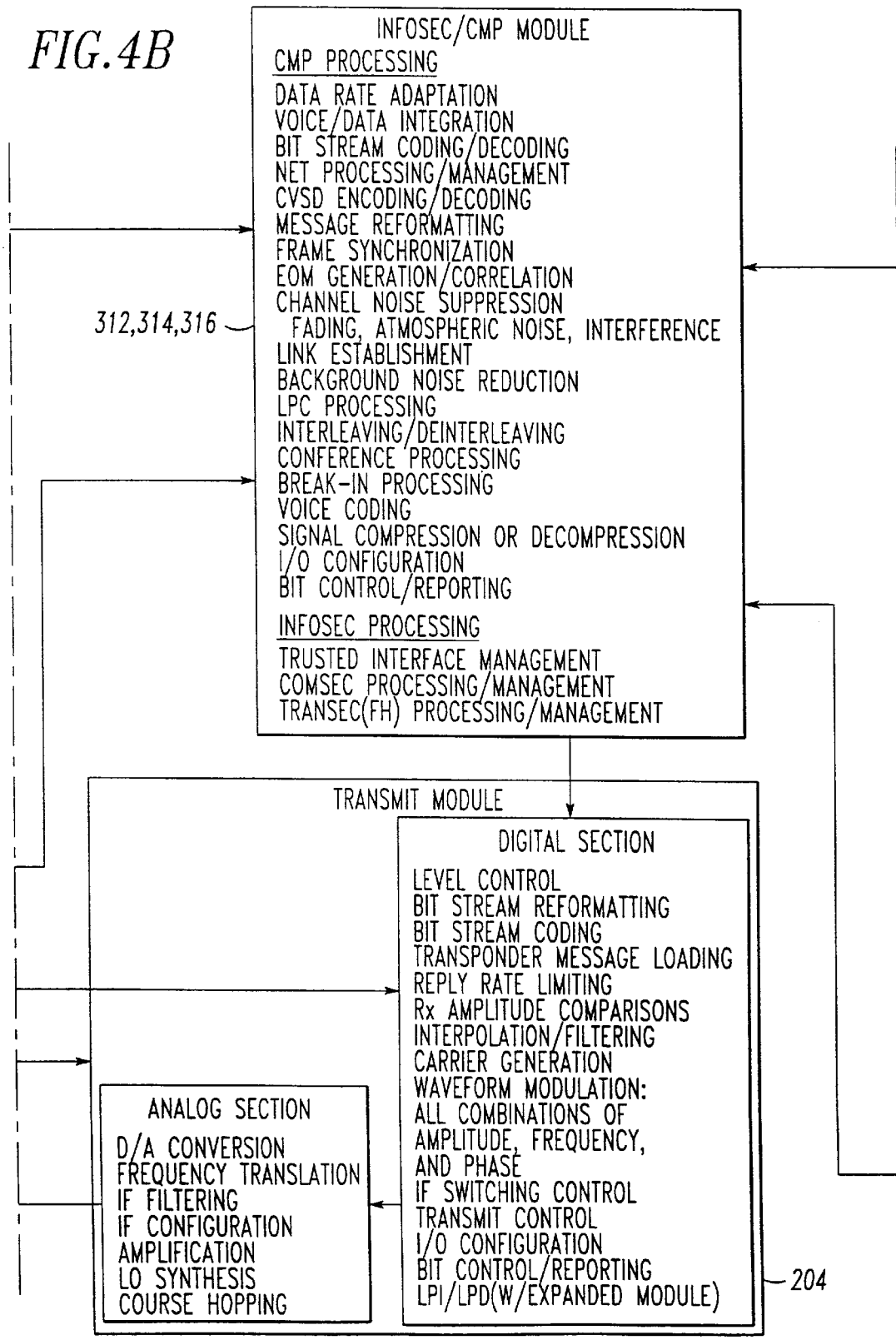
Figure 4C:
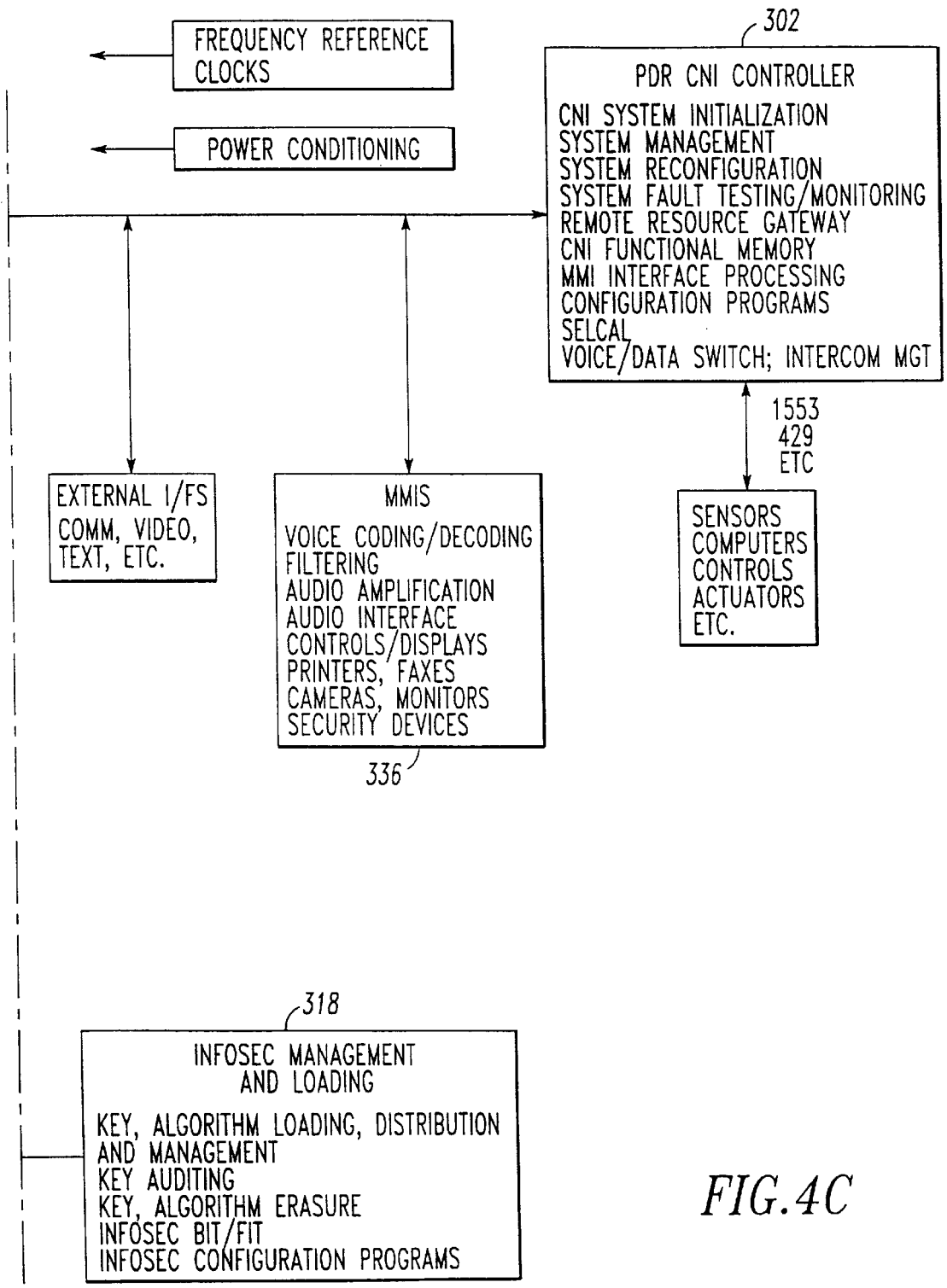

FIG. 4 depicts the range of functions that can be provided by a single dynamically programmable transceiver channel, such as the channel system 300 illustrated in FIG. 3, which is coupled to different types of antennas, for example the three different type of antennas 330, 332, and 334. The operations and processing noted in FIG. 4 are not meant to be all inclusive for all radio functions of interest, nor are all the processes indicated utilized for every radio function. However, as can be seen the modules are capable of performing all of the functions necessary for a radio within the approximately 2 MHz to 2 GHz RF band of interest. Furthermore, some functions (e.g., error correction,) may be performed in one of the other modules other than the one indicated. For some applications, certain elements, e.g., the CNI controller/data processor 302, can be further partitioned into multiple elements but preferably as long as such partitioning is not at a high-speed parallel bus interface. However, neither the common programmable receive module 106 nor the common programmable transmit module 204 should be further partitioned into separate boxes, although as will be discussed in more detail later the common modules 106 and 204, each preferably contained within a single rack mountable, preferably plug-in unit, are divided into analog and digital submodules that are shielded and isolated, with respect to EMI, from each other. These common receive 106 and transmit 204 modules are partitioned to contain all the RF/IF conversion circuitry in the channel, and to have only relatively low speed serial busses at their I/O interfaces. Conversely, elements such as the channelized message processors (CMPs) 312 and 316 and information security (INFOSEC) elements 314, 318 and 320 (and even the common programmable receive module 106 and common programmable transmit module 204) can be combined into fewer modules. However, such combining of modules may increase module size and cost overhead if the larger module is to be used in multiple places (i.e., channels or applications) because not all elements of the module are necessarily used in each place.

As can be seen from the above discussion the programmable digital radio (PDR) architecture of the present invention uses two common module types: a programmable common receive module 106 and a programmable common transmit module 204 which form the heart of the system. The two modules can serve as primary modules dedicated to a single channel function or reprogrammable for different primary RF functions or serve as universal backup modules capable of performing any of the functions required of a primary module. The modules 106 and 204 are called "common" because the same module can be programmed to process one of many different types of CNI radio functions and such processing can be rapidly time-multiplexed among multiple CNI radio functions. Thus, a single radio channel, such as system channels 100, 200 and 300, can be programmed for a particular CNI function (or for time-multiplexed CNI radio functions of different types) and two or more radio channels can each be programmed for the same or different radio functions that must operate in exactly the same time period. It is also possible for the hardware normally assigned to a single channel to service multiple channels that are, for example, contiguous in frequency and/or formed by code division multiplexing the same RF carrier. Moreover, these common receive 106 and transmit 204 modules can also be used in different integrated CNI radio applications on different platforms. Although not mandatory for some applications, but included as part of the architecture, as explained later, the channelized message processors (CMP) and information security (INFOSEC) modules can also be common programmable modules. Furthermore, these three modules can also be combined into a single common programmable INFOSEC/CMP module as illustrated in FIG. 4. Quite often the CMP modules 312 and 316 would be combined with the INFOSEC module 314 because many CNI functional channels requiring the INFOSEC module 314 also require the CMP modules 312 and 316, and the consolidation of these modules can reduce overall hardware by utilizing components common to the combined functionality.

When in the receive mode (see FIGS. 3 and 4), a received RF signal for each CNI function is routed from one or more antennas through the antenna interface unit (AIU) 308 into the common programmable receive module 106. The common receive module 106 uses analog RF/IF and digital signal processing to perform the necessary frequency translation, demodulation and bit stream formatting to a signal carrying the desired information to be conveyed (and sometimes referred to herein as the digital information signal) such that, except for the rare case described later, where additional high-speed processing (such as LPI processing) is required directly on the waveform prior to demodulation, the output of the common receive module 106 is normally relatively low speed, serial data comprising a digital information signal appropriate to various application terminals such as audio equipment, displays, instruments, etc. The need for high-speed parallel bus interfaces between modules is for the most part eliminated.

In many cases, the receive module 106 performs all necessary signal processing and modem functions such that the data output from the receive module, under the control of the controller 302, is passed to a terminal 336, such as an audio interface or a man-machine interface (MMI). An analog radio frequency (RF) carrier modulated signal, for example, a carrier modulated with an analog voice signal, that is received by the common receive module 106 is output as, for example, a digital voice signal and is passed to, for example, a voice terminal in the MMI 336 where it is converted back to analog audio and sent to speakers or headsets. The path to the terminal can be either a bus that services multiple CNI channels and terminals, or it can be a dedicated path from a particular channel, such as channel 324, to a particular type terminal, such as a printer or a FAX machine. If necessary, the conventional bus interface unit (BIU) 304 is inserted in the path, either for reasons of conversion to a standard bus protocol, or for electrical compatibility (line drivers, voltage transformation, isolation, etc.) when such compatibility is not included within the common modules 106 and 204.

In other cases the data output from the receive module 106 is first passed through the controller 302, which manages the integrated radio assets including system busses such as 322 and 324 and, in some applications, performs a data processing function. It can also act as a gateway to other application busses, such as bus 336. It is also possible to further segregate the controller, data processor and gateway functions into separate modules.

For special cases, when the receive module 106 is unable to handle all the message processing associated with the channel, a channelized message processor (CMP) module 312 is assigned to the receive module 106. When an INFOSEC module is present a CMP module 316 to handle the secure message processing is inserted on the secure (i.e., red) side of the INFOSEC module 314. The CMP is analogous to an expansion board including a special purpose high speed digital processor. However, relatively low speed serial data is passed from the receive module 106 to the CMP 312. It is anticipated that as digital processing hardware becomes smaller and less expensive, more CMP-type processing can be performed within the common receive module 106 with acceptable size and cost overhead. At that point some CMP modules will not be necessary. CMP functions can also be performed in the INFOSEC modules as discussed below.

In the rare instance where relatively high-speed multi-bit processing must be performed on the received waveform before demodulation, such as low-probability-of-intercept (LPI) type processing, it may be necessary to perform such processing in a separate special processing or applique module 310. Although the applique module 310 typically takes the place of the signal processing elements within digital submodule 600 (see FIG. 6B to be discussed in more detail later), and normally operates directly on the narrowband or wideband A/D converter output 622 of switch 606, it is not connected directly to 606 because the physical commonality of the receive module 106 including digital portion 600 should not be changed. Essentially the output of the narrowband ADC 604 or the wideband ADC 602 is routed through 606, 608 and 614 to the applique bus 330. The applique module 310 will normally operate directly on the ADC 602 or 604 output although some intervening processing via the other digital elements, such as 608, 610, 611, 612 and even 614 is possible. Such processing external to the receive module 106 requires multi-bit lines, i.e., parallel interconnects which may be referred to as applique busses, between the receive module 106 and the applique module 310. However, the specialized applique module 310 preferably resides adjacent to the receive module 106 being serviced, so the electromagnetic interference (EMI) associated with moderate speed multi-bit lines is confined in a relatively small volume and is minimized.

In the relatively fewer instances of receiving a signal requiring additional signal processing capability (for example, LPI/LPD processing) that is not economical to place in every common receive module, and where such additional processing is of a type that is not economical to place in a CMP module, such additional processing can be placed in an applique module. In this case, with reference to FIG. 35, the output from the ADC in the common receive module 3502 and prior to demodulation of a digital intermediate frequency signal is routed, perhaps with intervening processing in the common receive module that does not add unacceptable latency in the receive signal path, to the applique bus 3504 and then to the applique module 3506 for the additional (e.g., LPI/LPD) processing. After applique processing, the signal can either be routed back to the common receive module 3502 via applique bus 3508 for additional processing (again without unacceptable signal latency) before passing the signal to black control data bus 3510 (or perhaps a separate black message bus 3512) and then, as the digital information signal to CMP module 3514. Or, after applique processing, the signal can be routed directly via the applique module 3506 to the black control/ data bus 3510 (perhaps via a separate black message bus 3512) as the digital information signal to CMP module 3514. If CMP and/or INFOSEC are not employed, the output from applique module 3506 via the control/data bus 3510 (or perhaps a separate message bus 3512) would pass as the digital information signal directly to the system controller 3516 and/or external user terminals 3518 via control/data bus 3520 or multiple access message bus 3522, both of which busses would then be black. The particular signal routing paths are determined by the module interconnection layout (e.g., the backplane connectivity) for the particular system application. Because the data rate for applique processing is relatively high, applique busses are parallel and of higher speeds than the serial digital information signal.

On the other hand, for some applications it may be desirable to use a special-purpose receive module to eliminate the need for extra I/O pins on the common receive module 106, and to eliminate the moderate-speed extra-bit lines in the backplane. This special-purpose receive module may be somewhat larger than a common receive module 106 (in pitch but not in footprint) to contain the applique functions. However, even this special-purpose receive module would possess the analog and digital circuits that are found within the common receive module 106. As the size and cost of digital processing continues to decrease, it should be practical to house the additional processing within common transmit 204 and receive 106 modules with acceptable size and cost overhead such that it is economically and physically acceptable to utilize this module that includes the applique functions for CNI functions that do not require the applique.

Whenever required, information security (INFOSEC) modules, such as 314, 318 and 320, provide COMSEC (communication security) on a channelized basis, which often involves the description of classified messages. That is, the output of a receive module 106 is fed into an INFOSEC module 314 (see FIG. 3) before being combined with other data and passed to the PDR controller and/or various terminals. In addition, the INFOSEC modules can provide TRANSEC (transmission security) on a channelized basis, which often involves control (such as a channel frequency hopping sequence) of assets residing in the common receive and transmit modules 106 and 204. In such cases the key for the control, such as the decoding code for COMSEC or the hop sequence for TRANSEC, is received in classified form from the INFOSEC load device 320, is routed to the INFOSEC module 314 associated with the desired channel, is unwrapped (i.e., declassified) in either the INFOSEC management module or the INFOSEC module, and is passed to the receive and transmit modules in the same CNI channel via a bus interface (either the normal CNI control data bus or a separate TRANSEC bus). For applications that require INFOSEC modules, it may be desirable to place the CMP processing (i.e., the relatively low-speed message processing that cannot be handled by the common receive module) into the INFOSEC module. The INFOSEC/CMP combination, as shown in FIG. 4, is particularly attractive when the additional message processing associated with a particular radio channel is of both the unclassified (black) and classified (red) variety.

Figure 24:
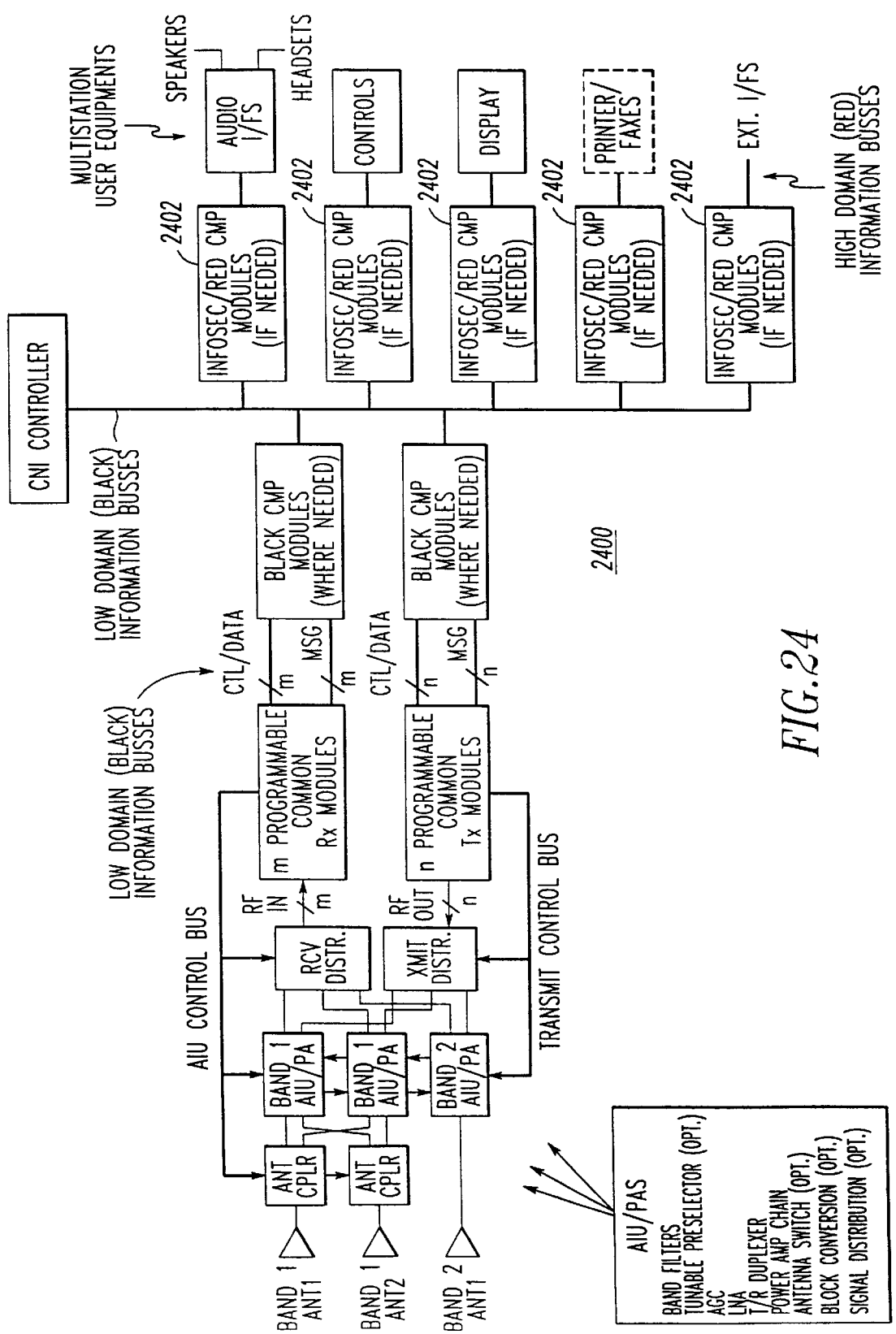
FIG. 24 depicts a multiple channel transceiver system with user-dedicated security modules.

Associated with the INFOSEC capability is an INFOSEC management module 318 and provisions for key loading via a load panel 320. The key INFOSEC point with regard to the architecture is that it is performed on a channelized basis, which not only simplifies the INFOSEC implementation but also simplifies the isolation of INFOSEC functions among channels of different security levels. Furthermore, channelized INFOSEC simplifies the certification of the entire system when channels are added or modified. The details of how the channelized system architecture handles a mix of clear and classified information in an integrated radio suite are provided later with respect to FIG. 22. Also, the advantages and disadvantages of associating INFOSEC modules with each channel as opposed to each application device (as shown in FIG. 24) will be discussed later.

The transmit path is similar to the reverse of the receive path, where data and digitized voice originate at various sources, and are passed under the control of the controller 302 (see FIG. 3) to the common programmable transmit module 204 (through INFOSEC and CMP functions if required by the application). The transmit module 204 contains both digital and analog IF/RF circuits. It normally inputs relatively low speed serial data, performs digital modulation and associated processing, such as interpolation and waveform generation, to produce a common intermediate frequency signal, performs digital-to-analog conversion, frequency translates the signal to the appropriate CNI band, and passes the baseband analog signal to the AIU 308 where it is power amplified. The signal is then routed to the appropriate antenna for free space transmission. Similar to the common receive module 106, the integrated common RF/digital transmit module 204 eliminates the need for high-speed parallel bus interfaces between modules.

Also, similar to a common programmable receive module 106, CMP and INFOSEC modules can be utilized to complement a common programmable transmit module 204. Usually a single CMP and/or INFOSEC module would service both the transmit 204 and receive 106 modules associated with a half-duplex CNI channel. Separate receive and transmit CMP and INFOSEC modules could be utilized for full-duplex CNI operation, or the full-duplex operation could be embedded in single CMP module and INFOSEC modules.

As in the receiver the applique module 310 would replace the processor 704 (see FIG. 7A to be discussed in more detail later) and communicate over the bus 330 through 702 and 708 directly to the DAC 710, although in some applications additional processing might be performed by some of the elements in digital submodule 700.

Figure 35:
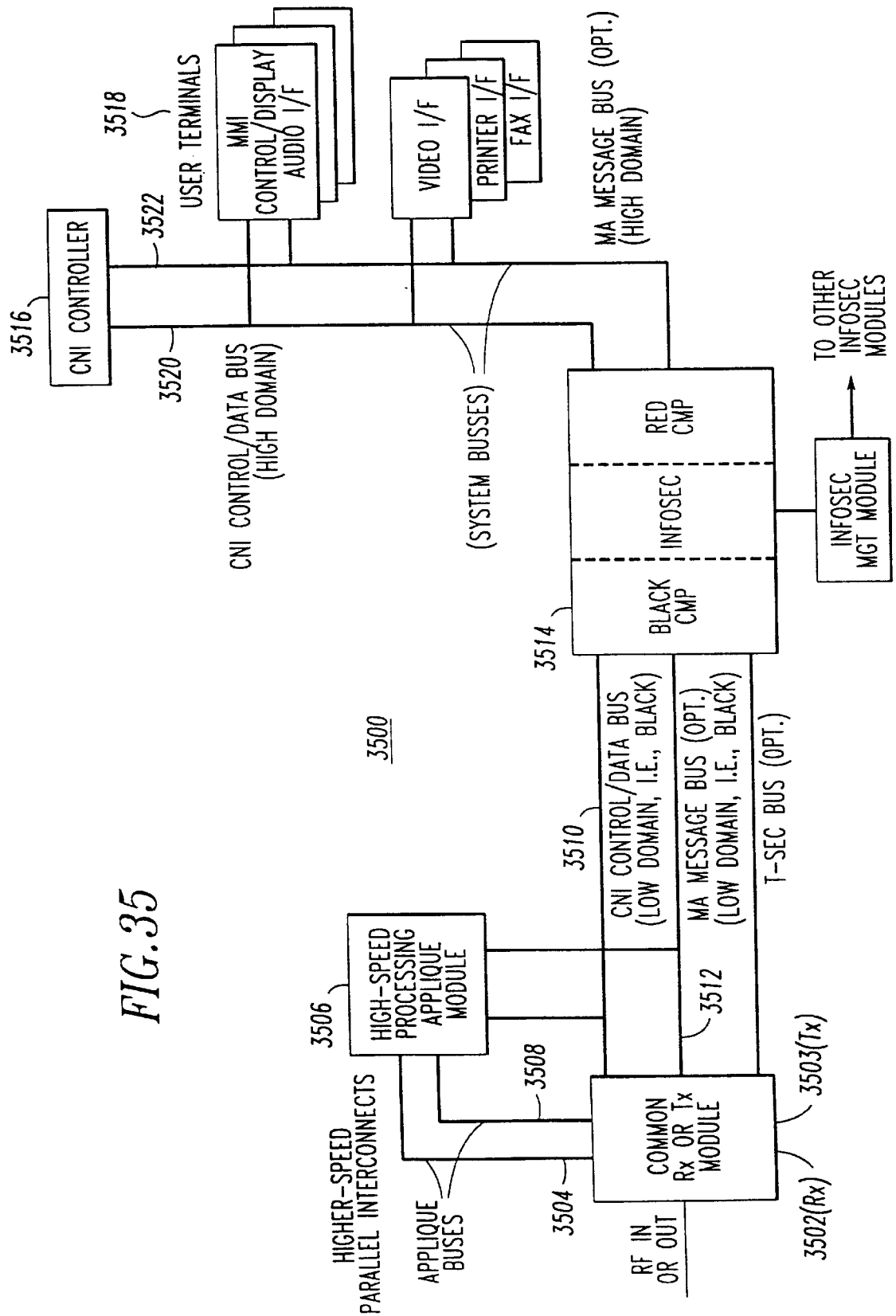
FIG. 35 shows how an applique processing module is connected to a common receive or common transmit module.

Similar to applique processing in a receive channel, and with reference to FIG. 35, when transmitting a signal requiring signal processing of relatively high rate and beyond the capability of a common transmit module (for example, LPI/LPD processing), the digital information signal output from CMP module 3514 via black control/data bus 3510 (or perhaps a separate message bus 3512) is routed, prior to digital carrier modulation, to applique module 3506 for the additional (e.g., LPI/LPD) processing, and then via applique bus 3508 to the digital-to-analog converter in common transmit module 3503, perhaps with intervening processing of sufficiently low latency in common transmit module 3503. Alternately, the signal output from CMP module 3514 via black control/data bus 3510 (or perhaps a separate message bus 3512) can be routed as the digital information signal first to common transmit module 3503 for processing of sufficiently low latency, passed to applique module 3506 via applique bus 3504 for applique processing, then via applique bus 3508 to the digital-to-analog converter in common transmit module 3503, perhaps with intervening processing in common transmit module 3503. If CMP or INFOSEC are not employed the applique module 3506 (or the common transmit module 3503) receives the signal directly from the controller 3516 or user terminals 3518 via either control/data bus 3520 or separate multiple-access message bus 3522, both of which busses would then be black. The particular signal routing paths are determined by the module interconnection layout (e.g., the backplane connectivity) for the particular system application.

The CNI controller 302 (FIGS. 3 and 4) manages the integrated radio assets and interfaces of the architecture. Because the signal, message, INFOSEC and BIT (built-in-test) processing and control is done on a channelized basis, with the rate-intensive control of each channel contained within the fixed hardware string dedicated to that channel (and not cross-coupled among channels), the advantages of a centralized controller 302 can be realized without the disadvantages, such as conflict resolution problems, high-bandwidth control busses or a major re-certification headache whenever a single CNI function is modified. The controller 302 is further described later herein.

Channelized processing and control, in addition to the above discussed benefits for reception and transmission, also simplifies built-in-test (BIT), fault-isolation-tests (FIT) and maintenance because checkout is performed on a channelized basis; simplifies logistics and replacement because it is performed with relatively few number of module types; permits certification of a given channel for a new or modified radio function (via a different software/firmware program hosted in the channel hardware) without the need to recertify the channel for all previous radio functions that have been certified in the channel hardware; simplifies security isolation between channels; and makes it easy to scale the system to larger or smaller simultaneous radio function capacity by simply adding or deleting hardware channels.

Equally important to the architecture are the bus interconnections which permit traffic flow among the various elements of the architecture. These flexible bus interconnections can be adapted to each application and enable many of the architecture advantages over the prior art.

Other conventional functions of an integrated CNI system, such as master reference oscillators, clocks and power conditioning are not discussed here for brevity since a person of skill in the art can provide appropriate components.

Each type common module (receive and transmit) is programmed for a specific CNI function that is in use at the time in that channel. When one CNI function is no longer active and a different CNI function is in use, the receive and/or transmit modules are reprogrammed for the new function by loading appropriate programmable channel function characteristics from the controller 302 into the module(s). If two CNI functions are simultaneously active, two possibilities arise. First, if appropriate, the two CNI functions are time multiplexed through the same programmable channel by appropriate loading from the controller 302, or via a simple command from the controller than time-multiplexes CNI functions that are resident in memory within the common module. Otherwise, two sets of modules are used to provide two channels (see for example FIG. 20, where either channel would not contain the INFOSEC/CMP module if it is not required), with each set programmed to service an assigned function. Furthermore, redundancy can be provided for all functions via a single programmable module of each type, that is, a single programmable receive 106 or transmit 204 module, as appropriate, can provide redundancy for multiple channels (see for example FIG. 10). There is no need to carry additional spare channels for each type CNI function.

Single-function CNI applications, such as pocket-sized radios, are preferably handled by an entirely dedicated unit because of current size constraints dictated by available technology, although the present invention can be used in such single function applications, especially as component sizes continue to shrink. But the channelized modular approach is superior for multiple-function radio suites where the functions are not all used simultaneously, or for multiple simultaneous radio suites that require redundant spare functional hardware strings, or to single-function radio applications that require growth or future modifications. The savings in size, weight and cost provided by the present invention increases rapidly with the number of functions serviced.

Because the architecture does have some size/weight/cost overhead when used for a subset of functions, the architecture best applies to system applications which require (or will require in the future) more than one CNI function, or where a single function requires future modification. But if only a single function (or a few functions =N) is all that is ever required, and if these functions never need to be modified, then point/dedicated non-programmable designs may give the lowest size/weight/cost. The value of N depends on the actual functions involved and other factors such as the ability to time-share functions and the requirements for redundancy. On the other hand, the low cost economy of scale obtained by applying the common modules of the present invention to many different types of applications may, nonetheless, enable the approach of the invention to also offer the lowest cost solution for single-CNI radio applications.

Without the architecture (plus associated modules), the idea for a totally programmable common module channel has never been practical. Certainly there is a big difference between merely proposing identical programmable channels and developing an architecture partitioning that makes practical the fabrication of compact, affordable programmable common modules. Performing practically all the major CNI signal operations in a single receive or transmit unit of compact size is important to achieving the advantages of the present invention. The architecture partitioning (both by channel and by function within each channel) makes this possible.

The major elements of the disclosed architecture for an integrated CNI radio system according to the present invention are shown in FIG. 3 while the functions which can be performed are shown in FIG. 4. Interfaces with elements external to the architecture (antennas, busses and terminals) are also shown. Not all elements are employed in every application.

Various modifications to the architecture are within the skill of those of skill in the art. For example, small/portable applications with fewer functional or traffic requirements may combine the control/data and multiple access (MA) message busses described later. Nonetheless, the disclosed architectural module partitioning still offers the lowest overall system hardware overhead and cost for practically all multi-CNI applications, and has the flexibility to interface with a wide variety of external equipment.

The modules and interconnections pertinent to the architecture will now be discussed. Reference oscillators, power conditioning and other elements that are not particularly pertinent to the architecture and which can be provided by those of skill in the art, including external elements such as antennas, are not discussed in detail. Also not discussed are the analog and digital interconnections between these non-pertinent elements and the elements of the architecture.

The general function of the modules and interfaces is discussed first, followed by architecture examples for various applications. Most elements are preferably centrally located in one or more racks. But some elements, particularly portions of the AIU, may be remote in certain applications.

A major feature of the architecture invention is the partitioning of the RF hardware among channels and within each channel into non-common antenna interface modules or units (AIUs) 308 (also see 104 in FIGS. 1 and 2) and the common receive 106 and common transmit 204 modules as illustrated in FIGS. 3 and 4. An AIU (see FIG. 5) can be tailored for specific CNI functions and specific platform applications. For example, as a typical minimum, AIUs preferably contain bandpass filters for specific CNI functions, and the performance of such filters would be dictated by the interference associated with a given application although other components, such as the power amplification necessary for a given transmit application, may be needed for a minimum AIU configuration and in some circumstances the minimum may not require filters or amplification.

Partitioning non-common RF front-end operations among communicating navigation and identification (CNI) functions and among CNI applications into non-common antenna interface units (AIUs) 308 considerably reduces the overhead burden on the programmable common receive 106 and transmit 204 modules and, along with architecture partitioning into the other modules discussed later, results in a low size/weight/cost solution for an integrated CNI suite. AIUs 308 will typically comprise a low percentage of the total channel hardware dedicated to a particular CNI radio function. As noted, each AIU 308 can be tailored to specific CNI functions and system applications although a single AIU can be tailored to multiple CNI applications and used in conjunction with a common receive and (possibly) common transmit module as, for example, the AIU/PA for functions #m-n in FIG. 10. Also, many AIU elements (low noise amplifiers, switches, receiver protectors, filtered PAs, etc.—see FIG. 5) can be common among different CNI functional applications to realize additional economy-of-scale savings.

Figure 5:
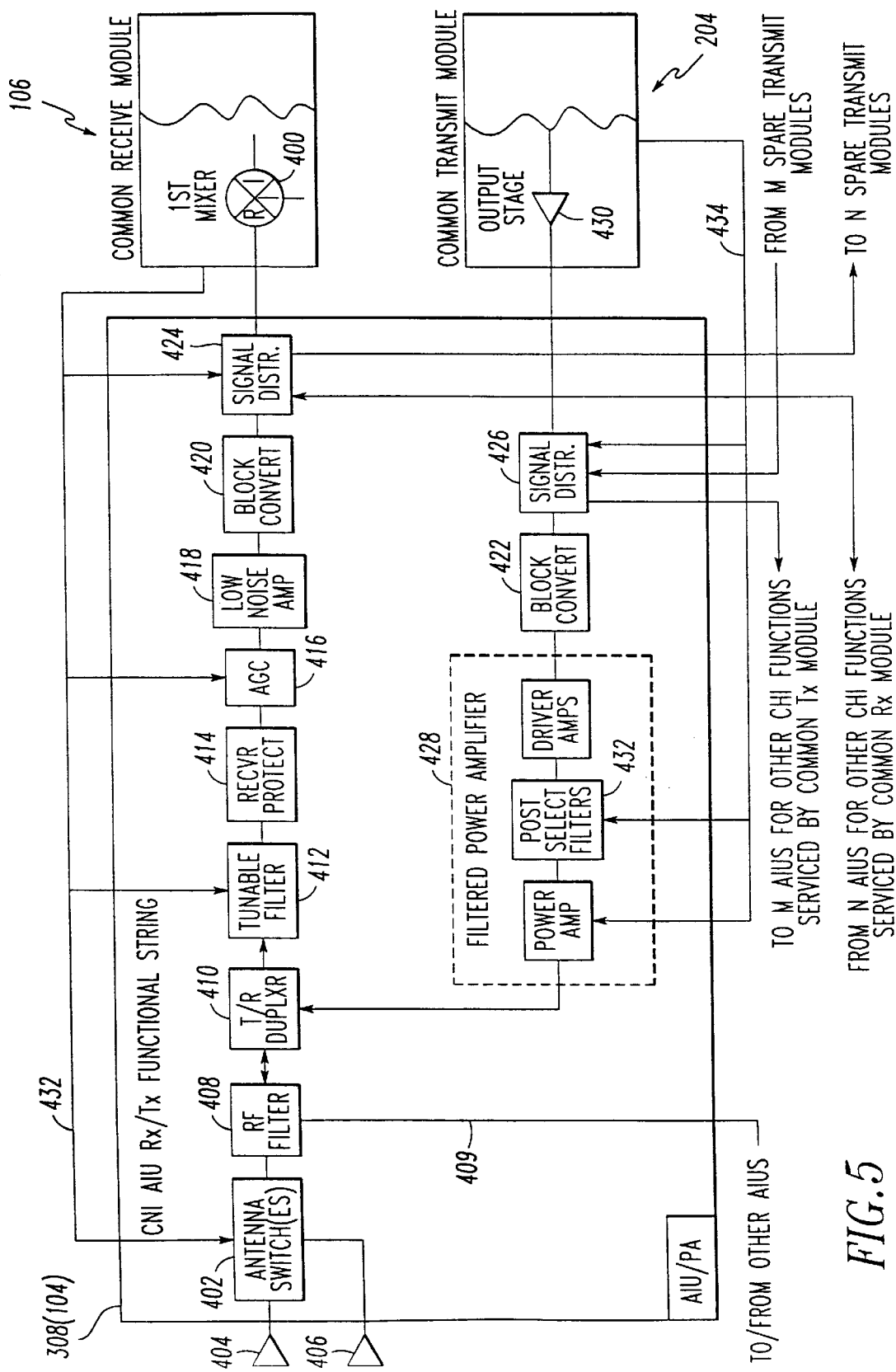
FIG. 5 depicts the details of an antenna interface and power amplification module (AIU) 104/308 in more detail and where not all of the illustrated elements are needed for every communication, navigation and identification (CNI) channel.

For signal reception, as illustrated in FIG. 5, the invention architecture incorporates the first radio frequency (RF)/intermediate frequency (IF) frequency translator 400 (i.e., mixer) in a receive channel as the first element in the common receive module 106. All other RF analog components preceding the mixer 400 are housed in a separate AIU module or modules 308. The first element preceding the mixer 400 is typically an analog low noise signal amplifier such as 418, although some radio functions may not require an amplifier. As the size, cost and performance of the elements that precede mixer 400 improve, such as amplifiers and receiver protectors, it may become advantageous to locate these components in the common receive module 106. Furthermore, there is only a single analog RF connection between the AIU module and the common receive module 106, and there is no need for multiple analog signal inputs to various RF and IF stages. The analog receiver module 106, as described in more detail with respect to FIGS. 6A and 6B, utilizes multiple first IFs functions.

A conventional RF filler 408 can also be provided to perform any necessary isolation of different radio band signals received by the antennas. If the same antenna is used for receive as well as transmit functions either sequentially or in parallel a transmit/receive (T/R) duplexer 410 can be provided. If the T/R functions occur simultaneously the duplexer 410 may become a frequency multiplexer or circulator. When only a receive or transmit function is active at a time the duplexer 410 can become a T/R switch. If the duplexer 410 contains high quality signal isolation filters, use of a duplexer 410 can allow elimination of filter 408. And in some cases filter 408, duplexer 410 and perhaps filter 412 can be replaced by a sophisticated tunable antenna multicoupler (not shown) that couples multiple receive and transmit channels to the same antenna, either via connections to other AIUs 409 or via additional Rx/Tx functional strings in the same AIU 308. A conventional tunable filter 412, which can be controlled by the receive module 106 or transmit module 204, can be provided to further eliminate unwanted signal noise or crosstalk and to pick out the signal of interest from among multiple signals or strong interference. When the receiver 106 is located in potentially damaging electromagnetic (EM) locations a conventional protection circuit 414 can be provided to prevent strong RF signals from damaging the receiver. In some circumstances, such as strong signal conditions of dynamic power levels, a conventional automatic gain control (AGC) circuit 416 under the control of receive module 106 is included in the AIU 308. For example, the AGC level is set via signal measurements performed in receive module 106 and subsequent commands to AIU 308 via AIU control bus 326. A conventional low noise amplifier (LNA) 418 can also be provided to give the received signal a power boost to improve sensitivity before it is down converted. In rare or unusual situations where a signal is outside the frequency design range of the receive module 106, a conventional block down convert unit 420 which includes a reference oscillator and a mixer can be provided to move the received signal into the frequency range of the receive module 106.

A block conversion unit 422 can also be included in the transmit signal path. The block frequency conversion when included in the AIU 308 extends the frequency range above and below the typical frequency range (2 MHz to 2 GHz) of the common receive or transmit module or fills the gaps between approximately 2 MHz and 2 GHz where such gaps exist because of implementation considerations for the common receive or transmit modules. Typical examples are receive-only Omega Navigation and Automatic Direction Finder equipment which operates below 1.5 MHz and receive only microwave landing systems that operate near 5 GHz. Transmit examples include operation in the industrial, medical and scientific (IMS) bands above 2 GHz.

When the channel requires redundancy or other requirements where the signal from the receive module 106 or to the transmit module 204 need to be routed, conventional signal distribution units 424 and 426 can be provided. These can be conventional switches or conventional power splitters and combiners. The transmit and receive signal distribution units 424 and 426 typically are for: (1) sharing a common receive 106 or transmit 204 module among various AIUs 308 that are particular to different CNI functions, and (2) allocating spare receive 106 or transmit 204 modules that can be reprogrammed to support different CNI AIUs in the event of failure of the primary receive or transmit module.

The actual elements used in an AIU 308 and their ordering in the string depends upon the particular application. For example, receiver protector 414 and AGC 416 might precede the tunable filter 412 and there may be an image noise filter after LNA 418. There may also be a filter after the power amplifier 428 prior to the T/R duplexer 410. Some communication, navigation and identification (CNI) functions require only an input bandpass or lowpass filter in the AIU. Other CNI functions and applications may require receiver protection, AGC, and/or preamplification. Cosite operation may necessitate a tunable preselector or filter to reject interference outside the particular channel in use but still within the band of operation for the CNI function.

For signal transmission, the output of the exciter or common transmit module 204 feeds into the AIU 308 as shown in FIG. 5. The typical segregation of a transmit module, according to the present invention, is at the output stage of the common transmit module 204 which is of sufficient power and performance to drive the external amplifier stages associated with many different types of radio functions, each operating in a different portion of the broad frequency band serviced by the common transmit module 204. Functionally, a conventional power amplifier either narrowband or broadband, and which further may be a filtered power amplifier, either narrow or broad band, is included with the AIU 308 although it may be physically partitioned separately depending upon the application. Highly linear amplifiers 430 are included in the output path of the common exciter or transmitter module 204, and approximately the same output level is maintained for all CNI functions. Typically, the last frequency translator is included in the common transmit module prior to the amplifiers 430. In this manner the programmable transmit module 204 is common to all CNI functions. Also shown are typical RF elements contained in the transmit path of the AIU 308, including the T/R duplexer 410. Like the receive chain, the actual elements used and their ordering in the string is dependent upon the specific application. In particular, the use and placement of a conventional postselector filter 432 among the various amplifier stages is tailored to application dependent emissions requirements. Other functionality such as antenna tuning, which is normally located remotely (such as an HF antenna tuner), and sophisticated antenna tunable multiplexing may also be considered as part of the AIU functionality, even though the functionality may be remotely located. AIUs are also not only tailored to specific radio functions but can also be tailored to different radio system applications. For example, the skirt selectivity requirements on AIU filters are determined by the interfering signal conditions experienced by the particular system applications, thereby dictating that higher performance (and therefore larger and more expensive) filters be used in some applications. (Similarly, power amplifiers with different power outputs are used for different applications.)

Although the AIU is normally considered as a unit associated with over-the-air radio transmissions, it can easily be generalized as an RF interface unit to include interfaces to other transmission means. For example, an RF interface unit could include a lightwave modulator (or demodulator) to modulate (or demodulate) a laser or other optical carrier with the RF signal (or to recover the RF signal) that can be serviced by the common transmit (or common receive) modules associated with free-space or fiber optic transmission.

With reference to FIG. 5, the AIU 308 receives control data (e.g., switch, filter and gain settings) via an AIU receive control bus 432 directly from the common receive module 106 in the AIU's corresponding channel. For CNI transmit functions transmit data, such as tuning information, instantaneous modulation levels and power level control are sent over an AIU transmit control bus 434 from the common transmit module 204 in the AIU's corresponding channel. Also, for various transmit commands requiring a short time response such as transponder antenna select, TIR select or pulse shape strobe, transmit discrete lines (not shown) can also be provided from common transmit module 204 to AIU 308. AIU built-in test (BIT) can be initiated via either the AIU receive control bus 432 or the transmit control bus 434. Likewise, AIU status can be relayed back to the CNI controller via either the AIU receive control bus 432 or the transmit control bus 434.

Although not specifically shown in FIG. 5, associated with the signal distributors 424 and 426, -power splitters and/or combiners can be provided. The receive and transmit signal gain assigned to AIU 308, for example in amplifiers 418 and 428, is such that these conventional devices provide sufficient power to and from any spare modules so that switching to the spare modules is seamless.

As with the other modules, AIUs 308 can be physically located anywhere. Usually the AIU modules 308 will be located in the same rack(s) as the other radio modules. However, in some applications the AIUs 104/308 (or portions thereof) may be located remotely at the antennas.

The architecture does not try to connect every transmit and receive module to every antenna because so doing would require large, expensive, complex RF switch matrices that complicate the physical interconnections among modules. And such full connectivity is not needed as later explained with reference to FIG. 23.

However, radio frequency switch modules 306 associated with each channel (see FIG. 3), and shown in FIG. 5 as signal distribution modules 424 and 426, can be included in the architecture of the present invention and are conventional in nature comprised primarily of digitally controllable single-pole multi-throw (SPMT) switches. The switches of such modules 306 (which may be included in the signal distribution elements 424 and 426, and also are separately shown as 1002, 1004, 1102 and 1104 in FIGS. 10 and 11) help the architecture of the present system capitalize on it's efficiencies with respect to system redundancy. Whereas conventional architectures with N different type channels require N spare channels for a totally redundant system, the architecture of the present invention typically requires only one extra spare channel comprised of a common programmable receive module 106 and a common programmable transmit module 204. The receive and transmit elements in this spare channel are switched in as spares via conventional single-pole multi-throw (SPMT) switches assigned to each type spare module (see FIGS. 10 and 11 and the discussion thereof for more details). Additional levels of redundancy are possible by adding extra spares via SPMT switches.

Figure 10:
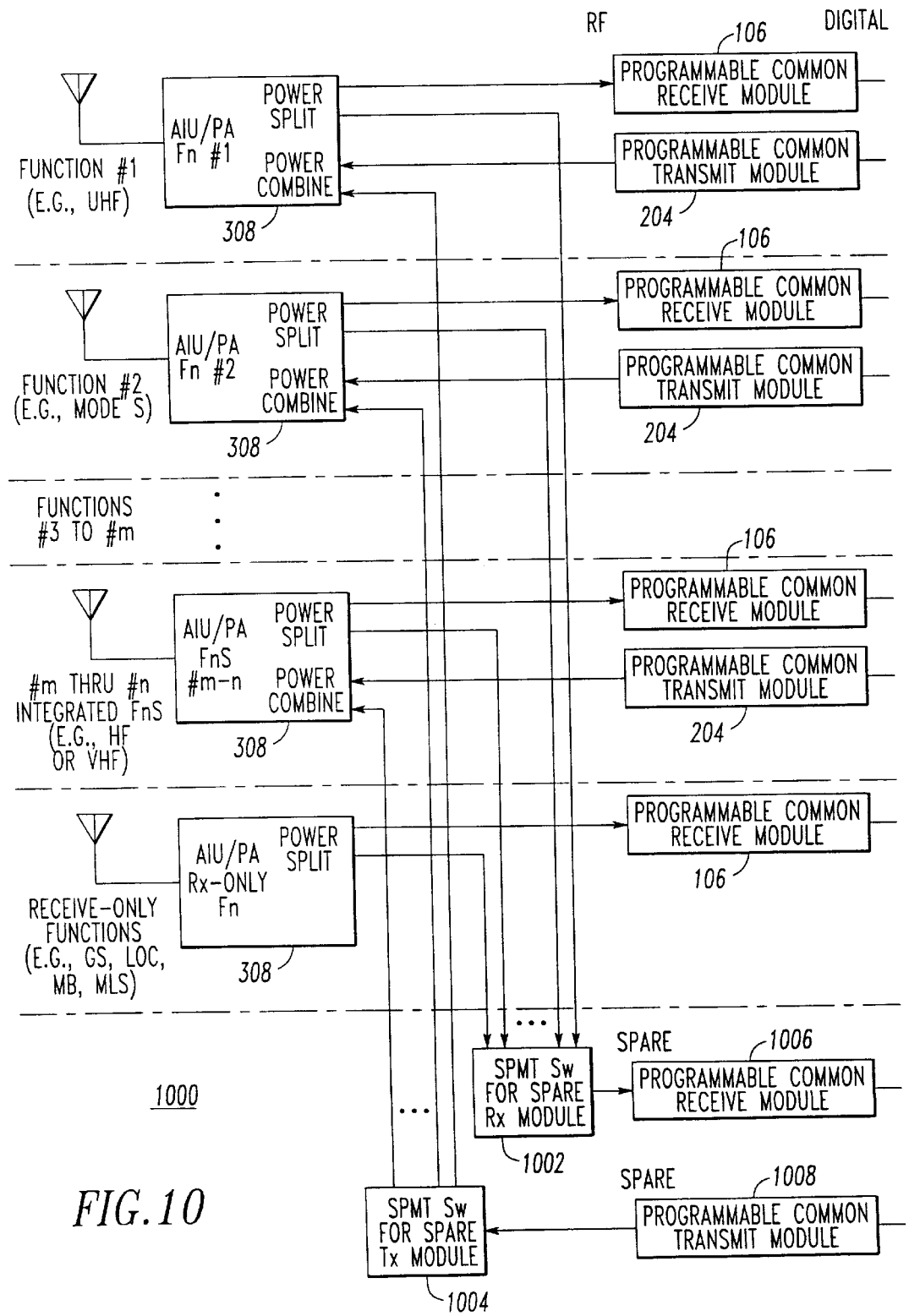
FIGS. 10 and 11 depict levels of redundancy providable by the present invention.
Figure 11:
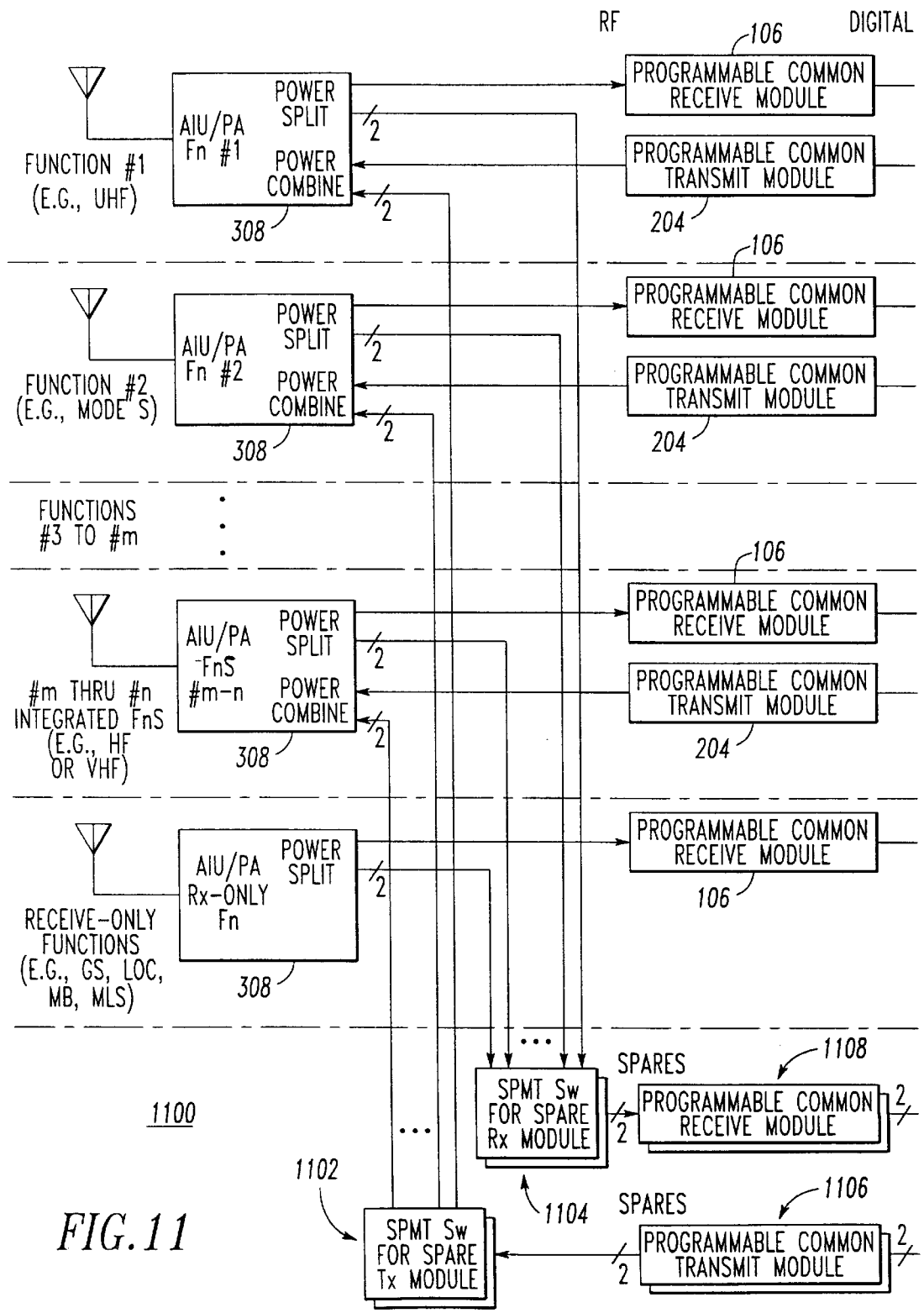

Upon receipt of a signal, a power splitter in the AIU splits the signal multiple ways and feeds it to various common receive modules, sometimes through single-pole, multiple-throw (SPMT) switches 1002 and 1004 to various spare receive modules, where any SPMT switch is, in turn, used to connect a spare receive module 1006 and 1008 to various AIUs as shown in FIG. 10 and 11. Upon transmission of a signal, a power combiner in the AIU combines multiple signals from various common transmit modules, sometimes through SPMT switches 1004 and 1102, where any SPMT switch is, in turn, used to connect a spare transmit module 1008 or 1106 to various AIUs as shown in FIGS. 10 and 11. SPMT switches 1002, 1004, 1102 and 1104 could be housed within the various AIUs or, to reduce the I/O complexity the AIUs, the SMPT switches could be housed in separate modules.

Because each SPMT switch in a module 306 is directly associated with a common receive 106 or transmit 204 module, these switches are not a source of single-point failures that is independent from the common receive 106 and transmit 204 modules. That is, if one of these SPMT switches fails it is considered as a failure of the associated receive or transmit common module. When determining overall system reliability parameters, the MTBF of a SPMT switch (plus associated interconnections) is included in the MTBF of the associated common receive or transmit module. Thus, the inclusion of these switches does not preclude the straightforward scaling of the architecture by simply adding RF channels.

For some applications these SPMT switches are incorporated in the signal distributors 424 and 426 within the AIU 308. However, in other applications it may be desirable to house these switches in a separate module(s) because of RF I/O considerations in the AIUs and to make the system more easily adaptable to RF modifications. Various options are available for controlling these SPMT switches. Because the SPMT switches are each assigned to a common receive 106 or transmit 204 module, they can be controlled by the AIU receive control bus 432 (from the associated spare receive module) or the transmit control bus 434 (from the associated spare transmit module). RF isolation in the AIU from the failed channel will be sufficient in most power splitters and power combiners provided in the AIU such that additional isolation switching is not needed in the AIU.

However, if additional isol; ion is needed from a failed receive or transmit module, fault-tolerant switching can be implemented in the AIU 308. This switching can be digitally controlled either via the AIU control bus or transmit control bus, or, if desired from overall global system considerations, this AIU switching can be controlled directly by the CNI controller via redundant CNI control/data bus connections.

The above discussion has assumed that the antennas are of single function or at least multiple functions that can be time-shared by the same receive or transmit channels. Futuristic antennas may combine multiple-CNI functions that must operate simultaneously, i.e., require separate channels. In this case the RF filter 408 may actually become a frequency demultiplexer (on receive) and frequency multiplexer (on transmit), with multiple output (and input) connections to additional receive and transmit channels, including separate front-end components like 412, 414, 416, etc., as well as separate common receive and transmit modules. An example is where a single antenna will service both VHF FM and VHF AM bands and where radios will simultaneously operate in each band. The filter 408 then becomes a diplexer 408 with two connections to the right of 408. One connection goes to a T/R duplexer (plus other components) for VHF radio and the other goes to a T/R duplexer (plus other components) for UHF radio.]

Figure 6A:
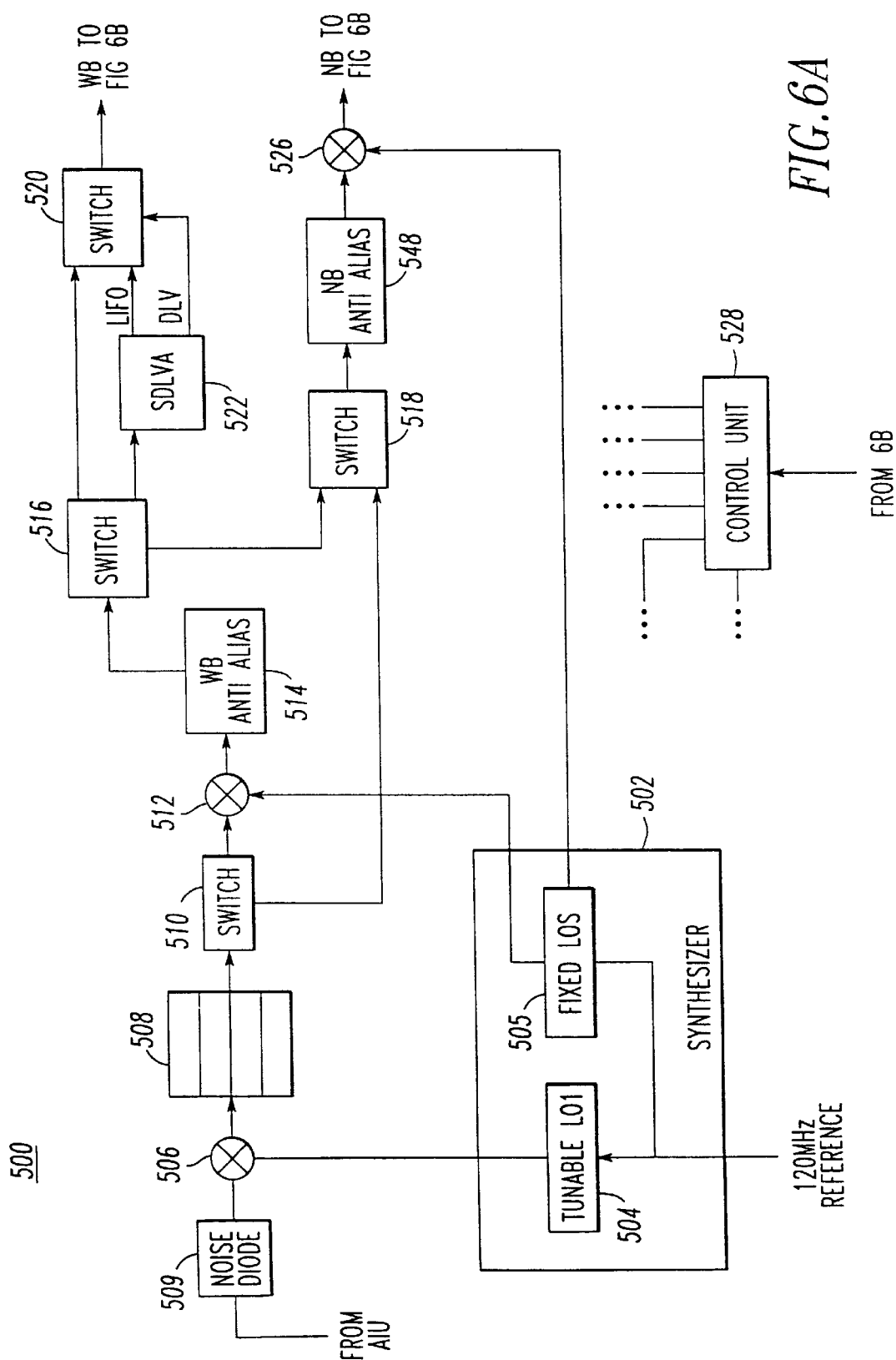
FIGS. 6A and 6B depict the components of a receiver module 106 in more detail.
Figure 6B:
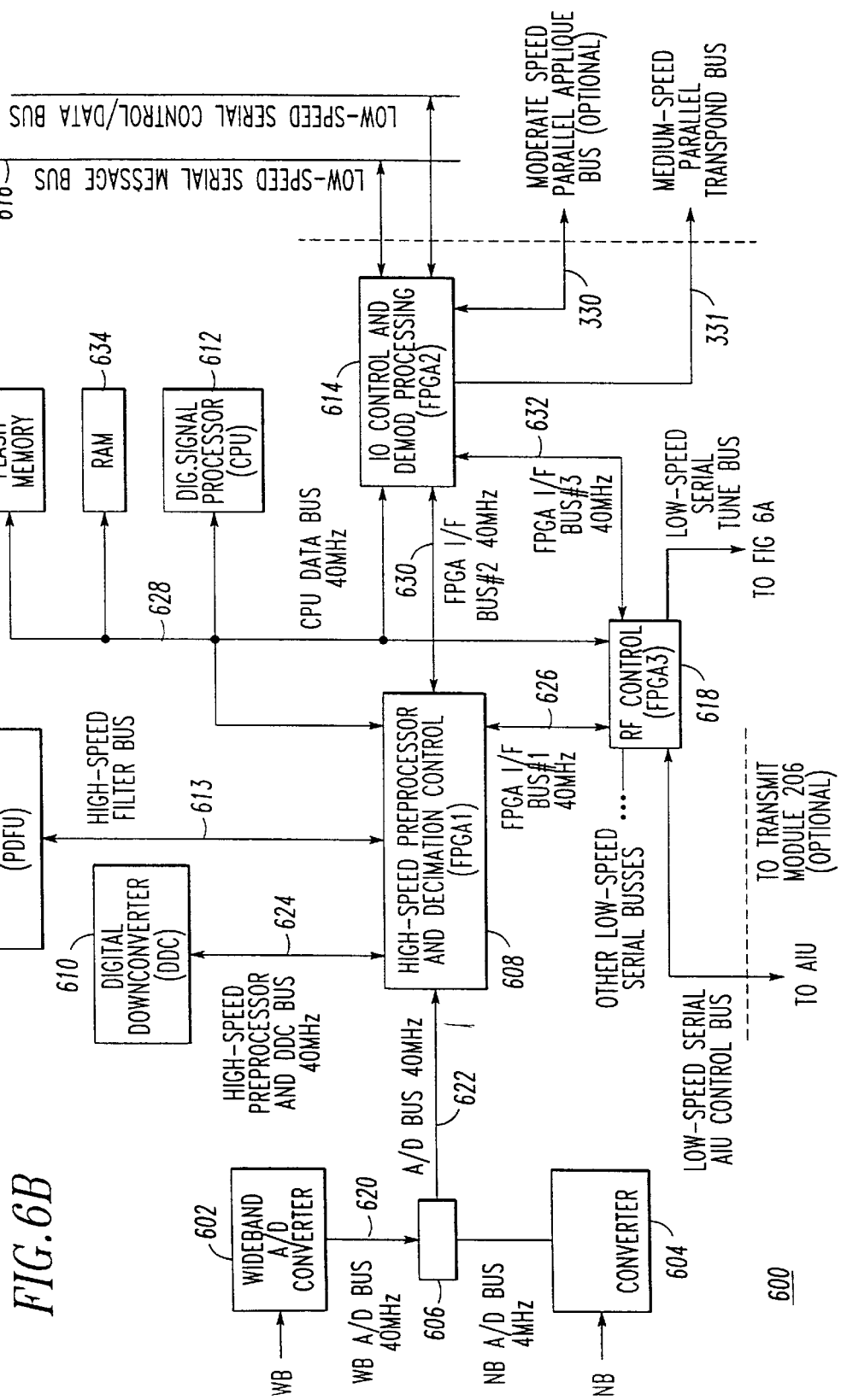

The programmable common receive module 106 which is illustrated in more detail in FIG. 6A (analog submodule 500) and FIG. 6B (digital submodule 600) can service a wide range of CNI functions in approximately the 1.5 MHZ to 2000 MHz region with an option to extend this region above to higher or lower down to frequencies using block conversion.

An important feature of the architecture of the receive module 106 is the partitioning of the system into analog 500 and digital 600 submodules that preferably correspond to different circuit boards with separate power/ground sources and that allows the noise producing digital circuits to be adequately isolated and shielded from the analog side components. For purposes such as fabrication, testing, etc., the analog and digital submodules in the same common receive module 106 (or in the same common transmit module 104) can be contained on the same circuit board but with analog and digital portions that are electrically isolated from each other, or each submodule can consist of multiple physically separate circuit boards that are properly connected. Moreover, the term "circuit board" is a general term that can also include other forms of containment such as "chips," application-specific integrated circuits [ASICs], monolithic hybrid packages [MHPs], etc. Also, major portions of each submodule can be combined in higher levels of integration. For example, many of the individual elements in digital submodule 600 (or in digital submodule 700) can be combined into a single element or "chip," or even the entire digital circuitry in each of these submodules can be consolidated into a single element for possible savings in size, cost and power dissipation. Regardless of the specific mechanical configuration, the analog and digital portions of the digital submodules 600 and 700 in the -following descriptions are electrically isolated from each other in order to prevent the relatively noisy digital circuits from created unwanted extraneous signals within the sensitive analog circuits.

The analog receiver submodule 500 (see FIG. 6A) typically receives an RF signal from the AIU 308. The submodule 500 includes a frequency synthesizer 502 that produces internal oscillator reference signals from an input reference oscillator signal which internal reference signals are used for generating a tunable local oscillator signal in a tunable local oscillator unit 504 and fixed local oscillator signals produced by a fixed local oscillator unit 505. The tuned local oscillator signal is provided to a first analog mixer 506 that typically provides the first frequency translation of the RF signal. The produced analog intermediate frequency signal is provided to a switchable bandpass filter bank 508 that includes several bandpass filters. Four such filters usually provide sufficient rejection, in the first IF stage, of the RF interference that is received along with the signal of interest for a wide range of CNI applications. In addition to interference rejection, these filters reject local oscillator leakage through the mixer 506 as well as suppress images, spurious mixer products, harmonics and other unwanted signals produced by received signals (including interference) reacting with the nonlinearties of the components preceding the mixer in the receive path.

The filtered intermediate signal can be routed through a switch 510 to a second mixer 512 that produces a further intermediate frequency signal. This second analog intermediate frequency signal is provided to the primary wideband anti-aliasing circuit 514 that is essentially a fixed bandwidth bandpass filter with a bandpass range of approximately 8 MHz and a center frequency of 30 MHz. The anti-aliased signal can either continue along the wideband signal path through switch 516 or be switched to switch 518 to traverse the remainder of the narrowband signal path in a parallel interconnect pathway to the digital submodule 600 of FIG. 6B. If the wideband path is selected the signal can be provided directly to the digital submodule 600 through switch 520 or can be modified, if necessary for instantaneous dynamic range considerations, by a sequential detection log video amplifier 522 which compresses the dynamic range of the wideband signal, for example, the IFF signal type. The amplifier 522 also outputs a limited IF output. The switch 520 has three inputs, one is a complete bypass of the log amplifier 522. This allows a signal containing amplitude, phase and frequency information to be passed to the digital submodule 600. One of the outputs of the amplifier 522 provides a compressed signal (DLV) that includes amplitude information and the other contains frequency and phase information. Typical wideband signals/functions include identify friend or foe (IFF); Position Location and Reporting System (PLRS); Air Traffic Control Radar Beacon System (ATCRBS); Mode Select (Mode S); Tactical Air Navigation (TACAN); Precision Distance Measuring Equipment (DME); Joint Tactical Information Distribution System (JTIDS); Global Positioning Satellite (GPS). The log amplifier 522 can be eliminated when a high dynamic range A/D converter of the appropriate sampling rate (40 MHz in this example) becomes cost effective. The wideband signal is produced at a common wideband intermediate frequency preferably centered at 30 MHz.

The narrowband path continues from switch 518 through a primary narrowband anti-aliasing circuit 524 which is also a bandpass filter with a bandwidth of approximately 0.4 MHz and a center frequency at 30 MHz to a third mixer 526 that produces a narrowband signal with a bandwidth of approximately 0.4 MHz at a common narrowband intermediate frequency, such as preferably centered at 1 MHz. Typical narrowband signals/functions include HF, VHF, and UHF of various voice and data modulations as well as personal communication services (PCS), airphone and SATCOM, and generally classified as communication functions, and VOR, ILS and normal DME and TACAN generally classified as navigation functions. A control unit 528 controls the various switches, etc. based on commands from the receiver digital submodule 600. The mixers 506, 512 and 526 allow the receiver 106 to up convert a received signal as well as down convert the signal. Additional details with respect to the analog submodule 500 can be found in the corresponding related receive module application previously mentioned. The two frequencies (WB and NB) are low enough so that a conventional A/D converter can perform sufficiently linear conversion allowing the remainder of the processing to be digital. By making the remainder of the processing digital instead of analog, information can be processed (filtered, fine tuned, demodulated, etc.) with much more flexibility and accurately.

The digital submodule 600 as illustrated in FIG. 6B includes a wideband analog-to-digital (A/D) converter 602 for the wideband analog signal preferably operating at a 40 MHz sample rate producing 8 bits per sample and a narrowband 604 A/D converter for the narrow band analog signal operating at a 4 MHz sample rate producing 14 bits per sample. Both converters are preferably high dynamic range converters which allow accurate sampling at the intermediate IF. Some embodiments may combine these two A/D converters into a single unit sampled at 40 MHz for example, and of sufficient dynamic range to handle both the wideband and nartowband radio functions, and perhaps even replace the SDLVA 522 as previously noted. The particular digital signal being used by the channel is selected by a switch 606 and provided to a high speed preprocessor and decimation control unit 608. The switch is a digitally controllable switch that it switches between the 14 output lines of the narrowband A/D 604 and the 8 output lines of the wideband A/D 602. The unit 608 can route the digital signal to a digital down converter 610 for further down conversion. The last stage of down conversion is performed digitally. The digital down conversion of the wideband signal is accomplished through harmonic sampling of the 30 MHz wideband signal by under sampling at a frequency of 40 MHz, to produce a 10 MHz band signal. For some applications the 10 MHz band signal may again be passed through the digital down converter 610 for additional frequency translation to lower frequency bands. The down converted signal can be provided to a digital signal processor 612, or FPGAs 608, 614 and possibly 618, for other specialized waveform processing. Once these operations are completed a low speed digital signal is provided by an input/output control unit 614 for output onto a system bus 616 coupled to the receive module 106. A control unit 618 performs the necessary configuration control of both the analog 500 and digital 600 submodules. The units 608, 610, 611, 612, 614 and 618 preferably operate at least at a 40 MHz operation rate allowing the wideband samples to be processed in real time. The units 608, 614 and 618 are preferably field programmable gate arrays (FPGAs) which allows the needed tasks to be performed at the required rate but also provides the flexibility of being firmware programmable for different functions. The provision of the units 612 and 618 allow control of the analog submodule 500 to be performed internally to the module 106. Also, programmable digital filter unit (PDFU) 611 can be employed to provide digital filtering independent of the filtering in DDC 610, which is tied to decimation rates, and to provide filtering more efficiently in hardware than can be provided by the other circuitry such as DSP 612 or the FPGAs 608, 614 or 618. Additional details with respect to the digital submodule 600 can be found in the corresponding related receive module application previously mentioned.

The digital submodule of the receiver 106 (as well as that of the transmitter 204) preferably includes nonvolatile flash ROM storage units 634 for storing the software and configuration data of those CNI functions which need to be executed in the channel, including those CNI functions that need to be time division multiplexed in a high speed fashion. The application programs are stored in nonvolatile flash memory 636 to avoid erasure during periods of zero or insufficient prime power. Also, the flash 636 also stores the FPGA configurations to be used during power up. During operation, the programs stored in flash 636 are transferred to RAM 634 where the programs can be executed in a faster manner.

The conventional digital I/O interface of the common receive module 106 is typically programmed for the appropriate bus interface from/to other elements within the integrated CNI suite. Interfaces with external equipment, such as application terminals, are handled either by programming these common module I/Os 614, or via a suitable external bus interface unit. Also not shown, but discussed in the related receive module application previously mentioned, are the I/O lines transceiver associated with FPGAs 614 and 618 to provide noise isolation via dual-rail (i.e., differential) connections.

Examples of digital processing internal to the receive module 106, as illustrated in FIG. 4, include generation of digital I/Q, frequency down conversion, decimation, filtering, phase, frequency and amplitude waveform demodulation, pulse width/position discrimination, synchronization (e.g., phase, symbol or frame), message decoding, T/MUX amplitude comparisons, comparisons, reply rate limiting, control of the RF/IF frequency conversion circuits (IF gain, receive channel, filter bandwidths, etc.), control of the AIU associated with the channel (resource switching, AGC and filter tuning, etc.) and management/configuration of the digital I/O.

In addition, the digital processing configures the receive module 106 as directed by the controller 302, performs module BIT and reports status to the controller 302, and may perform strobing for frequency hopping. Although sometimes performed elsewhere, such as in a CMP module, the receive module 106, via the digital signal processor 612, depending upon the processing power implemented, can perform error correction, message processing including reformatting, network functions, deinterleaving, processing of low-data rate speech algorithms, and digital formatting for various terminals such as displays, audio equipment and instruments. In fact, for many CNI functions such as Instrument Landing System (LOC, GS, MB) and many voice modes (e.g., for HF, VHF and UHF) the common receive module as well as its common transmit module counterpart can interface directly with application terminals such as instruments and audio stations.

The receive module 106, as illustrated in FIGS. 6A and 6B, is preferably comprised of a single module (a plug-in module for many applications) that receives RF signals from an AIU 308 or distribution network and outputs relatively low-speed serial digital data. Inside the receive module the RF signal, as discussed above, is translated in frequency through various IFs, digitally sampled and processed according to the CNI programmed configuration, and routed to the appropriate digital output. Containment of the major signal operations in a single unit greatly facilitates logistics, BIT/FIT and maintenance. All the high-speed processing (such as D/A conversion by 602 and 604, down conversion by 610, and decimation waveform and other processing by 612 and signal processing by 608 and 614) and major high-speed parallel interconnects are completely contained inside, thereby greatly simplifying backplane complexity, and reducing electromagnetic interference (EMI) to the rest of the system. The combination of the internal high-speed processing within and among the various processing elements (such as 602, 608, 610, 611, 612, 614, 618, 634 and 636) of the digital submodule 600 (as well as within and among the various elements in the other modules described herein for the overall radio system) is sometimes referred to herein as sampling rate synchronous control processing. For the example shown in FIG. 6B the high-speed parallel interconnections 622, 624, 626, 628, 630, and 632 run at 40 MHZ. (High-speed PDFU bus 613 is serial or parallel depending upon the type of programmable filter chosen.) One of the objects of this invention for a programmable multifunction radio system is to eliminate interconnections among modules for sampling rate synchronous control processing. The receive module design handles the internal EMI between the analog and digital circuitry using physically separate portions, shielding and isolation as previously discussed.

The digital and analog submodules of the receiver 106 (and the transmitter 204) are preferably implemented on separate circuit boards but could be otherwise implemented as previously explained. An electromagnetic shield or frame of a material, such as mu-metal or lower cost and weight aluminum is preferably provided between the boards. The A/D converter is necessarily at the ground potential of the analog submodule. But the interconnection between switch 606 and FPGAI 608 are differential for isolation. To provide further isolation, the boards preferably have separate power sources at different voltages and ground lines (different ground planes) to prevent noise and ground loop problems through the power supply. To prevent noise problems all digital signal interfaces with digital submodule 600 are differential (dual rail) signals.

As technology improves it is anticipated that the two A/D converters (602 and 604) of the receive module can be replaced by a dual mode A/D that can operate at both of the required rates, or a single A/D of the same rate can service both the wideband and narrowband functions that are desired as noted above. Also, the operation of any A/D converter includes various forms of A/D linearity or nonlinearity, and includes oversampling, Nyquist sampling and under sampling, sometimes referred to as harmonic sampling whereby the signal frequency range of interest is aliased (i.e., frequency translated) to a different, often lower, frequency range. In addition as technology improves it is anticipated that the D/A conversion can be done prior to the mixing stages 512 and 526.

Although not shown, common receive module 106 possesses a frequency reference analog input, and may also have various other analog external interfaces, for example, a reference input from another receive module operating in parallel on the same signal, e.g., for phase comparisons among receive channels and a reference output to another receive module operating in parallel on the same signal, e.g., for phase comparisons among receive channels. With proper internal configuration, the same analog interface can be employed to output the reference for phase comparisons, or to input the reference for phase comparisons. Other analog interfaces deemed appropriate, such as a direct input to one of the intermediate frequency stages, could also be included.

Figure 7A:
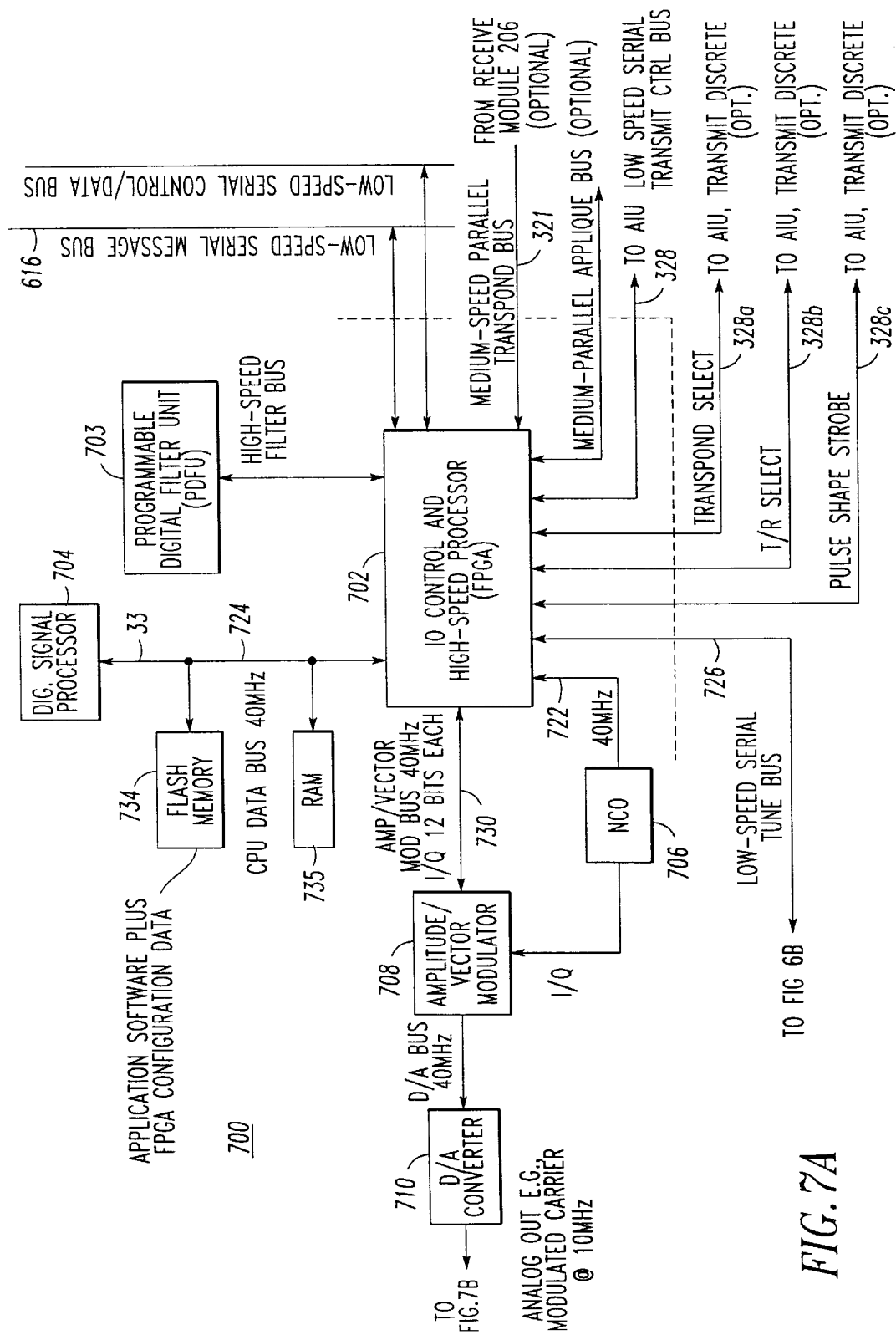
FIGS. 7A and 7B depict the components of a transmit module 204 in more detail.
Figure 7B:
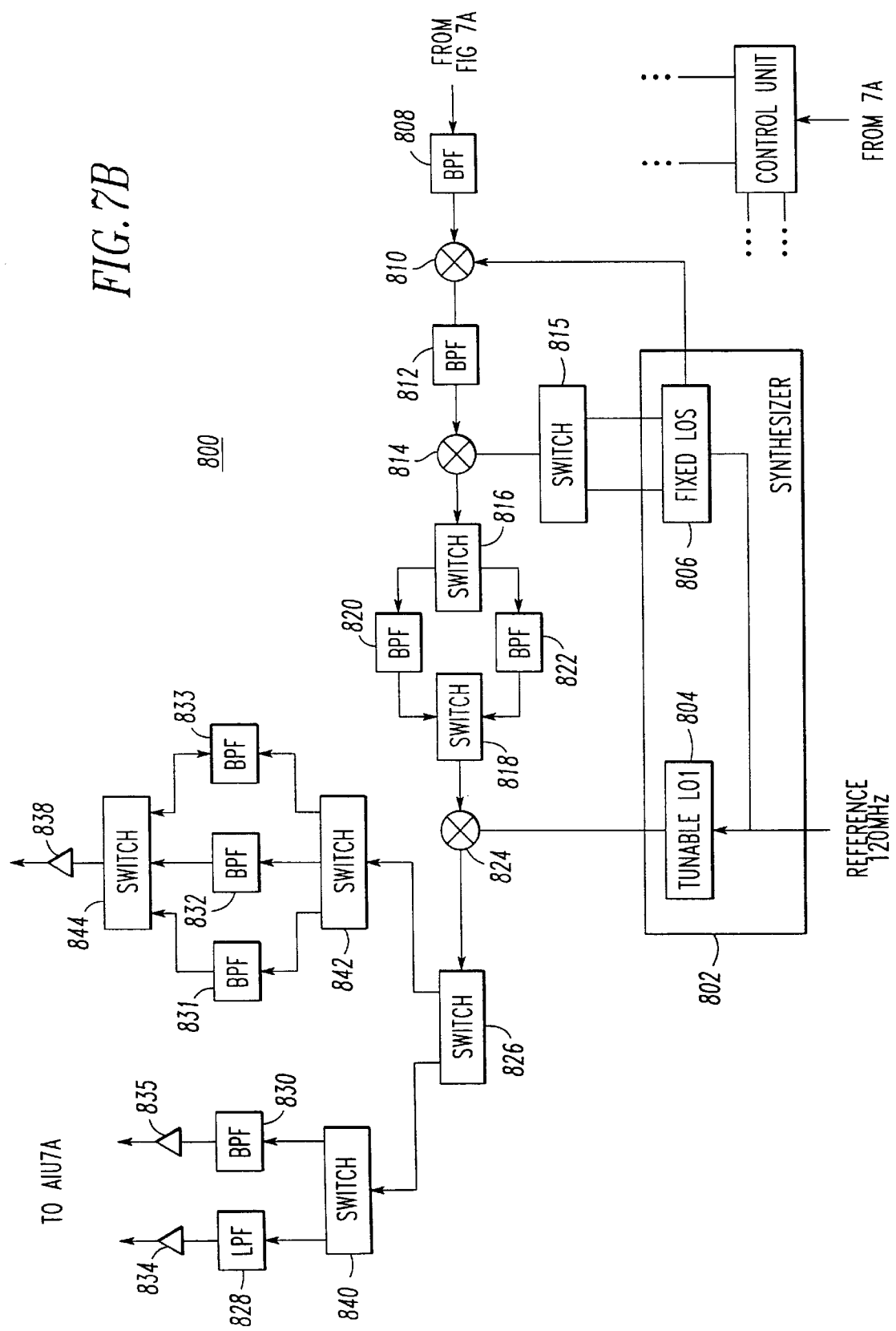

For CNI transmission, as previously discussed, relatively low-speed serial data messages corresponding to various CNI functions and carrying information from various terminals such as audio equipment, video equipment, sensors, computers, etc. are fed into the common transmit module 204 illustrated in more detail in FIG. 7A (digital submodule 700) and FIG. 7B (analog submodule 800). (Rare applications may require that relatively high-speed multi-bit processing such as LPI/LPD be performed on the received waveform before modulation. These applications use either an external applique module that is also used with the receive module as described above, or a special-purpose transmit module similar to the above special-purpose receive module.) The low speed data messages or digital information signal is digitally processed according to the CNI programmed configuration and converted to an analog signal in the digital submodule 700, and frequency translated to the proper RF frequency band within the approximate 2 MHz to 2000 MHZ region in the analog submodule 800, routed to the appropriate AIU 308 (or 104 as in FIGS. 1 and 2) where it undergoes power amplification and filtering, and is routed to the proper antenna for transmission. Like the receiver module 106, an important feature of the architecture of the transmit module 204 is the partitioning of the system into the digital 700 and analog 800 submodules that preferably correspond to different circuit boards and that allows the high frequency, but low power, noise producing digital circuits to be adequately isolated and shielded from the analog side components.

During the digital processing the information signal, which for a typical voice input is supplied serially at bit rate that can typically be approximately 80 K Bits/sec is supplied from the system bus 616 as illustrated in FIG. 7A to an input/output control and high-speed preprocessor unit 702 of the digital submodule 700 which, along with a digital signal processor 704 and/or FPGA 702, performs output sample interpolation. System bus 616 may operate at much higher rates, e.g., greater than 1 megabit per second. The voice input may then alternatively be sent in individual packets, with much higher internal bit rates for voice, and then reformatted to, e.g., 80 K Bits/sec within FPGA 702.) For example, when an input signal is provided of 10 bits at a sample rate of 8 KHz for a total serial bit rate of 80 Kbits per second about 1000 interpolated samples are provided between each input sample, to produce a smooth set of samples at 8 Mbits per second. This reduces the quantization errors caused by the transition between samples. When the signal is of the type that requires interpolation to reduce spurious signal responses, the present invention uses a technique of producing interpolated samples in which the last information signal sample is held at the sample value (i.e., zero-order hold) rather than performing a zero fill operation as typically occurs. This improves spurious performance with no penalty in computation speed. This type of processing is typically used where the modulation waveform is continuously changing such as AM or FM.

The unit 702 in addition to providing a frequency control signal to a numerically controlled digital oscillator 706 also controls the programmable transmit functions of the AIU 308 for the channel as well as the upconversion variables of the analog submodule 800.

The formatted and interpolated information signal is provided to an amplitude/vector modulator 708 where the signal is modulated onto a digital intermediate frequency signal preferably of 10 MHz produced by the oscillator 706. The modulated digital signal is supplied to a digital-to-analog (D/A) converter 710 where the digital signal is converted into an analog intermediate frequency (IF) signal of the frequency set forth above and preferably centered at preferably 10 MHz and provided to the analog submodule 800 of FIG. 7B. The D/A converter 710 operates, for example, at 40 MHz accepting 4 input samples for each cycle of the analog output signal. Other aspects of the digital submodule 700 such as storage of CNI programs in Flash 734 and RAM 735 are similar to the description of digital submodules 600 of common receive module 106. Also, additional details with respect to digital submodule 700 can be found in the corresponding related transmit module application previously mentioned.

Digital modulation directly to an IF signal allows benefits such as replacement of bulky analog circuitry at baseband and lower IFs with digital circuitry, which is not only more accurate and predictable than analog circuitry, digital filtering that is much more easily programmed for different center frequencies and bandwidths than the analog filters that would be needed, and ultra fine channel-tuning resolution. Additional details concerning the digital submodule 700 can be found in the corresponding related transmit module application previously mentioned.

The analog submodule 800 (FIG. 7B) includes a synthesizer 802, a tunable oscillator 804 and fixed oscillators 806 as in the analog submodule 500 of the common receiver module 106 and are preferably independent from those of the receiver. These components can be shared between the modules 106 and 204 especially when a transmit/receive pair or transceiver is included in a channel and is part of the signal/failure path such as when the receiver 106 and transmitter 204 function as a repeater. Although not shown, common transmit module 204 possesses a frequency reference analog input.

The analog IF signal from the digital submodule 700 utilizes an isolation transformer for immunity from digital noise within the analog circuits. The signal is applied to a bandpass filter 808, as illustrated in FIG. 7B, where the converted signal is made as clean as possible. This filter 808 can be a switched bandpass filter bank of filters for wideband and narrow band signals. The filtered analog signal is applied to a first mixer 810 where a second analog intermediate frequency signal is produced. This signal is filtered by a second bandpass filter 812 with a bandwidth of approximately 10 M Hz. This signal is mixed in a second mixer 814 to produce a second intermediate frequency signal. The local oscillator signal provided to mixer 814 is selected by controlling switch 815. This switching allows the transmitter 204 to cover the output band of interest. This signal, depending on the frequency needed to satisfy spurious performance of the third mixer 824, where such spurious performance is also determined by the desired output frequency of mixer 824 in conjunction with the frequency of tunable oscillator 804 needed to produce this desired output frequency, is switched by switches 816 and 818 between bandpass filters 820 and 822 which are switched synchronously with changes in the switched local oscillator signals. This filtered signal is further upconverted by a third mixer 824 to produce the final RF signal. This is typically the last frequency translation of the transmit signal.

It should be noted that it is possible, with proper design, to achieve a savings in overall system hardware by combining all or part of the synthesizer 502 in the analog submodule 500 of the common receive module 106 with all or part of the synthesizer 802 in the analog submodule 800 of the common transmit module 204. The combined synthesizer could be housed in a separate module, an analog connection could be made between the common receive and common transmit modules, or a common receive module and common transmit module could be combined into a single unit such as might be required in small applications. When combining the synthesizer functionality in this manner, particularly the tunable portion of the synthesizer, radio operation might be limited either to half-duplex or to full duplex when the transmit and receive channels are always paired together such that a simple additional frequency offset or additional frequency conversion stage could provide the necessary frequency translation in both the common receive and common transmit modules. Transponder functionality, although not strictly full-duplex but requiring receive-to-transmit times that are likely too short for most synthesizer switching times, might also be effected. On the other hand, independent synthesizer tuning in the common receive modules and the common transmit modules permits complete tuning flexibility for any type of half-duplex, full-duplex or transponder radio function.

The RF signal is switched by a combination of switches 826, 840, 842 and 844 to either a lowpass filters 828 and 830 or one of four bandpass filters 831, 832 or 833, and ultimately to linear amplifiers 834, 835 and 838, depending upon the output frequency range. The division of the band of frequencies 824 to 1880 MHZ through amplifier 838 into subbands by the bandpass filters 831, 832 and 833 is necessary to separate the spurious signals that are generated in previous stages from the signal of interest in this path and to reduce the level of such spurious signals. The amplifiers 834, 835 and 838 are preferably operated well within their linear operating range so that, for example, a 10 watt amplifier is producing an output signal on the order of several milliwatts. Alternate embodiments may also be preferred whereby the elements following mixer 824 are eliminated from common transmit module 204 and only the elements needed for the radio functions serviced by the subsequent AIUs are placed within those AIUs. For example, if the common transmit module 204 is connected to an AIU providing radio service in the 1.5–88 MHZ frequency range, only LPF 828 and amplifier 834 need be located in said AIU.

The RF signal is provided to the antenna interface module (AIU) for the particular channel where the signal can be amplified to a power level which might be as low as 1–5 watts or as high as 1000 watts or even greater. The bandpass filters 812, 820, 822, 830, 831 and 832 can be relatively wideband since they are provided mainly to filter out harmonic and other out-of-band interference created as a result of the frequency translations performed during IF conversion to the carrier frequency. The bandpass filters 830, 831, and 833 and low pass filter 828 cover the transmit frequency bands of interest with 828 having a range slightly greater than 0–88 MHZ, 830 a range slightly greater than 88–447 MHZ, 831 a range slightly greater than 824–1150 MHZ, 832 a range slightly greater than 1150–1660 MHZ and 833 a range slightly greater than 1660–1880 MHZ.

The outputs of the amplifiers 834, 835 and 838 can be coupled together as a single output to the designated AIU 308, however, it is preferable that the outputs be kept separate either because only one of them is used in a given application or because the outputs are routed to different AIUs, each operation in a different frequency band. The outputs can also be hardwired to the appropriate inputs of the AIU 308 or other AIUs. This would allow switching between different band functions without having to control an intermediate switch in the AIU 308. For example, one output could be hardwired to a satellite communication antenna and another to the HF antenna. A switch between these functions could then be performed by changing the function of the transmitter 204 and no switch need be provided in the AIU 308. Additional details concerning the analog submodule 800 can be found in the corresponding related transmit module application previously mentioned.

Bus interfaces including bus isolation between the common transmit module 204 and the elements within the integrated communication, navigation and identification (CNI) suite are similar to those of the common receive module 106 discussed previously and are also discussed in the related transmit module application previously mentioned.

Examples of digital processing internal to the digital transmit submodule 700 include control of the RF/IF frequency conversion circuits, transmit frequency, filter selection, etc.), management/configuration of the digital I/O, interpolation/smoothing, digitized phase, frequency and amplitude waveform generation, vector modulation, antenna diversity decision making for transponder functions, and power amplifier control. In addition, the digital circuitry configures the transmit module as directed by the controller 302, performs module BIT and reports status to the controller 302, and can perform timing for frequency hopping. Although perhaps performed prior to the transmit module 204 in CMP module as discussed below, and depending upon the processing power implemented, the transmit module 204 processing can perform channel coding, message processing including reformatting for transmission, network formatting, interleaving, and formatting for various terminals, such as displays.

Analog processing functions performed by the analog submodule 800 of the common transmit module 204 include frequency tuning and frequency hopping.

Similar to the receive module 106, the logistics, BIT/FIT and maintenance facilitated because the transmit module 204 is preferably housed in a single plug-in unit that inputs low-speed serial digital data and outputs RF. Also, similar to the receive module 106, all the high-speed processing and major parallel interconnects are completely contained inside the module 204 to simplify the backplane, and to reduce EMI to the rest of the system. The transmit module 204 is also designed to handle the internal EMI between the analog and digital circuitry in a manner like that of the receiver.

Like the receive module 106, the transmit module 204 services communication, navigation and identification (CNI) functions over a correspondingly wide frequency band. The transmit module 204 is only needed for functions that require transmission, such as voice or data communication, transponders or interrogators. Functions that are receive-only like ILS, VOR or GPS would not, of course, employ a transmit module 204.

Note that with a suitable interconnection between the receive module 106 and the transmit module 204, the tunable portion 504 of the receive module synthesizer 502 can be used to tune the transmit module 204 for half duplex operation and thus the synthesizer overhead can be reduced for small applications by eliminating the need for the tunable portion of the synthesizer in the transmit module.

Similar to the common receive module 106, it may be necessary to add processing power to the common transmit module 204 to perform relatively high-speed multi-bit processing (such as LPI/LPD) on the transmitted waveform before modulation. In this case either an applique module 310 or a special-purpose transmit module performs such processing. This special-purpose transmit module would likely be somewhat larger than a common transmit module 204 to house the additional processing. However, even this special-purpose transmit module would possess the analog and digital circuits that are found within the common transmit module 204. Also, as the size and cost of digital processing continues to decrease, it may be practical to perform the additional special purpose processing within common transmit modules 204 with acceptable size and cost overhead.

The provision of separate synthesizers in each of the transmit 204 and receive 106 modules allows a channel to operate in a full duplex mode. This also allows the modules 106 and 204 to have complete and full independence from each other. It also eliminates the routing of synthesizer signals between receive and transmit modules which complicate the interconnections and gives rise to electromagnetic interference, particularly in the receive and transmit RF and IF bands of interest.

As can be seen from the above discussion the common receive modules 106 (see FIG. 1) and common transmit modules 204 (see FIG. 2) form the heart of the invention architecture. These modules are common to a wide variety of CNI functions, i.e., they can be programmed to provide much of the signal processing functionality as indicated in FIG. 4 for a wide variety of CNI radio functions. In order to realize some of the benefits of the invention architecture, and because these (usually plug-in) modules are replicated many times both within a given multifunction radio application and among different applications, it is helpful that each of them meet performance requirements for a wide variety of CNI radio functions without incurring too high a size and cost overhead penalty when servicing only one function.

One way to reduce the size of these modules is to employ higher levels of integration inside them, although so doing may drive up the cost. But employing higher levels of integration can be applied to all types of architectures.

Another way that reduces both the size and cost of these modules is to use only the amount of internal hardware necessary to perform the functionality of the type listed in FIG. 4 while maintaining performance. One key issue for the receive module 106 is analog frequency translation from the approximate 2 MHZ to 2000 MHZ range to an output analog IF frequency that can be sampled by an analog-to-digital converter that meets bandwidth and instantaneous dynamic range requirements. Due to the wide range of requirements across many different types of CNI functions, the example analog portion 500 (see FIG. 6A) of the receive module 106 utilizes two analog IF outputs, one at 30 MHZ for wideband CNI functions (with bandwidths greater than approximately 400 KHz) and one at 1 MHZ for narrowband CNI functions (with bandwidths less than approximately 400 KHz). In addition, because of dynamic range/signal bandwidth consideration for some CNI functions, a sequential detection log video amplifier 522 (see FIG. 6A) with both detected log video and limited IF output may be switched into the last IF to increase instantaneous dynamic range (in amplitude or frequency/phase but not both at the same time) while maintaining signal bandwidth.

The analog portion (for example, 500 of FIG. 6A) of the receive module 106, accomplishes the above RF-to-IF conversion with minimal hardware while meeting receiver performance requirements in the presence of interference such as requirements related to signal distortion, harmonics/mixer products/images/etc., instantaneous bandwidth, oscillator phase noise (particularly LO1 504), noise figure, frequency switching speed, and interference rejection prior to analog-to-digital conversion. Hardware is minimized and performance is met with the functional implementation 500 along with a frequency plan that enables the receiver performance requirements to be met. A key portion of the frequency plan is the division of the approximate 2 MHZ to 2000 MHZ RF input range such that the tunable LO1 504 can frequency translate portions of this band to a first IF which, in turn, can be translated by succeeding fixed LOs 505 and IF stages until the desired IF outputs are reached. The following Table I gives an example of a preferred frequency plan that meets the receiver performance requirements for the first frequency translation via mixer 506. Note that other frequency combinations are possible but are not necessarily employed due to spurious products, phase noise or other considerations. Also, some of the hardware of the above type may obviously be removed from the receive module 106 and/or transmit module 204 if it is not required for some applications, for example, where it is only necessary to cover a portion of the 2–2000 MHZ frequency range or, for example, to service only narrowband radio functions and not wideband radio functions.

TABLE I

| Input Receive Bands (MHZ) | 1st IF (MHZ) | LO1 (MHZ) | /n | LO1 Step Size (KHz) |
|---|---|---|---|---|
| 1.5–133 | 271* | 272.5–404 | 8 | 62.5 |
| 69–139 | 271* | 132–202 | 16 | 31.25 |
| 97–132 | 31 | 66–101 | 32 | 15.625 (Optional) |
| 101–171 | 31 | 132–202 | 16 | 31.25 |
| 163–233 | 31 | 132–202 | 16 | 31.25 |
| 233–373 | 31 | 264–404 | 8 | 62.5 |
| 295–405 | 31 | 264–404 | 8 | 62.5 |
| 400–547 | 270** | 670–817 | 4 | 125.0 |
| 545–675 | 271* | 274–404 | 8 | 62.5 |
| 786–1330 | 270** | 1056–1616 | 2 | 250.0 |
| 1330–1886 | 270** | 1056–1616 | 2 | 250.0 |
| 1841–2961 | 271* | 2112–3232 | 1 | 500.0 (Optional) |
| 2383–3503 | 271* | 2112–3232 | 1 | 500.0 (Optional) |

*270 IF also possible
**271 IF also possible

With a proper choice of the first mixer 506 other combinations of available LO1 tuning range and 1st IFs permit full coverage over an input receive range of 1.5–3539 MHZ albeit with perhaps reduced spurious performance at some frequencies. Also, changing the undivided (i.e., n=1) step size of tunable LO1 to 400 KHz or 200 KHz permits the center of the first IF to fall exactly in the center of most channels in the comm hands (i.e., below 400 MHz) which, in turn, permits finer selectivity in the first IF filters which need not add additional bandwidth to account for the step size granularity of LO1.

These various first IFs are subsequently translated in frequency via mixers 512 and 526. The choice of subsequent IFs and IF paths is dependent upon the CNI function being processed.

With regard to the transmit module 204 (see FIG. 2), it is important that the digital-to-analog converter (DAC) 710 (see FIG. 7A) on the digital portion of the module have sufficient bandwidth (i.e., high enough sampling rate) for the widest band CNI functions, and have sufficient amplitude resolution for low harmonic content to meet transmitted purity of emission requirements in conjunction with the subsequent filtering in the analog portion 800 of the transmit module 204. Also with regard to purity of emissions there are also DAC considerations of sampling rate relative to digitized output frequency such that harmronics generated by the DAC process in various portions of the ultimate RF output range can be sufficiently attenuated by various filters, primarily bandpass filter 808, in the analog portion 800. These bandwidth and purity of emission considerations help determine the digitized output frequency of DAC 710.

Once the DAC 710 output frequency is determined, an analog portion (800, for example) of the transmit module 204, accomplishes the required IF-to-RF conversion with minimal hardware while meeting transmit performance requirements such as requirements related to signal distortion, harmonics/mixer products/etc., instantaneous bandwidth, oscillator phase noise (particularly LO 0 804), and frequency switching speed. Hardware is minimized and performance is met with the functional implementation, such as analog portion 800, along with a frequency plan that enables the receiver performance requirements to be met. Several iterations of the frequency plan subject to the above performance considerations are likely necessary. The following Table II gives a viable frequency plan which, when used in conjunction with analog portion 800, satisfies transmit performance requirements for a wide variety of CNI functions in the approximate 2 MHZ to 2000 MHZ frequency range. It is noted that to further reduce cost of the invention architecture, the tunable portion of synthesizer 802 in transmit module 204 can be made identical to the tunable portion 504 of synthesizer 502 in receive module 106.

TABLE II

| IF (MHZ) | RF (MHZ) | LO1 (MHZ) | Div Ratio | Tunable Portion (e.g., Phase-locked loops) |
|---|---|---|---|---|
| 410 | 1.5–88 | 408.5–322 | x8 | 3268–2576 Lowside |
| 890 | 88–447 | 978–1337 | x2 | 1956–2674 Highside |
| 410 | 824–1150 | 1234–1560 | x2 | 2468–3120 Highside |
| 890 | 1150–1660 | 2040–2550 | x1 | 2040–2550 Highside |
| 410 | 1660–1880 | 2070–2290 | x1 | 2070–2290 Highside |

With a proper choice of mixer 824, other combinations of available LO1 tuning range and final Ifs permit coverage beyond 3500 MHz, albeit with reduced spurious performance at some frequencies.

To minimize signal distortion at the output of analog portion 800 across the approximate 2 MHZ to 2000 MHZ output frequency range, and yet supply sufficient drive to the subsequent AIU (such as AIU 104) it may be necessary to break the output frequency range into separate bands that each employ output amplifiers of sufficient linearity yet acceptable low cost, size and power dissipation.

Note that the above descriptions of common receive module 106 and common transmit module 204 relate to those particular types of internal embodiments, and that the radio architecture disclosed herein applies to other embodiments that provide the required functionality between RF and a digital bit stream in a single unit.

A string of elements comprising a channel (e.g., antenna, antenna interface units (AIUs), common receive or common transmit module and perhaps CMP modules, INFOSEC modules and/or applique modules) can also service multiple channels in some cases. One case is when multiple radio functions, each associated with a different radio frequency carrier or channel, are time multiplexed such as the example described later for time multiplexing the localizer, glideslope and marker beacon radio functions for instrument landing systems. Another case is when multiple radio functions or channels associated with different radio frequencies are contiguous in frequency or are frequency multiplexed such that they all pass through the instantaneous bandwidth of an antenna, AIU and common receive or transmit module, such that the multiple radio functions can be processed by the above elements. Another case is when multiple channels associated with the same frequency region are code-division multiplexed into multiple channels such that the channels can be processed by the above elements. An example of this last case is a global positioning system (GPS) receiver where RF carriers at the same (or closely spaced) frequencies are modulated with different (usually orthogonal) spread spectrum codes. The digital submodule 600, primarily via the FPGAs, is configured via programming to simultaneously correlate the different codes in order to determine GPS positioning (and time) information totally within the digital submodule 600. Relatively low-speed positioning data can then be passed to application terminals via a control/data or message bus.

Channelized message processor (CMP) modules 312 and 316 (see FIGS. 3 and 4) perform CNI channel processing on the digital information signal that is not performed by a common receive module 106 or common transmit module 204. Such processors are general purpose high speed conventional processors that ideally can be programmed to service a wide variety of CNI functions, any one of which may be assigned to the channel. For receive-only CNI functions a CMP module is connected directly to a common receive module 106. Since signal demodulation is performed in the common receive module 106, the interconnection between the common receive module 106 and the CMP is preferably a relatively low speed serial bit stream. However, because the processing requirements associated with most receive-only CNI functions, such as Instrument Landing System (Localizer, Glideslope, Marker Beacon) and commercial GPS, are modest, such processing is usually performed in the common receive modules 106 and there is no need for an additional CMP module.

If the CNI function being serviced by the channel has a transmit capability, a CMP module may also be connected directly to a common transmit module 204 (also via a low speed serial interconnect). If both the common receive module 106 and common transmit module 204 each have their own associated CMP modules, full-duplex capability is achieved. However, if the CNI function is half-duplex, as are most transmit/receive (T/R) CNI functions, a single CMP module can service both a common receive module 106 and a common transmit module 204.

Since many CNI functions do not require the additional message processing power a CMP module affords, the overhead penalty for placing channelized message processing inside every common receive and transmit module may be excessive at this point in time and is not preferred. Moreover, for the many half-duplex CNI functions that exist, it is often easier to share channelized message processing between receive 106 and transmit 204 common modules if such CMP processing is housed in a separate module. However, because the processing power of digital circuitry per unit size and cost continues to increase rapidly with time, each future model of common receive 106 and transmit 204 modules can dedicate more channelized message processing to each receive 106 and transmit 204 module, while still retaining processing compatibility with those CNI functions that do not require CMP processing.

The type of processing that can be performed in a CMP module 312 or 316 rather than in a common receive or transmit module includes: synchronization, channel coding/decoding, message coding/decoding, network processing of various types, deinterleaving and interleaving, processing of low-data rate speech algorithms, and formatting for various terminals such as displays. Other CMP functions include: algorithms to overcome frequency selective fading, atmospheric noise, interference; automatic link establishment, background acoustic noise reduction, ECCM management, and conference functions.

When the radio system includes information security (INFOSEC) requirements or features as discussed below, a red (i.e., secure) CMP module 316 (see FIGS. 3, 16, 17, 18, 20 and 32) can multiplex and demultiplex red information data words or packets, red control words or packets, and red status words or packets to/from the PDR system controller and data serial busses. Also, a black (i.e., non-secure) CMP module 312 can process multiple messages (e.g., in secure form and clear form) and route such messages to/from its associated transmit 204 and receive 106 common modules.

As more of the channelized message processing is housed in the common receive 106 and transmit 204 modules, the number of separate CMP modules will diminish. Conversely, if future processing requirements associated with a particular CNI channel ever escalates to the point where such processing cannot be handled within the common transmit 204 or receive 106 modules, a CMP module (for lower speed data processing) or an applique module 310 (for higher speed data processing) can always be added at a later date.

To minimize size and cost, channelized message processor (CMP) modules, rather than being of the general purpose type as previously mentioned, could be special purpose, for example only perform modem functions associated with a specific CNI function. Special-purpose CMP modules, i.e., "one-of-a-kind" modules, make the most sense when low-cost integrated circuits already exist to perform certain functions (e.g., Viterbi coding or network protocols).

When the processing required for a specific function (such as LPI/LPD processing) is extremely high speed, such that high-speed, parallel bit stream processing (such as LPI/LPD processing) is required before waveform demodulation in an applique module, two options are available: (1) To minimize the lengths of high speed busses external to the modules (e.g., on a system backplane), such processing can be placed in an "applique" module adjacent to the associated common receive and transmit modules; (2) To eliminate high speed busses external to the modules the high-speed applique function can be placed inside special receive and transmit modules, at the cost of a module that is somewhat larger (usually in pi but not footprint). No matter whether applique processing is placed in a separate module or in contained within a receive or transmit module, such processing can be made programmable by downloading programs or parameter data from an external unit, similar to downloading programs to common receive and transmit modules. Such programming is useful for LPI/LPD applications, where it is desirable to change LPI/LPD mode or parameters under operational conditions.

Finally, the special receive and transmit modules that contain additional channelized message processing mentioned above would still be able to service all CNI functions, and could therefore be used to provide spares to all receive 106 and transmit 204 common modules at a minimal increase in overall system size/weight/cost overhead. Regardless whether additional processing power is placed within CMP modules or within the common modules (if cost/size/power consumption permits), the architecture of the present invention can easily scale processing power on a channelized basis.

Trends in processing power in the future will likely permit most CMP modules to be programmed to provide most any channelized message processing function, and thus eliminate the reliance on special-purpose CMPs. System scaling will be straightforward with these common CMP modules. The architecture of the present invention permits insertion of CMP units when needed. When CMP modules are fully programmable to handle most message processing functions, the programmable common channel architecture and functional subdivision within each channel is preserved.

Some of the more sophisticated functions (and perhaps many of the Comm functions for certain military applications) require processing additional to that which the common receive and transmit modules can provide. If the additional processing can be performed on relatively low speed (usually serial) data, CMP (and perhaps INFOSEC) modules are added in the channels that require the processing. For example, for some of the channels shown in FIG. 23, CMP modules (not shown) can be inserted between the common receive or transmit modules and the control/data and digital audio busses. Also, in the rare cases a channel requires additional processing at a relatively high rate, an applique module as described elsewhere can be added to each channel that needs it. Nonetheless, regardless whether a channel contains CMP modules, applique modules or neither of these additional modules, each channel is normally connected via hardwired modules between the RF input to the common receive module, through the applique or CMP module if included, to the relatively low-speed, (usually) serial data output, where the output is either the output of a common receive module or of a CMP module. (For transmit, the path is from a low-speed serial data input through a CMP module to a transmit module and to the transmit module's RF output.) The connection is hardwired in the sense that none of the circuity within each module is used in series with circuitry in another module of the same type.

In fact, in the hardware string through common receive or transmit modules, an applique module would likely always be hardwired to a common receive or transmit module in the sense that an applique module assigned to a common receive or transmit module would not be switched in to work with a common receive or transmit module in another channel. Moreover, CMP modules would almost always be hardwired to the common modules in the sense that a CMP module assigned to a common receive or transmit module would not be assigned (i.e., connected) to work with a common receive or transmit module in another channel, although, with regard to CMP modules, the present invention allows for this latter possibility in our architecture where this infrequently-used connectivity may be desirable for reasons of additional system availability or for some other reason. (For example, if a common receive module fails in one channel and a CMP module fails in another channel a working common receive module in one channel could be operated with the working CMP module in the other channel. Another example is where different types of specific CMP modules are used because of low cost, and they are switched as needed to operate with a single common receive or transmit module.) The assignment of various common receive or transmit modules with various CMP modules would be implemented, for example, either by separate serial busses connected the various modules or by placing multiple modules of the same type on a common bus. In cross-switching CMP modules the architecture takes on some of the characteristics of the cross-channel approach. It is only used in rare system applications and not routinely in every application. Unlike prior art cross-channel programmable radios, the cross-assignment occurs only on relatively low-speed serial data, and the architecture provides common receive and transmit modules that provide the functionality in a hardwired module that enables inputs and outputs for the signal or information path to consist of only RF and usually relatively low-speed serial data.

Also, because some channels contain CMP modules and other channels do not, it would seem the invention is compromising the goal of common channels that can be programmed for every CNI function accommodated by the system. But remember that our purpose is the minimum size, weight and cost for the overall multifunction radio system, and our architecture is flexible enough to achieve this goal. This means the invention only provides the extra CMP modules where they are needed. When configuring any new system each channel comprised of common modules (and perhaps CMP modules) will be assigned (i.e., connected) to a limited number of antenna inputs (or equivalent inputs such as cables) associated with a limited number of CNI radio functions. For example, refer to FIG. 23 where a group of receive and transmit modules always service HF, VHF, and UHF communication functions. Similarly a single common receive module always services VOR, ILS, and ADF. Also, this same receive module services TACAN through the shared receiver path connecting the Nav and Xpond/TACAN AIUs. If certain HF, VHF or UHF Comm modes require additional channelized message processing, CMP modules could be added between the common modules 2320, 2322, 2324 and the digital audio busses.

Because every module in every channel is not connected to every antenna as previously explained, there is no need to provide CMP modules in the channels that are connected to antennas for CNI functions that do not require CMP modules. That is, the present invention can optimally scale processing power among and within channels.

However, any channel, whether containing a CMP module or not, may still service multiple antennas, (i.e., multiple CNI functions). In the module interconnection scheme during the system design phase the present invention groups the channels into those without CMP modules that are connected to multiple antennas/CNI functions that do not require CMP modules, and into channels with CMP modules that are connected to multiple antennas/CNI functions that require the extra processing. And if because of overall system considerations (e.g., size and cost) it proves beneficial to make some the CMP modules special-purpose with available integrated circuits for a specific CNI function or functions, the present invention hard wires the system such that these special-purpose CMP modules are only in the path connected to the antenna associated with the particular CNI function.

Moreover, when redundant (spare) channels that can be programmed for many CNI functions are required for a particular application, the present invention provides different options. One or more "full-up" programmable channels can be provided with common receive or transmit modules plus programmable CMP modules that would service all CNI functions including those that do not require CMP functionality. CMP modules are programmed similar to the programming of common receive and transmit modules, i.e., by downloading programs from an external unit, which may be the system (CNI) controller or an external test bench. This full-up channel would have connectivity to any antenna/CNI function. The present invention allows provision of one or more spare channels without CMP modules and one or more programmable channels with CMP modules and grouping these two types of spare channels with the primary channel groups of the two types discussed above.

Figure 22A:
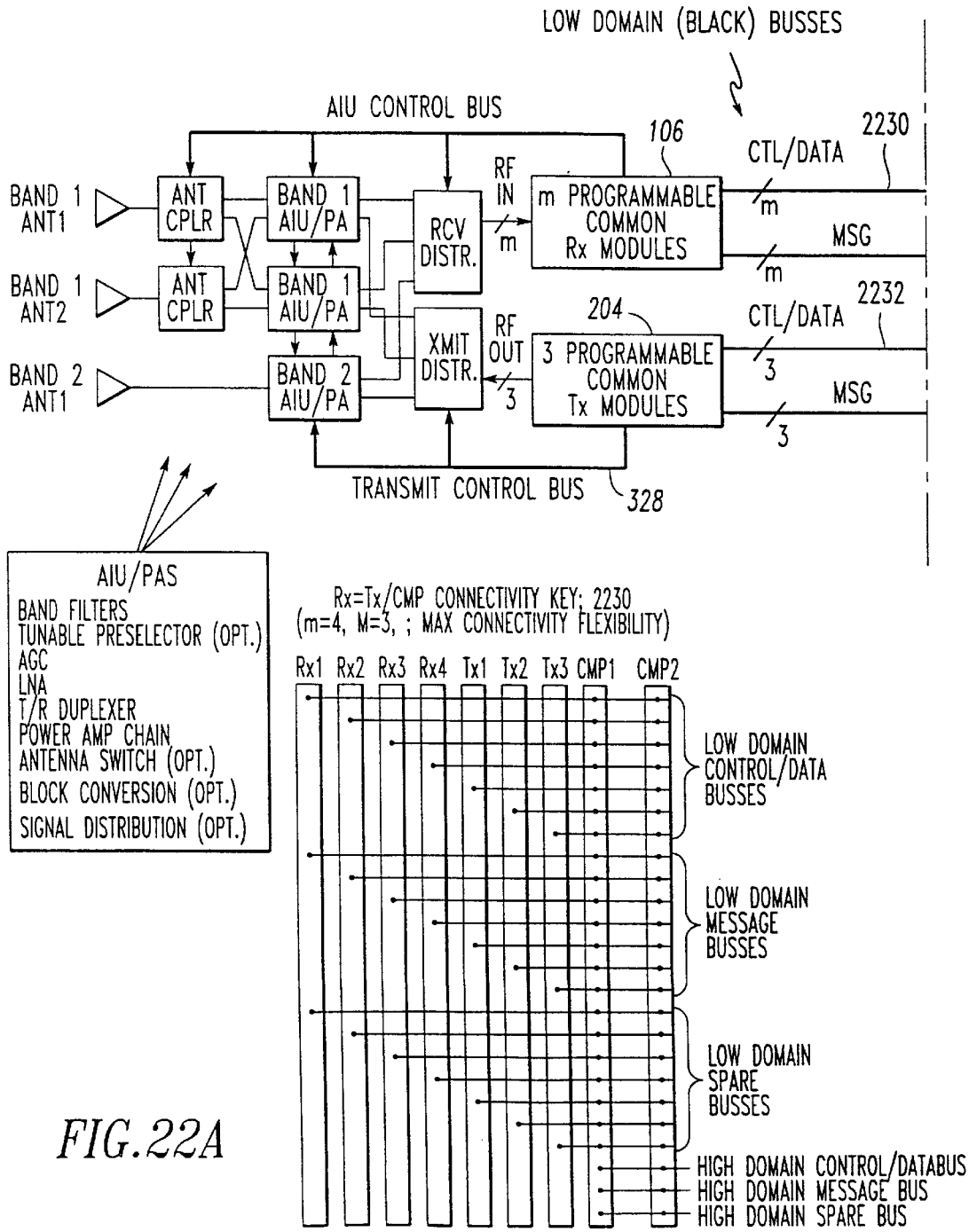
FIG. 22 depicts a multiband transceiver using multiple modules with information security modules added.
Figure 22B:
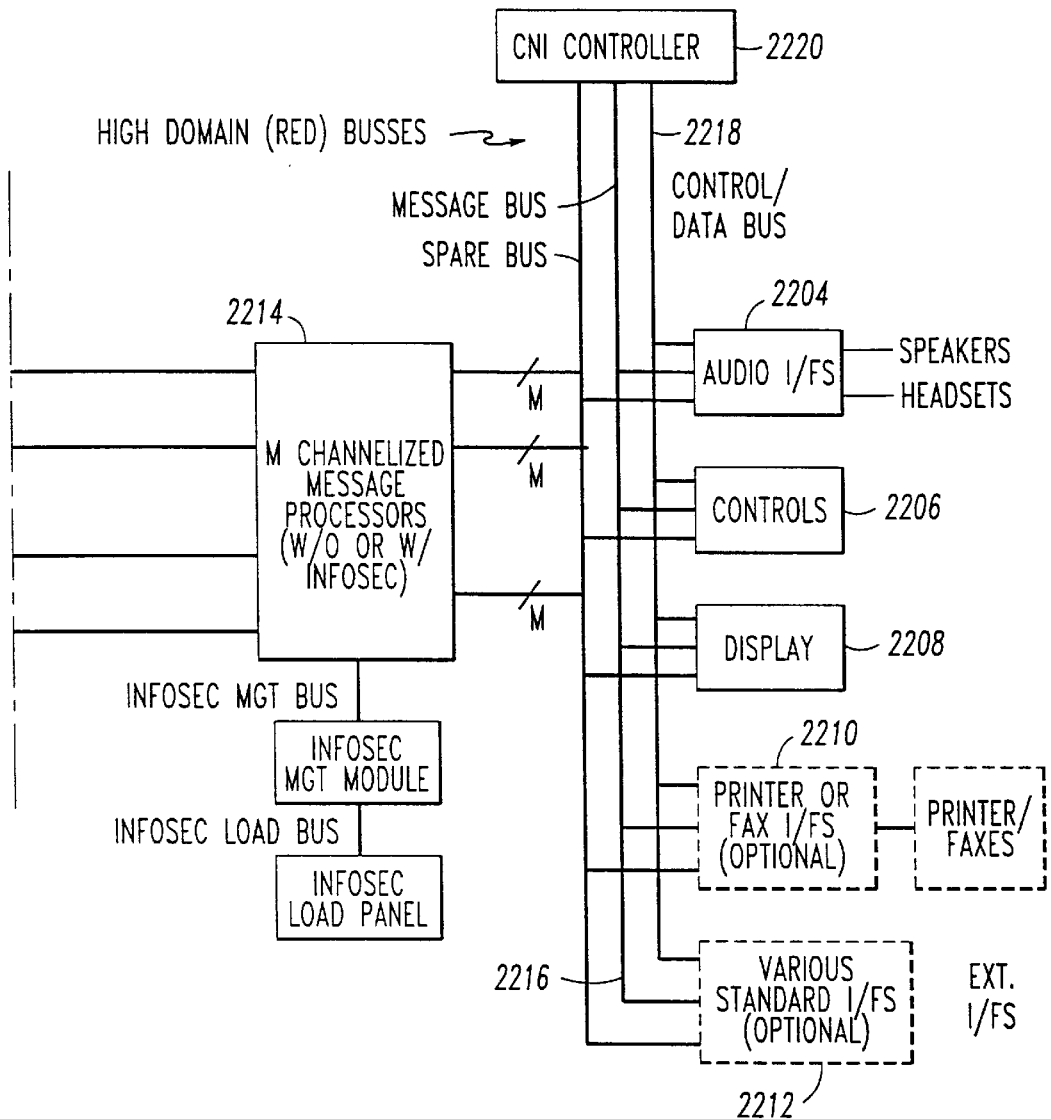

Also, INFOSEC/CMP modules plus multiple bus tap points similar to the connectivity discussion related to FIG. 22 can cross-switch INFOSEC/CMP elements with various common receive or transmit modules for redundancy; however, the elements that are cross switched are not between various analog elements in the RF-to-IF converters, or between various digital elements that are often connected together by high-speed parallel busses of many bits. Analog switching takes place only at RF and not IF. Digital switching takes place only on relatively low speed, multidrop serial busses.

Although an information security (INFOSEC) module 314 (see FIG. 3) must satisfy important certification issues that preserve red/black integrity of secure communications, an INFOSEC module 314 can still be viewed as another CMP module in the channelized system architecture as previously suggested. That is, the INFOSEC module 314 is inserted between the black receiver/transmit resources and the red user resources of any particular channel as shown in FIG. 3. Similar to CMP modules, an INFOSEC module 314 an be either special purpose or it can be programmable to provide various types of communication security (COMSEC) and transmission security (TRANSEC) functions. COMSEC is sometimes abbreviated as M-SEC; and TRANSEC is sometimes abbreviated as T-SEC.

The main INFOSEC advantage of the channelized architecture of the present invention relative to other approaches is that the appropriate INFOSEC function resides in a single hardware string (a channel) that is dedicated to a specific CNI function, which considerably simplifies the process that prevents INFOSEC corruption among CNI channels that share the same INFOSEC hardware.

The function of INFOSEC 314 modules is to perform COMSEC, for example, to encrypt red data into black data and pass it to the transmit 204 or CMP modules according to security certification rules; decrypt black data from the receive 106 or CMP modules and pass it to application terminals; pass control and clear red data to transmit 204 and receive 106 common modules via a trusted software interface; conversely pass status and clear data front the transmit 204 and receive 106 common modules to the CNI controller and application terminals; pass TRANSEC data to transmit and receive common modules (e.g., when performing frequency hopping or direct sequence spectral spreading); audit all data and control information; and issue warnings of improper INFOSEC operation.

When a separate red CMP module 316 is not provided, the INFOSEC modules 314 multiplex/demultiplex red data words, red control words and red status words to/from the PDR control and data serial busses. When a separate black CMP module 312 is not provided, INFOSEC modules 314 that process multiple messages (e.g., secure plus clear) then route such messages to/from the proper transmit and receive common modules.

Associated with-the INFOSEC modules 314 in a particular application is an INFOSEC management unit or module 318. This module 318 manages tasks that are particular to INFOSEC. However, the assignment of INFOSEC resources to various radio applications is provided by the CNI controller 302. The INFOSEC management module 318 among other things: Provides the fill point for INFOSEC (i.e., COMSEC and TRANSEC) keys, word of day, time of day, algorithms, etc. distributes keys to the INFOSEC modules, sometimes for a specified time period under the direction of the CNI controller; determines that a particular key is correctly passed to the appropriate module at the proper time; performs auditing for key accountability; performs key erasure; and performs INFOSEC BIT/FIT.

Similar to the insertion of CMP modules, separate INFOSEC modules 314 can be dedicated to a common receive or a common transmit module for full-duplex operation, or a single INFOSEC module 314 can service both a common receive 106 and a common transmit 204 module in half-duplex operation. INFOSEC modules can be programmed for various INFOSEC operations by several methods. One method is to embed specific security submodules (e.g., KY-58 or KG-84 for COMSEC and KGV-11 for TRANSEC) in the INFOSEC module and call them into operation under commands from the user via the system (CNI) controller. Another method is to embed units that can be programmed for various COMSEC or TRANSEC functions, such as the "INDITER" chip (which can be programmed for the KYV-5, KY-58 and KG-84 COMSEC functions) and to similarly activate then into operation via the system controller. It is also possible to download programs to the INFOSEC module 314 from a load panel 320 via the INFOSEC management module 318. This latter procedure offers flexibility for future modifications or additions but requires an extensive certification process from the appropriate government organization.

When all terminals in a given application have the same level of security, for example, among all crew members on a given platform or at a given site, the INFOSEC modules 314 embedded in the architecture usually suffice. However, if different terminals have different levels of security, then additional security modules (not part of the architecture) would be placed at the appropriate terminals.

The digital interface between an INFOSEC module and a transmit or receive common module is a relatively low speed, bi-directional serial bit stream bus (typically less than several MHz and, in many cases, much less than 1 MHz). Although control plus data traffic may be low enough such that one interface suffices for control and data (including digitized voice), a separate bus interface is normally used for control and for data. When TRANSEC is employed, a separate interface may be used for TRANSEC control of the transmit and receive common modules when performing frequency hopping or direct sequence spectral spreading, although for many CNI functions TRANSEC can employ the primary control bus interface. TRANSEC processing would normally be performed in a black CMP module 312. This interface could be asynchronous, self-clocking, or could include a separate clock reference line.

Whenever a CNI function requires INFOSEC it usually requires red processing. It is likely not practical to perform this red processing in a common receive 106 or transmit 204 module, nor practical to perform such processing in a separate CMP module directly connected to these common modules. A better approach is to perform red side channelized message processing in a separate red CMP module 316 (see FIG. 3). Similarly shown in the figure, black side channelized message processing would be performed in a separate black CMP module 312.

Because CNI functions requiring INFOSEC generally require considerable CNI channelized message processing, an optimum solution afforded by the channelized architecture of the present invention is simply to perform INFOSEC processing plus black and red channelized message processing in a single module as shown in FIG. 4. Furthermore, processing trends makes it feasible for this combination INFOSEC/CMP module to be programmable to satisfy the INFOSEC and channelized message processing requirements of many CNI functions. In this case the programmable common channel architecture of the present invention is preserved.

If the red/black CMP functions are combined with INFOSEC in the same module, the red/black channelized message processors can share the same processing. INFOSEC, however, would have its own processing. This affords the ultimate in flexibility. Dependent upon the CNI functional requirements for the channel, the total processing available to red and black channelized message processing can be partitioned between red and black.

The controller 302 (see FIGS. 3 and 4), also referred to as the CNI controller, manages the CNI radio system assets (the system units and busses) for the particular application. Because the signal, message, and INFOSEC processing is done on a channelized basis, the advantages of a simple control architecture via a centralized controller are realized without the need for high bandwidth control busses. Depending upon the system application this may include: initialization of system assets including INFOSEC; prioritizing, allocating, monitoring and reconfiguring CNI radio assets such as AIUs, receive, transmit, INFOSEC, and CMP modules; controlling system busses; interfacing with operator controls and displays, including push-to-talk (PTT) operation; performing channelized BIT and fault isolation.

For larger applications the controller 302 may: Perform automatic asset reconfiguration/management in the event of equipment failure; interface with application resources such as mission computers, sensors and controls; maintain the mission communication plan for mobile platforms via asset reconfiguration; and provide a gateway between the PDR busses and application data busses, such as MIL-STD-1553 and ARINC 429. These latter controller functions are likewise usually of relatively low rate.

Figure 25:
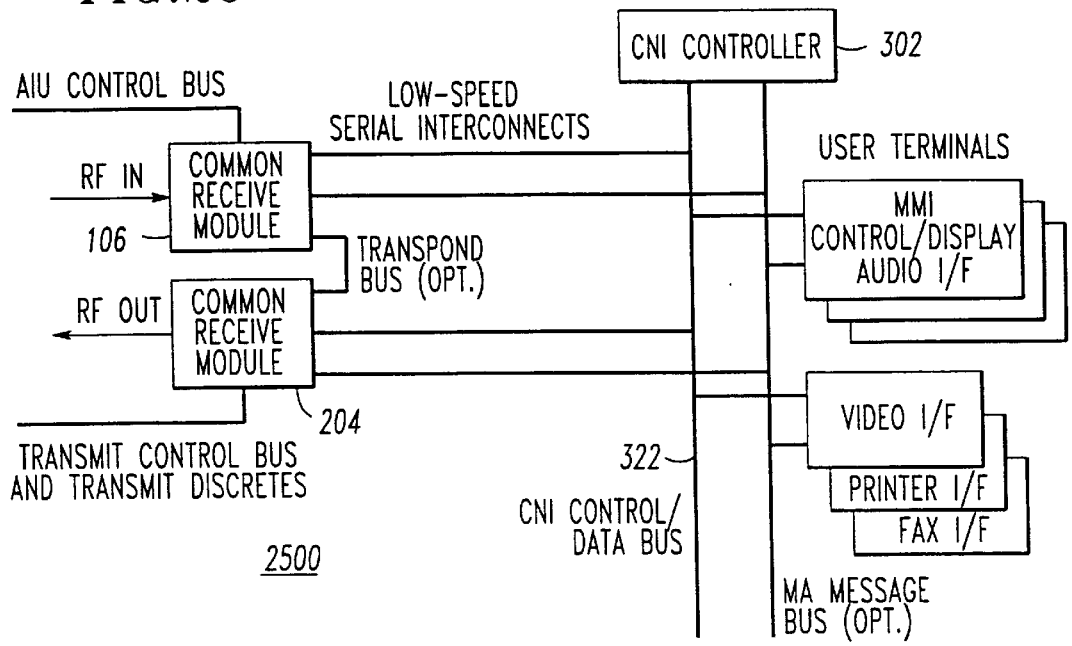
FIG. 25 illustrates bus connections for common receive and transmit modules.

Unlike other integrated programmable CNI systems (e.g., ICNIA), the architecture of the present invention simplifies overall control by making control conflicts basically a non-issue: control data passed between the CNI controller 302 and the various modules is relatively infrequent. Many CNI commands such as switch, filter and gain settings typically changed on a daily (or even longer) basis. Other data passed between the CNI controller 302 and control panels/displays may be on the order of minutes. Module commands of a higher rate are done either internally within modules (e.g., internal synchronization within common transmit 204 or receive 106 modules) or in the same channel (e.g., commands from the common receiver module to an AIU 104/308 via the AIU control bus for fast filter hopping or AGC). Placing the rate-intensive control of each channel totally within the fixed hardware string dedicated to the channel (and not cross-coupled among channels), considerably simplifies the control architecture and the design of the CNI controller 302. Control commands (tuning, switch selection, channel frequency selection, etc.) for the elements in a given channel without CMP or INFOSEC are normally routed from the system CNI controller (which may also be controlled by commands from a control panel, keyboard, computer, etc.) to the digital submodules in the common receive module or common transmit modules associated with the channel via a CNI control/data bus as shown in FIG. 25 (discussed in more detail later). Controls are then passed from the digital submodule to the analog submodule in the same common module via internal tune busses as shown in FIGS. 6B and 7A, and to the AIU in the associated channel via an AIU control bus for receive channels and via a transmit control bus for transmit channels. Commands from the system CNI controller to various elements in a channel when CMP modules and/or INFOSEC modules are employed in the channel are described later with reference to FIGS. 26 through 33.

The controller 302 (or associated) module preferably contains sufficient memory to house the software programs that are to be downloaded into the various CNI programmable common modules for the purpose of configuring the modules to service particular CNI functions. The actual memory type would depend upon the total amount of memory required and the downloading speed requirements. For example, ROM derivatives would likely be employed for small applications and a combination of hard disk and RAM or EPROM for very large or multiple processing applications. Programs for common receive 106, transmit 204 and 312, 316 CMP modules would reside in the CNI controller 302 but for most system applications the programs for programmable INFOSEC modules 314 would reside in the INFOSEC management module 318. The common receive and transmit modules (as well as other modules such as CMP modules that may implemented as programmable modules) can be programmed by downloading software (including configuration) programs from the CNI controller to these modules. However, in some cases, particularly where speed is an issue, programmable modules may host programs for multiple radio functions in memory that exists internal to the modules. In such cases the reprogramming control of the programmable module can be internal to the modules, for example, when several radio programs are automatically cycled through several internal programs. On the other hand, when programmable modules already host several radio programs in internal memory, a simple control command from the CNI controller (and perhaps initiated from a control panel, keyboard, computer, etc.) such as related to "HF single-sideband radio," or "VOR receiver," can trigger the appropriate program to be loaded and executed. In any case, we refer to such above programming, which can be performed under operational conditions, as "dynamic programming."

System clocks and reference signal devices might be contained within the controller 302 for some applications.

Where necessary, the controller 302 (with associated data processors) may perform processing that involves multiple CNI channels such as radio link analysis and comparisons in the presence of fading, interference and jamming; selective calling (SELCAL); and amplitude/phase comparisons among separate channels. Such data processing could be embedded within the controller module 302 or in separate data processor modules. Regardless, digital interconnects would still normally be low-speed serial. These tasks involve very minimal control decisions among channels so that re-certification of the entire system including the centralized controller whenever a CNI function is added or modified is primarily reduced to certification of the hardware string that is dedicated to the CNI function in question.

The architectural partitioning of the present invention permits much of the CNI controller 302 hardware and software (including data processor hardware and software) to be common among many different types of applications, particularly with proper controller sizing, and for this hardware and software to be scaled in a modular fashion to produce controllers for different applications.

The simplest form of digital interconnection in the architecture of the present invention is a conventional serial, non-time-multiplexed signal path between a receive or transmit channel and an application terminal such as a voice or data terminal. More complex interfaces that can be used include conventional time-multiplex serial busses. For the most part, the conventional bus I/O circuitry that provides the appropriate electrical characteristics and message formats, as well as bus protocols, will preferably be housed within each module that interfaces with a system bus. Moreover, providing for the programmability of these conventional bus I/O circuits allows these modules to be employed in different applications, each of which may utilize different electrical characteristics, message formats and bus protocols.

On the other hand, analog components such as isolation transformers and resistors would likely and preferably be housed external to the modules for some applications. These components could be housed, for example, in the application-specific backplane, which may be, for example, a wiring harness or a multi-layer board. There are several reasons for external bus analog I/O components. First, some applications require that bus isolation components be located external to the modules. Second, different size applications require a different number of bus I/Os, and therefore a different number of analog isolation components in each module. Smaller applications may not require analog isolation components in the bus interface. Instead of increasing the hardware overhead for common modules that do not need all the these relatively bulky components, it is sometimes better to exclude them from common module units. Third, housing some of the bus analog I/O components in the backplane is a standard practice and is easy to implement. Fourth, some of the module interfaces may be to standard busses (1553, ARINC 429, etc.) as specified by the application. It may then be practical to utilize standard bus interface hardware that is already available, without placing such hardware in every common module.

Housing the bus interface hardware external to the modules in separate bus interface units (BIUs) 304 is another example of advantages afforded by the architecture of the present invention: namely the reduction of common module overhead, and thus common-module size and cost, by placing non-common elements outside these modules. Also, if deemed advantageous, these separate BIUs 304 would preferably be programmable to interface any type-module with a wide variety of bus types.

FIG. 3 particularly shows bus interface units 304 associated with the CNI busses. However, such units 304 could be placed at other locations in the architecture, as dictated by the application requirements for bus isolation and bus standardization. Again, the intent is to maintain an open architecture for common programmable modules in multiple CNI functional channels and in multiple CNI applications.

Some applications may require bus isolation within the common modules where, for example, the module's bus transceivers are connected to a dual-redundant bus via separate isolation transformers. These transformers protect the module in the event of a bus failure external to the module. A failure that occurs on the active bus is isolated from the module, and the module can continue to operated on a redundant bus. However, as noted above, it is desired to eliminate bulky analog isolation hardware from the common modules to reduce the hardware overhead for the module applications that do not require all the bus isolation circuits. An important feature of the architecture of the present invention is that common module spares can be programmed to service many CNI functions. Thus, instead of requiring that a module must be protected against bus failures, so that the module can operate on a redundant bus, the architecture can simply allow the module to also fail and another module be reprogrammed to take its place. The reason why module reprogramming can be more attractive than module internal isolation protection is now explained.

Note that a bus failure that disables a module must take place in the stub between the isolation circuitry at the bus interface, which is external to the module and the isolation transformer within the common module. If the isolation circuitry at the bus interface is housed in a backplane, and the common module is a plug-in unit, the probability of a stub failure is small. In deciding upon the need for internal bus isolation when designing common modules for multiple CNI functions and multiple CNI applications, the system designers must weigh the probability of such a stub failure (and the need to reprogram and switch to a spare common module) against the hardware penalty of placing isolation circuitry for the various bus I/Os inside the common module. Since many applications will always need a minimum number of bus I/Os, the optimum common module implementation for all these applications could be a minimal number of internal bus isolation circuits plus additional bus I/Os that are available when needed.

Bus voltage levels are another important consideration. For most applications the bus voltages are designed into the common modules, and appropriate line drivers are employed. But it may be desirable to use common modules among applications with different (i.e., specified) bus voltage levels. In this case separate BIUs 304 could transform the voltage levels external to the common modules, or programmable line drivers could be housed within the common modules.

Conventional system application terminals that interface with the radio channels described herein, and which employ the information contained in the digital information signals associated with the radio channels, can include most anything: user audio equipment (microphones, speakers, headsets, alarms), workstations (keyboards, displays, control panels, computers, printers, FAX machines), video equipment (cameras and displays), sensors (temperature, pressure, altitude, etc.), application computers, equipment management units and monitors, controls, actuators, cryptographic equipment, and interfaces with other communication equipment. In some system applications such terminals interface with the integrated system via standard busses. In other system applications the terminals are tailored to interface with application-specific system busses. Regardless, either the CNI controller 320 will manage these interfaces or the interfaces can be managed by control functionality that is located external to the invention architecture sometimes in the application terminals themselves.

Figure 23:
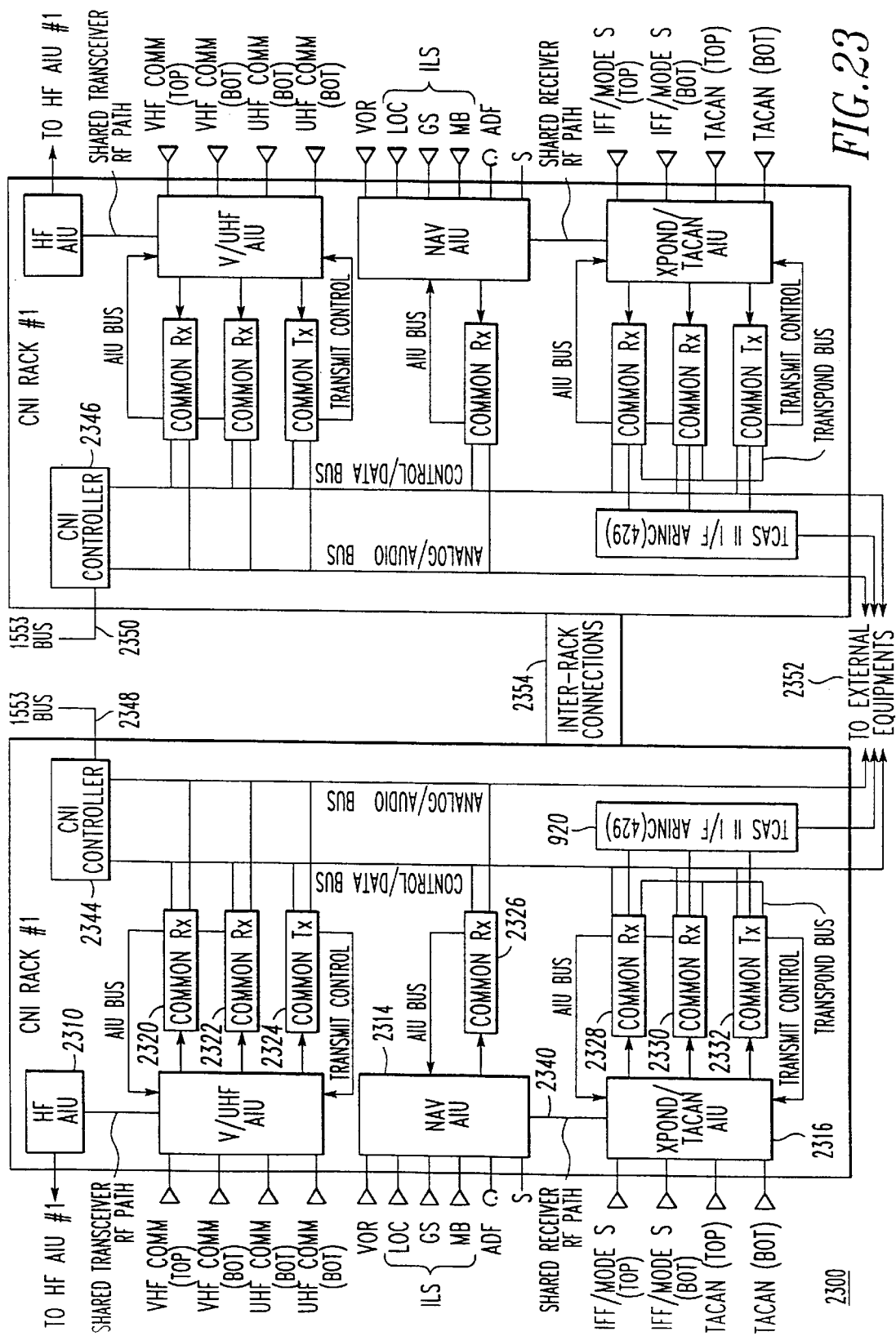
FIG. 23 illustrates a military airplane integrated CNI system.

The architecture of the present invention avoids the problem of RF and/or IF "matrix switching" among modules. First, intermediate frequency (IF) switching and signal distribution is completely contained with the common receive 106 or transmit 204 modules. (The only exception is when an input RF range that does not fall within the frequency range of the common receive and transmit modules is block converted (see FIG. 5) in an AIU 308 to (or from) an IF that falls within the RF range of the common receive 106 and transmit 204 modules.) The common receive module 106 inputs analog RF and outputs a digital bit stream. Conversely, the common transmit module 204 inputs a digital bit stream and outputs analog RF. Second, by permitting AIUs 308 (and RF switch modules for spare receive and transmit modules) to be application specific, they can be tailored to reduce RF switching among modules. One example would be when the Localizer, Glideslope and Marker Beacon functions of an instrument landing system (ILS) are time-multiplexed (TMUXed) within a single ILS-AIU such that a single RF line is connected between the AIU 308 and a common receive 106 module. The common receive module 106 then processes the three functions, also on a TMUX basis. (Time-multiplexing of guard channels is also a TMUX example.) Although time-multiplexing of the ILS components (LOC, GS and MB) or the time-multiplexing of guard channels occurs at the relatively modest rates of tens or hundreds of Hertz, additional CNI functions that are never used contemporaneously (i.e., time-multiplexed during the same time period) can be included in the same AIU and connected to the same common transmit or receive modules. FIG. 23 shows examples for a particular military avionics system application. For example, a common receive module 2326 is connected to a Nav AIU 2314 that contains AIU elements for the modestly time-multiplexed ILS components (LOC, GS and MB) as well as VOR and ADF (automatic direction finder). The receive-only functions ILS, VOR and ADF are never used at the same time in this application. Therefore, only a single common receive module 2326 is needed for this AIU. Moreover, TACAN, which requires only a single common receive module, is likewise never used simultaneously with these functions. TACAN can therefore share the same common receive module 2326 as ILS, VOR and ADF. However, because TACAN can also share the same common transmit module 2332 with IFF/Mode S, and from a design standpoint it is desirable to place the TACAN AIU elements with the IFF/Mode S elements in the same AIU 2316, the present invention routes the TACAN signal from the TACAN antennas first into the Xpond/TACAN AIU, through the shared receive path, into the Nav AIU 2314 and into the common receive module 2326.

Figure 36:
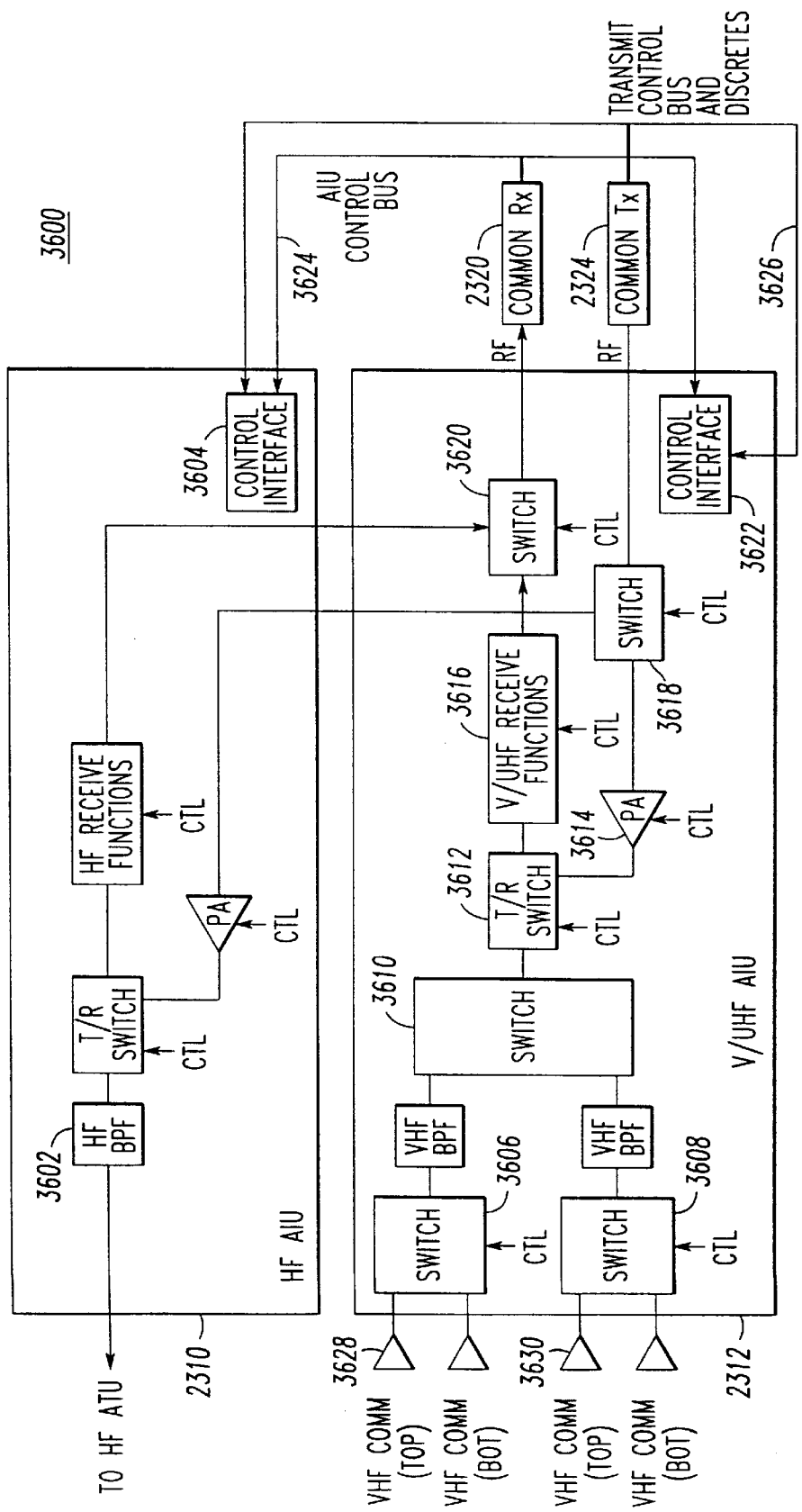
FIG. 36 depicts a single common receive module being shared among separate antenna interface units.

FIG. 36 illustrates how a single common receive module (e.g., 2320) and a single common is transmit module (e.g., 2324) can be shared among two different AIUs, in this case an AIU 2310 dedicated to the HF radio function and an AIU 2312 dedicated to the VHF and UHF radio functions. For example, a command to operate an HF radio is issued from a user at an application terminal through the system controller (not shown) to common receive module 2320. The command is passed over AIU control bus 3624 to control interface 3622 in AIU 2312 which commands switches 3618 and 3620 to the HF position. Other commands such as for filter tuning, AGC or T/R switch select are passed from common receive module 2320 over AIU control bus 3624 to control interface 3604 which commands the appropriate functionality in AIU 2310. Transmit commands such as power output level are passed from common transmit module 2324 to control interface 3604 in AIU 2310 to the power amplifier (PA) or associated power output control (not shown.) If a command is then given to operate a VHF radio the operation is similar to the above except that common receive module 2320 commands control interface 3622 to throw switches 3610, 3618 and 3620 to the VHF position. Control interface 3622 also commands switch 3606 to the top antenna 3628 or bottom antenna 3630 position via commands received from the user and passed to control interface 3622 by common receive module 2320.

Figure 37:
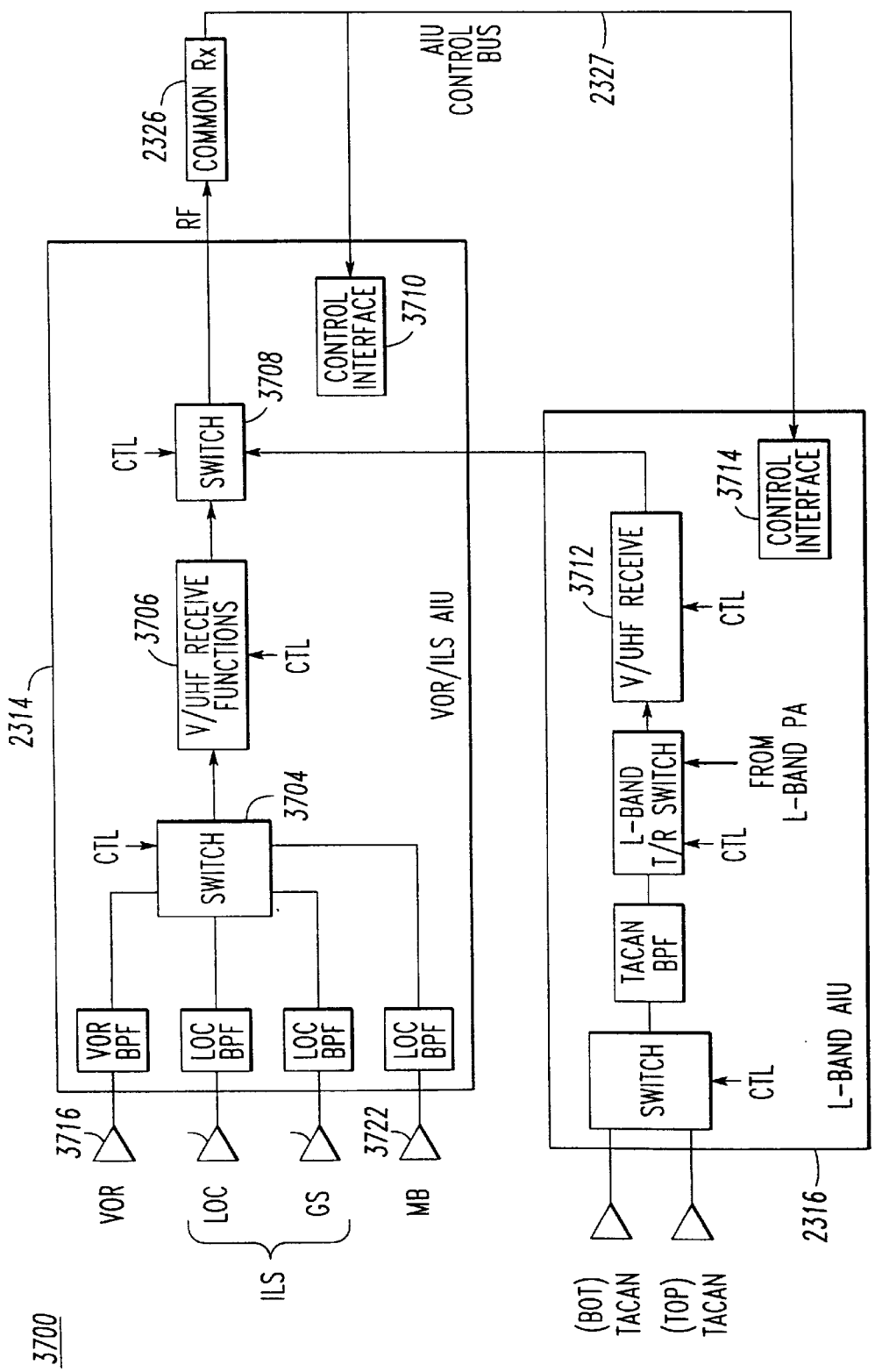
FIG. 37 illustrates an AIU that is functionally specific to several radio functions.

FIG. 37 illustrates how a single AIU 2314 can service multiple radio functions, in this case Very-High Frequency Omni Range (VOR) and (Instrument Landing System) localizer, glideslope and marker beacon. In this figure the same common receive module 2326 also services the Tactical Air Navigation (TACAN) radio function in conjunction with AIU 2316. Note that in this latter case the control of the AIU 2316 can come from either the common receive module 2326 (via AIU bus 2327 or via another AIU bus (not shown) from another common receive module. For example, for VOR operation a command is initiated by a user (either manually or via an automatic CNI system reconfiguration based on aircraft position), passed to the CNI controller (not shown), to common receive module 2326 and to control interface 3710 via AIU control bus 2327 which throws switches 3708 and 3704 to the VOR antenna 3716. Other commands, such as for filter tuning or AGC, are passed from common receive module 2326 over AIU control bus 2327 to control interface 3710 which commands the appropriate functionality in V/UHF Receive Functions 3706. If a command is given to operate the ILS functions, (either manually or via an automatic CNI system reconfiguration based on aircraft position), the command is passed from the CNI controller (not shown) to common receive module 2326 which time-multiplexes the localizer, glideslope and marker beacon functions. During each time period allocated to each of these functions switches 3704 and 3708 as well as other functionality located in V/UHF Receive Functions 3706 such as AGC are properly set corresponding to the ILS function being serviced at the time via commands that were sent from common receive module 2326 to control interface 3710 via AIU control bus 2327.

Figure 38:
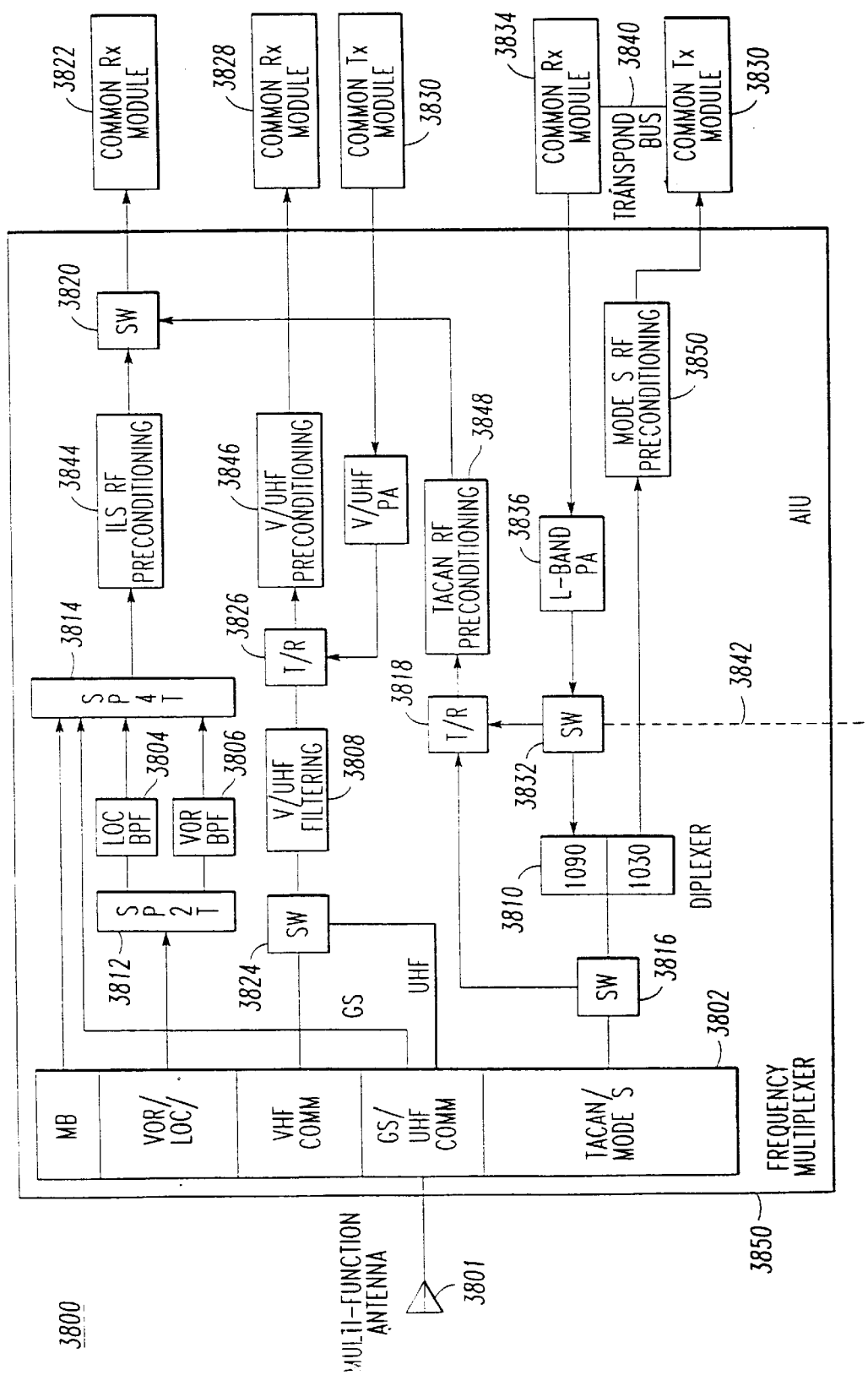
FIG. 38 illustrates an AIU for a multi-function antenna.

FIG. 38 illustrates one possible AIU configuration 3850 for a multi-function antenna 3801, such as on a high-performance military aircraft. It also illustrates the considerable flexibility afforded by the ability of the invention architecture to utilize relatively few common modules for many CNI radio functions. For such applications the additional AIU complexity must be weighed against the highly desirable reduction in aircraft antenna area. Frequency multiplexer 3802 separates and filters various radio functions. In this example, marker beacon (MB), TACAN and glideslope (GS) receive highly selective filtering in the multiplexer 3802. Because VOR, LOC and VHF Comm are relatively close in frequency, these latter functions receive additional filtering in filters 3804, 3806 and 3808. Similarly, the Mode S transponder receives additional filtering in diplexer 3810. During flight the ILS functions are inactive. The operator can choose between VOR or TACAN, with switches 3812, 3814, 3816, 3818 and 3820 appropriately thrown for either navigation function to connect antenna 3801 to the common receive module 3822. Simultaneously with VOR or TACAN operation, via the controlled switches 3824 and 3826 and the common receive and transmit modules 3828 and 3830, the operator can choose to transmit or receive on VHF or UHF radio. In this particular example, the operator can also choose either TACAN or Mode S transponder. When using TACAN in the "bearing" mode, the antenna 3801 is connected to common receive module 3822 through appropriate switching as previously explained. When using TACAN as an interrogator, switches 3832, 3818 and 3816 connect common transmit module 3834 and L-Band power amplifier 3836 to the antenna 3801 through frequency multiplexer 3802. After identification, switch 3816 is thrown to connect antenna 3801 to common receive module 3822 in order to listen to the response to the TACAN identification. Commands to switch 3816, which is thrown to connect antenna 3801 to diplexer 3810, permits Mode S operation. In this case common receive module 3830 listens for Mode S identifications and, after receiving and processing such identifications to determine the proper response, issues the proper commands to common transmit module 3834 via transpond bus 3840. Switch 3832 is properly thrown to connect common transmit module 3834 and L-Band power amplifier 3836 to the antenna 3801 through diplexer 3810 and frequency multiplexer 3802. In order to operate TACAN and Mode S simultaneously, which may be required in some cases, common receive module must continually listen to Mode S identifications. Changing switch 3816 to a power splitter makes this possible, although the TACAN and Mode S functions then lose approximately half the receive and transmit power. Because TACAN and Mode S can operate on the same or nearly the same frequency channels, frequency multiplexing these two channels is difficult in multiplexer 3802. To achieve simultaneous operation with less receive and transmit loss, switch 3832 can be changed to a single-pole 3-throw where a separate receive input 3842 (e.g., from a separate Mode S antenna) can be connected to common receive module 3838. In this case it may not be necessary to have a separate common transmit module 3834 or L-band power amplifier 3836 for TACAN and Mode S because TACAN identifications can be scheduled around Mode S replies, thus permitting common transmit module 3834 and L-band power amplifier 3836 to be time-shared for the two radio functions. During landing, the ILS, Mode S, and VHF radio functions are active. VOR, TACAN and UHF radio are not utilized. The ILS functions, which are receive-only, (MB, LOC and GS) are time-multiplexed via switches 3812 and 3814 to common receive module 3822. VHF radio and Mode S are operated simultaneously as previously explained. RF preconditioning specific to the functions described above are provided in RF preconditioning units 3844, 3846, 3848 and 3850. The particular functionality of each of these units (examples such as AGC and low-noise amplification that were given previously with respect to AIU discussions) is tailored to meet the system requirements of the particular aircraft application.

Third, and perhaps most importantly, the architecture does not connect every AIU 104/308 to every common receive 106 and transmit 204 module because so doing would require large, expensive, complex RF switch matrices that complicate the physical interconnections among modules. And such full connectivity is not needed. For example, with reference to FIG. 23, at least one CNI function associated with each of the three AIUs might be used at any one time, e.g., VHF radio, VOR and IFF all used at the same time so the common receive and transmit modules associated with one of these functions will not be used with another CNI function (unless warranted by priorities as discussed later). So there is little benefit in providing an expensive, complex RF matrix switch that can connect all AIUs to all common receive and transmit modules. Therefore, although each of these latter modules can be programmed for any number of CNI radio functions, they are usually each assigned to a single AIU 308 according to the radio functions that are provided for a particular system application. One exception to the one-for-one AIU/common module rule is the grouping of two or more AIUs with common modules as exemplified above by the sharing of the common receive module 2326 with both the Nav AIU 2314 and the Xpond/TACAN AIU 2316. Another exception is if desired for a particular application we could, for example, provide a switch path between a Xpond/TACAN common receive module 2328 and the Nav AIU 2314 for extra protection against multiple radio failures of the flight-critical ILS function. That is, if both receive modules (one in each rack) normally assigned to the flight-critical ILS function fails when a plane landing under low visibility conditions, the pilot may forgo TACAN or a transponder in order to program another radio for ILS and thus safely land the airplane. This again shows the flexibility of architecture of the invention where the noncommon AIU can be tailored during the design of the system application to provide this extra switch path between a common receive or transmit module and an AIU. The exception are the spare receive and transmit modules that are connected to all AIUs via relatively simple SPMT switches 306. If such switches contain too many "throws," which is unlikely for most applications requiring redundancy, additional spare common modules that are assigned to a subgroup of AIUs with smaller SPMT switches could be employed. Another exception is where common receive and transmit modules are assigned to multiple AIUs such that these modules can be assigned as spares to other radio functions on a prioritized basis. For example, a communication function could be dropped in favor of a needed flight-critical ILS radio function. However, RF switching in this case is also minimal.

The details of the bus structure, that is, the protocols, formats, electrical and physical characteristics depend upon the specific application. The advantage of the invention architecture is that the programmability of the various modules (plus suitable bus interface units if needed) provides the flexibility to satisfy a wide range of bus requirements. With the open architecture of the present invention different suppliers can develop software packages for the various type busses. These packages are easily downloaded into the programmable modules, or the packages can be provided in suitable BIUs if desired. Furthermore, most packages will provide a bus that is applicable to a large number of applications.

But regardless of the application, busses preferably used in the present invention possess features not usually found in other integrated CNI system architectures.

A major feature of the invention architecture is that module partitioning is such that for the most part relatively low speed bit streams (for control, timing, status, data, etc.) are passed between the various modules. Busses are almost always serial, which is a major advantage, but they can also be parallel if ever required.

In the architecture the I/Os of the programmable modules can be programmed for the busses required by that module for a particular CNI function and system application, including application requirements for bus redundancy. Normally, the I/Os of the various modules are sized for the CNI function and application requiring the most number of bus pin outs. However, even most smaller applications generally require the same number of bus I/Os on each module. But if deemed necessary, smaller applications not requiring all the bus I/Os that are available can always reduce overhead by using smaller hardware, e.g., a smaller I/O connector.

Programmable bus characteristics: bus protocols and other conventional characteristics are application dependent and preferably programmable and, except for the bus examples described herein, are outside the scope of this application. The advantage of the invention architecture is that the protocols, formats and electrical characteristics of each bus can be tailored via I/O programmability to the types of bus traffic in various classes of CNI applications. For example, the flexibility afforded by the programmability of bus interfaces enables busses to be serial or parallel, synchronous or asynchronous, unidirectional or bidirectional, to include both standard or custom protocols. Also, discrete control signal interface such as the transmit discrete signals discussed herein can also be programmed.

Such programming of the digital interfaces for the common receive and transmit modules is performed by downloading configuration data from a unit external to the channel. This external unit can be the system (CNI) controller, for example, if the system interconnections between units are changed (e.g., switched) during system operation. However, in most cases the bus and discrete interconnections between the various system units are usually fixed (e.g., by backplane interconnections), so that configuration downloading can come, for example, from a test bench. Also, if deemed advantageous, it is possible to perform some or all of such programming of the digital interfaces manually, e.g., by throwing switches within the common receive and transmit modules. Finally, programmable digital interfaces can also be implemented in other system units, which can be advantageous in the CMP and INFOSEC units which may need to meet different bus requirements for different system applications and/or which need to satisfy different interface definitions for different types of terminals within the same application.

Depending upon the application, the I/Os of the various modules are programmed to interface with other elements within the CNI suite via various type busses. Bus examples for various CNI functions and applications are discussed below. The physical bus connections to each type module are determined by the backplane or other physical interconnection scheme that is tailored to a specific application.

The physical characteristics (voltage levels, etc.) of some busses that interface with the conventional external equipment (control/displays units, audio interfaces, fax/printers, sensors, etc.) are already standardized by industry, etc., for some applications, and in these cases separate BIU modules 304 (see FIG. 3) may preferably be utilized to avoid excess bus hardware overhead in the common module units.

On the other hand, busses totally internal to the architecture (e.g., AIU control bus, transmit control bus, transpond bus, black control/data bus, MA message busses and INFOSEC busses which can be redesigned by those of skill in the art if necessary) can be particularly defined by the application. As various future CNI applications are developed using the programmable common module approach, the internal busses can utilize bus characteristics commensurate with the I/O characteristics of the various modules, thereby avoiding the need for separate BIU modules 304. Ultimately, the characteristics of internal busses will preferably be standardized for various classes of applications to make it easier for suppliers of the various modules in this open architecture.

The preferred bus structure is commensurate with the straightforward scalability afforded by a channelized approach, i.e., simply add parallel channels to perform more CNI functions. Because most of the channel control is via intra-channel busses (AIU control bus, transmit control bus, transpond bus), as well as busses internal to each common module unit for controls such as synthesizer tuning, IF filter selection, and channel AGC settings, adding system CNI capacity merely involves providing sufficient capacity on the CNI control/data bus and, if required, the CNI MA message bus (see FIG. 3).

A low-speed traffic capacity of approximately several megabits per second for the control and message busses connected to the common receive 106 and transmit 204 modules should be sufficient for even the largest of applications, particularly since many applications associate communication, navigation and identification (CNI) radio resources with their respective communication, navigation and identification (CNI) terminals. Separate busses are utilized for each functional class and the CNI controller 302 can be appropriately configured during system development for a particular application. Thus, bus capacity of conventional serial busses should be sufficient to add channels without the need to add additional bus lines, which necessitates additional bus I/Os 304 on the various modules.

The preferred programmable bus I/O feature also permits intra-channel scalability; that is, modules can be added or deleted within a programmable channel. For example, the I/Os of the common Tx 204 and common Rx 106 modules can be programmed to interface directly with the CNI controller 302 and external application terminals via the CNI control/data bus and the CNI MA message bus. But when a CMP module 310 is employed within the channel, the I/Os of the common Tx 204 and Rx 106 modules can be programmed to interface directly with the CMP unit 310.

Each application will have its own set of busses dependent upon bus traffic requirements. Not all of the busses listed below are used for every application. Also, depending upon bus traffic requirements, some of the busses listed below may be combined into a single physical bus with appropriate protocol. Depending upon system reliability considerations, fault-tolerant (e.g., dual-redundant) busses may be employed.

CNI control/data busses 322 (FIG. 3) are bidirectional serial busses, preferably asynchronous, that are formatted for the primary function of passing control and status data from the CNI controller 302 to the various common channel modules and external terminals as also shown in FIGS. 25–33. Normally, control/data busses handle messages that are relatively brief and aperiodic. Message formatting (but not necessarily the protocol) is preferably similar to MIL-STD 1553 or ARINC 429, with each complete message passed over the bus prior to the passage of the next message. Messages may include: RF or digital signal routing; tuning parameters; built-in-test (BIT) commands; and resource configuration. The control/data bus 322 and shown in the other figures herein permits the CNI controller 302 to receive status information from the various elements so that appropriate action (display warnings, system automatic reconfiguration, etc.) is taken. All of the above functions are performed on one or more control/data busses depending upon the bus traffic requirements for the particular application. For example, to handle higher traffic loads, the CNI control/data bus 322 shown may be split into two separate serial busses, with one bus servicing the common receive 106 and transmit 204 modules and the other bus servicing the user terminals. Longer messages such as digitized voice, video data, file transfers, etc. may require separate message busses as described later, particularly when multiple user terminals are involved. However, depending upon the application traffic requirements, control/data busses 322 for smaller applications can: download CNI module reconfiguration data to the programmable elements, pass data between the CNI controller and user terminal including control panels and displays, relay brief message packets received or transmitted through the antennas to and from various system elements; send data to application displays; and relay brief message packets among various system elements including user terminals. Depending upon application traffic requirements, control and status data may be passed on the same bus as longer, periodic messages by allocating control time slots on a time-multiplexed CNI message bus which is discussed in the next section.

Figure 26:
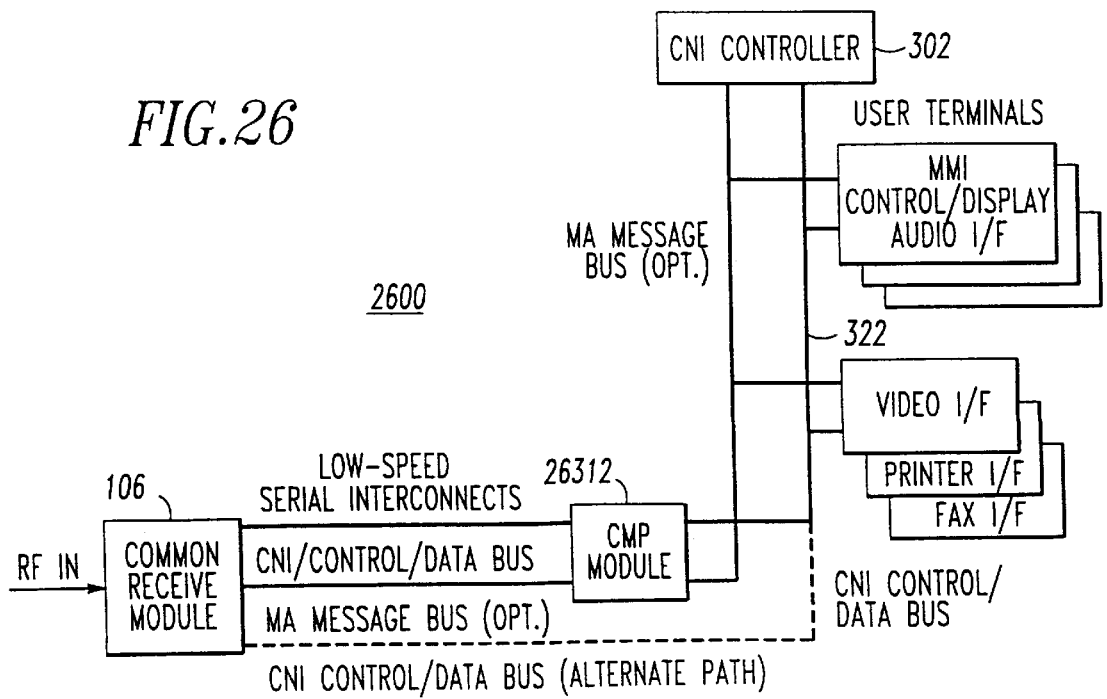
FIG. 26 shows bus connections when a channelized message processing (CMP) module is connected to a common receive module.
Figure 27:
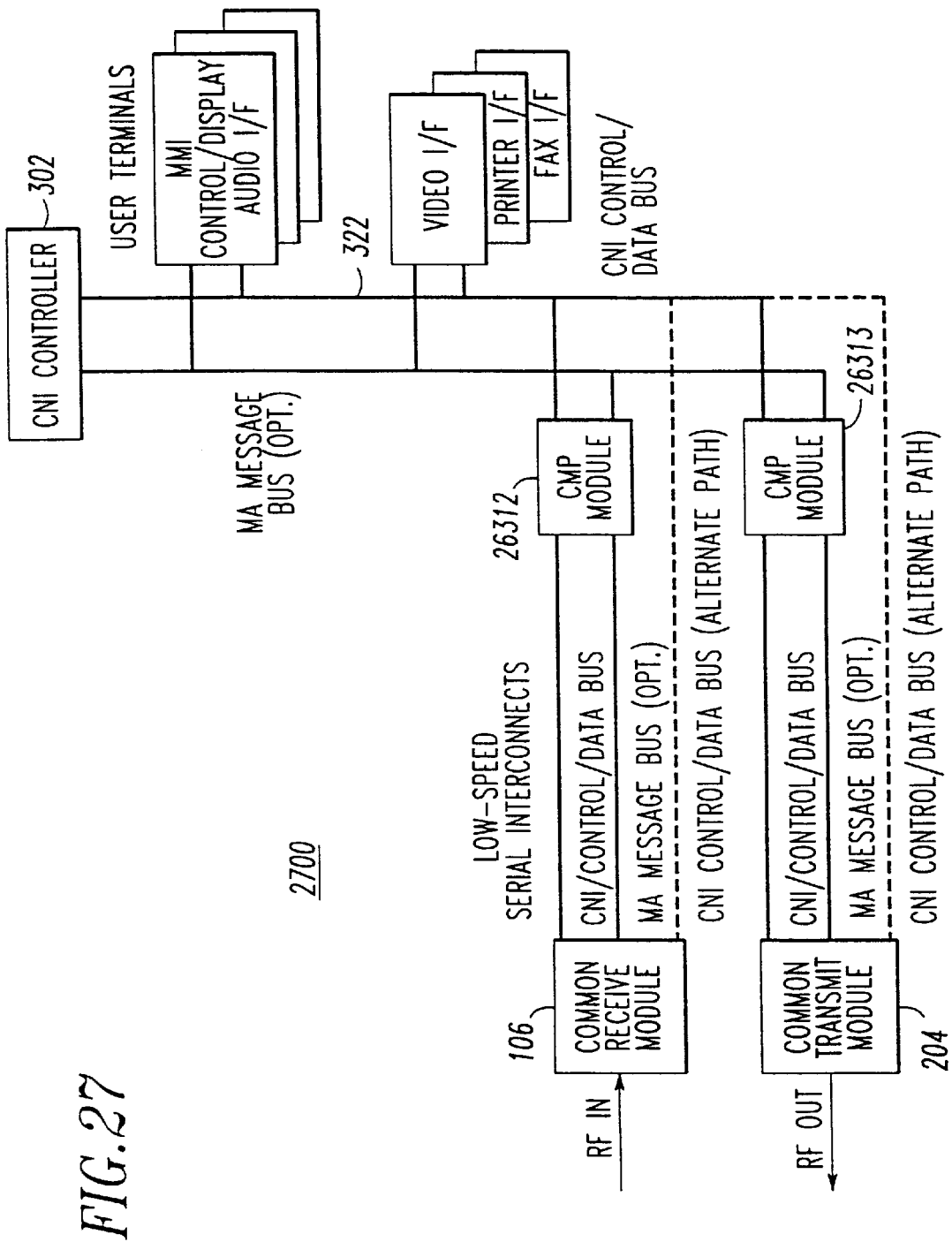
FIG. 27 shows bus connections when channelized message processing modules are each connected to a common receive module and a common transmit module.
Figure 28:
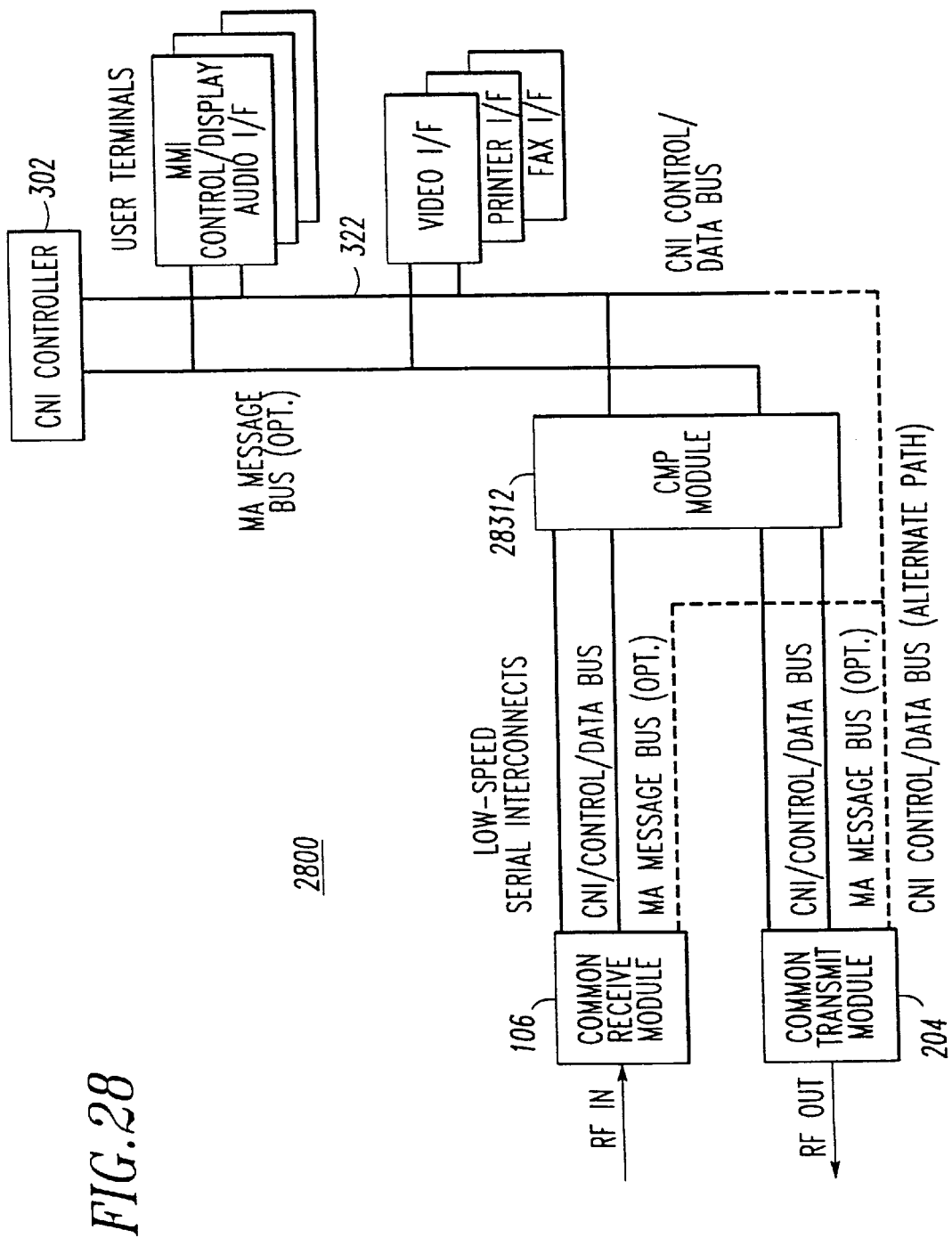
FIG. 28 shows bus connections when a single channelized message processing module is connected to both a common receive module and a common transmit module.

For applications without CMP modules the control/data bus 322 connects directly to the common receive 106 and transmit 204 modules as shown in FIG. 25. When CMP modules (without INFOSEC) are employed in a channel, the control/data bus 322 from the CNI controller can be connected to the common receive and transmit modules through a CMP modules 26312, 26313 and 28312 as shown in FIGS. 26, 27 and 28, or the control/data bus can optionally be connected directly to the common receive 106 and transmit 204 modules.

Figure 29:
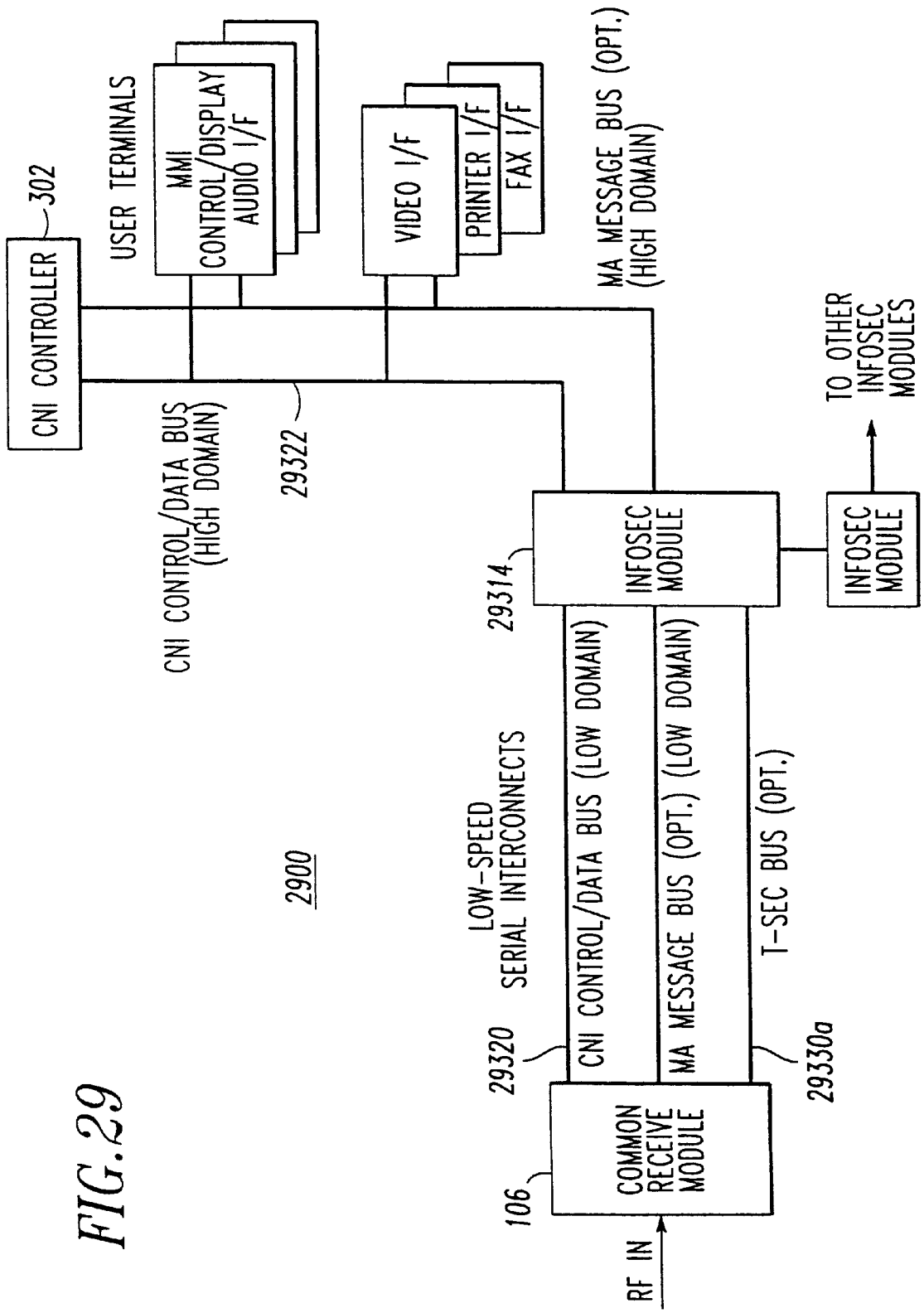
FIG. 29 shows bus connections when an information security (INFOSEC) module is connected to a common receive module.
Figure 30:
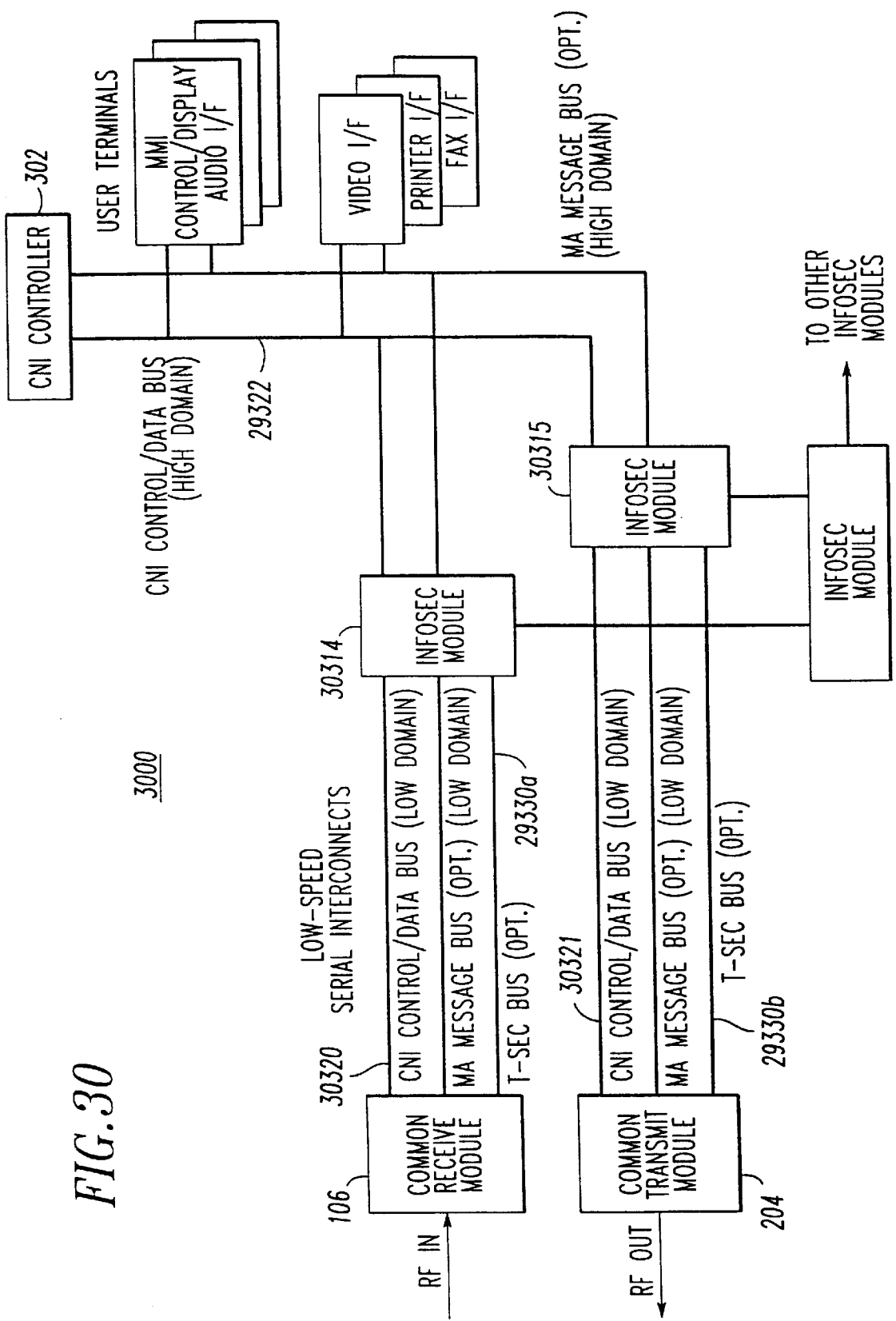
FIG. 30 shows bus connections when an information security modules are each connected to a common receive module and a common transmit module.
Figure 31:
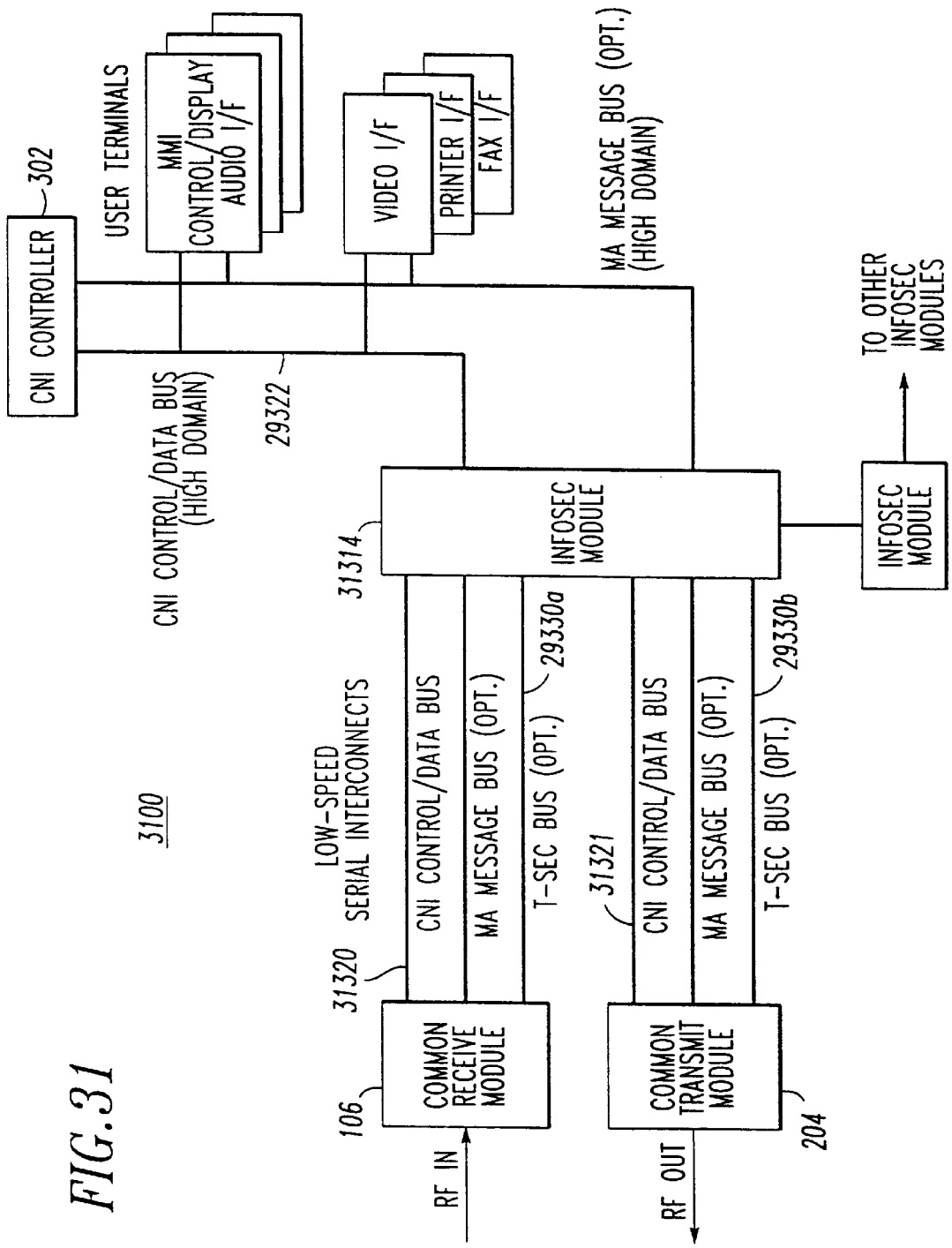
FIG. 31 shows bus connections when a single information security module is connected to both a common receive module and a common transmit module.
Figure 32:
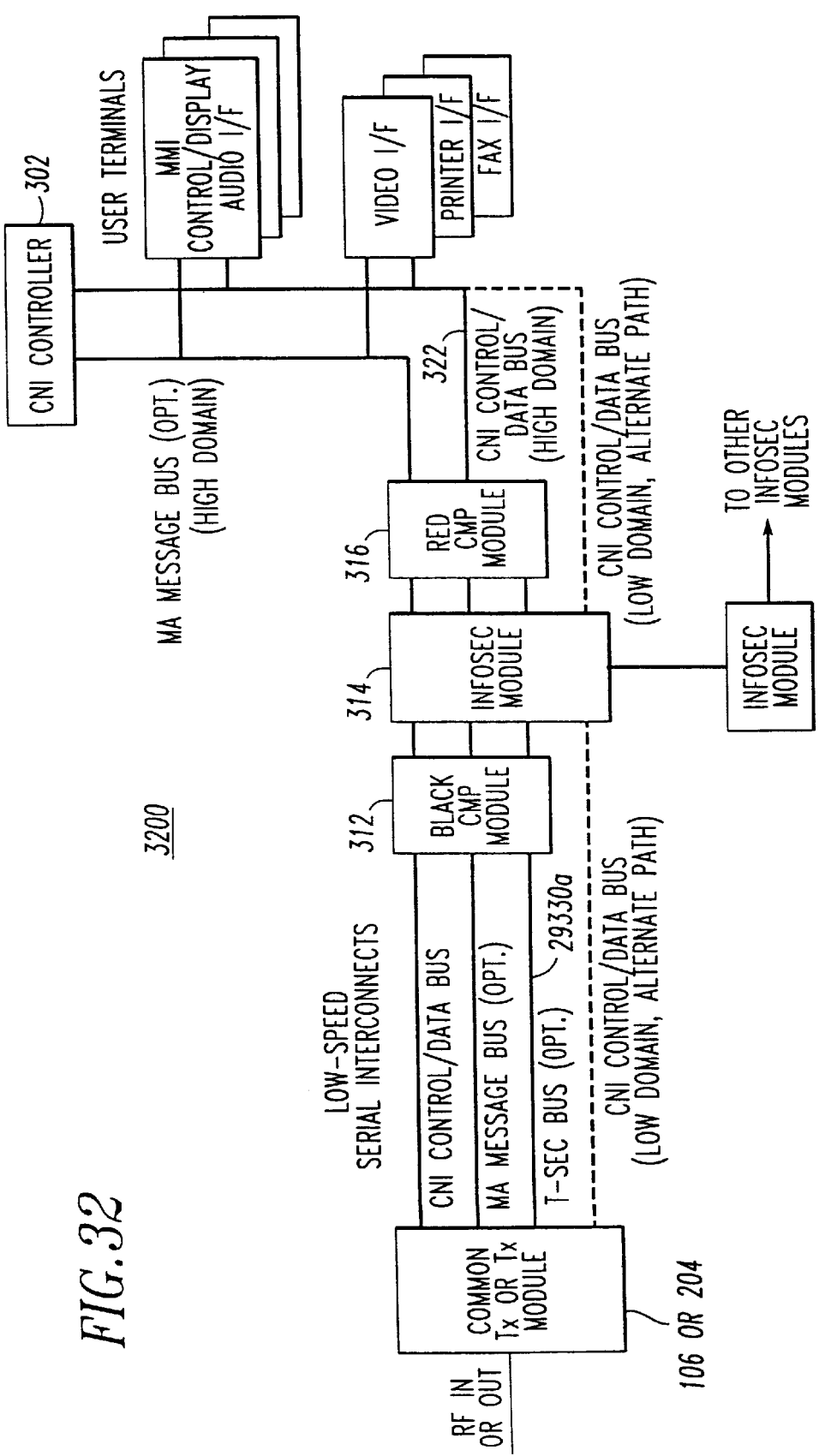
FIG. 32 shows bus connections when an individual red (i.e., high domain) CMP module, black (i.e., low domain) CMP module and INFOSEC module are all connected in the same channel as a common receive and/or transmit module.
Figure 33:
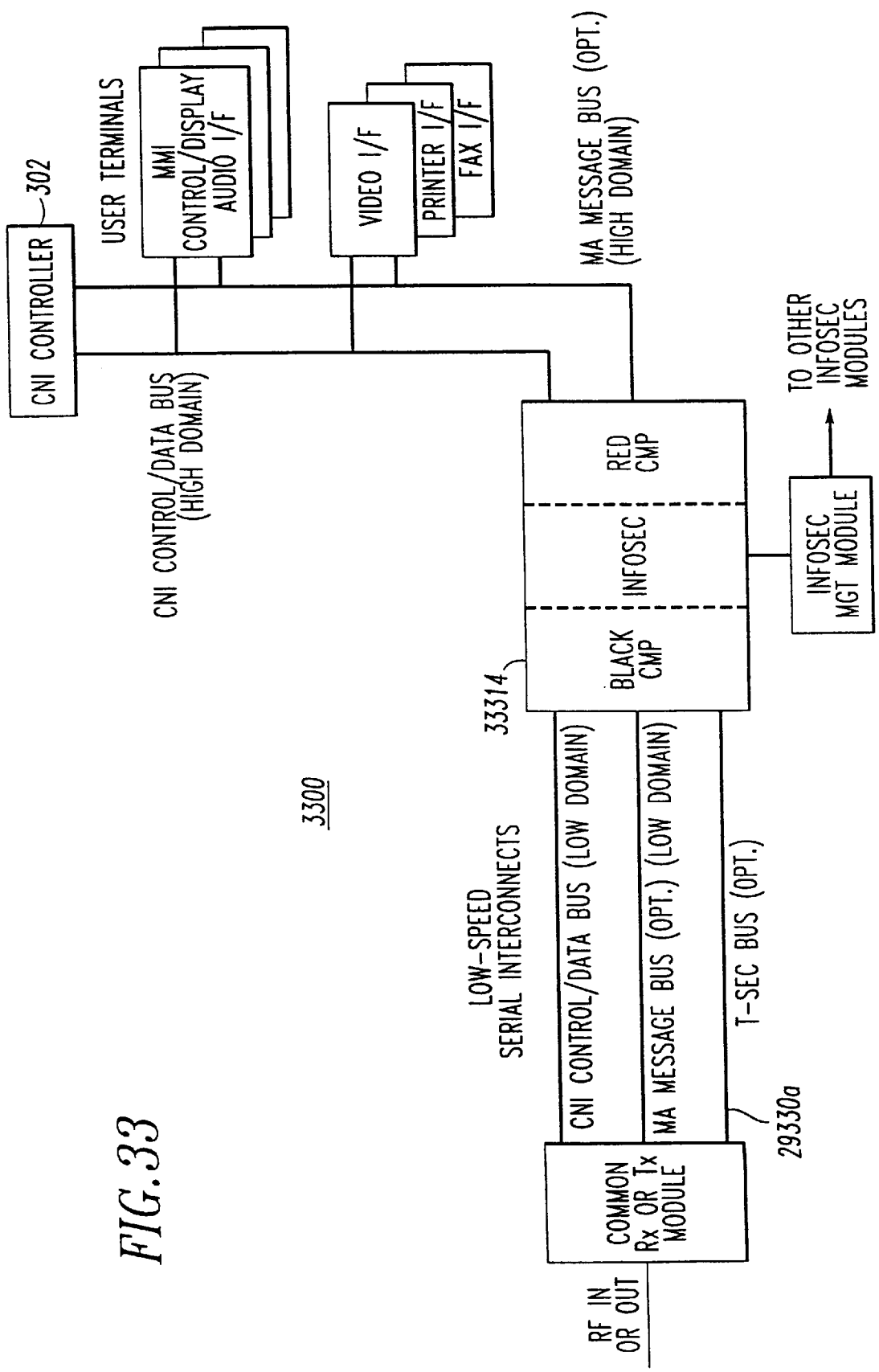
FIG. 33 illustrates bus connections when red CMP, black CMP module and INFOSEC functionality are all contained in the same module are connected in the same channel as a common receive and/or transmit module.

For INFOSEC applications as shown in FIGS. 29, 30 and 31 for receive-only, full-duplex and half-duplex operation, all red (i.e., high domain) information, including control information, passes through a certified red/black interface within an INFOSEC module. In this case the red (i.e., high domain) control/data bus 29322, in FIGS. 29, 30 and 31, passes high domain control information between the CNI controller 302 and the INFOSEC modules 29314, 30314, 30315 and 31314, and the black control data busses 29320, 30320, 30321, 31320 and 31321 pass black (i.e., low domain) control information between the various INFOSEC modules and the common receive and transmit modules 106 and 204. CMP and INFOSEC modules 312, 314, 316, and the black control/data bus, also illustrated but not numbered in FIG. 3, passes black (i.e., low domain) data between the CMP and INFOSEC modules and the common receive 106 and transmit 204 modules. For INFOSEC applications that also include CMP in separate modules as shown in FIG. 32, the red (i.e., high domain) information, including control information 322, must pass through a red CMP 316. The high domain control information to/from the INFOSEC, black CMP 312 and common receive or transmit modules can either pass through the red CMP 316, or such information can pass over an alternate control/data bus path connection that connects the CNI controller directly to the INFOSEC module 314. Similarly, high domain control information passing between the INFOSEC module 314 and the common receive or transmit modules can either pass directly between these modules or the information can pass through a black CMP 312. When CMP and INFOSEC functions are combined into a single module 33314 as shown in FIG. 33, the control data bus information between the CNI controller and the common receive and transmit modules passes through the INFOSEC/CMP module 33314.

For many applications, various types of message traffic (e.g., voice, video, text) can also be passed over the control/data bus 322. However, for reasons of bus traffic or protocol complexity, such message traffic may be assigned to separate busses. CNI multiple access (MA) message busses 324 are optional serial busses either uni-or bidirectional, that are preferably asynchronous and formatted to pass messages of relatively long duration between any radio and any user terminal. FIG. 3 as well as FIGS. 25–33 show examples of MA message busses. Message examples include digitized voice/audio, text, video and files of various type, as well as periodic data of relatively low rate such as positional measurements that are passed on to various instruments. The bus 324 can also be used to support an intercom or network capability between multiple users at a single location where user time slots are interleaved, i.e., time-multiplexed. However, for data rate considerations (e.g., high-speed, real time video) a MA message bus can be configured such that all available message time slots are assigned to a single message. Individual packets of each message may be either assigned a fixed time slot, i.e., channel, on the time-multiplexed bus (e.g., time-division multiple access or TDMA), or time slots can be allocated based upon request (e.g., demand assignment multiple access or DAMA).

Also, some system applications require considerably different data rates for transmit and receive. For example, when there is a need to receive video or file data at a relatively high information rate compared to the transmitted signal information rate, separate control/data busses or message busses may be allocated to one or more common receive modules but a single time-multiplexed control/data bus may suffices for multiple transmit modules. The actual physical connections to the common receive and transmit modules as well as the application terminals would be determined during the design phase for the system application.

The connection of MA message busses 324 to the various elements, including red and black MA message bus connections to INFOSEC modules, is similar to the control/data bus connections described above and are also shown in FIGS. 25–33. Some message connections between transmitter and receiver are predetermined, for example: data received on instrument landing radios is always routed to the same instruments or displays; video data received on a radio is always routed to the same display(s); guard channel messages are always routed to user headsets. For very high data rates such as a real-time video, a message bus 324 may be dedicated to a single channel.

As shown in FIG. 3, the AIU 308 receives control data (switch, filter, gain settings, etc.) via an AIU (receive) control bus 326 directly from the common receive module 106 in the AIU's corresponding channel. The AIU control bus is a bi-directional serial bus typically of no more than several MHZ and preferably synchronous although it can be configured to be asynchronous. AIU status can also relayed via this bus 324 back to the CNI controller 302 through the receive module 106. The CNI controller 302 passes control data (e.g., switch, filter and gain settings) for the AIU 308 (and, if used, an RF Switch Module) to the common receive module 106 located in the AIU's channel. The data can then be relayed to the AIU 308 via the AIU receive control bus 326. These commands from the CNI controller 302 are relatively long term, and, except for test purposes, are typically changed no more frequently than hourly, daily or an even longer basis. AIU commands of a higher rate (e.g., commands for fast filter hopping or AGC), originate from an element (receive module, CMP or INFOSEC) located within the fixed hardware string dedicated to the channel, which considerably simplifies the channel control architecture including control of the AIU.

Transmit data (tuning information, instantaneous modulation levels, etc.) is sent over a transmit control bus 328 from the common transmit module 204 in the AIU's corresponding channel. The bus characteristics are similar to those of the AIU control bus. AIU built-in test (BIT) can be initiated by either the AIU control bus 328 or the transmit 326 control bus. Likewise, AIU status can be relayed back to the CNI controller 302 via either the AIU receive control bus 326 or the transmit control bus 328.

A transpond bus 321 shown in FIGS. 3, 6B and 7A is primarily used for transponder-type functions such as IFF, Mode S and TACAN/transponder, when the timing of a message transmission is critical with respect to the timing of a received message. The bus can also be used to compare data in multiple receive channels and to make a quick transmit decision based upon such comparison. The bus can be configured serial or parallel depending upon the time available for the transmitted response. It is also uni- or bidirectional and preferably asynchronous although it can also be configured as synchronous. The transpond bus can also be used to provide a low-delay intra-net radio relay capability or even to share processing resources between common receive module 106 and common transmit module 204.

Also, various transmit commands requiring a short time response can be sent between the transmit module 204 and the AIU 308 via transmit discrete control signal lines as previously explained. For example, a transmit discrete line 328 a is preferably provided in the architecture of the present invention. This discrete line connects the common transmit module 204 to an AIU 308. When operating in an ATCRBSor IFF-type transponder mode with antenna diversity, where a transmit switch in the AIU 308 must be thrown in less than a few microseconds based upon receiver comparisons made in the common transmit module 204, this low-latency connection is used to command the switch. Similarly transmit discrete 328b is used, for example, to through a T/R switch to the transmit position, and transmit discrete 328c may be used as a timing strobe to begin TACAN or other types of pulse shaping that takes place in the AIU's transmit chain.

Transmission security (TRANSEC or T-SEC) busses not separately shown in FIG. 3 but shown as 29330a and 29330b in FIGS. 29–33 can also be provided. The TRANSEC busses pass TRANSEC data such as spread spectrum parameters and frequency hopping sequences, including hop randomization information, from the INFOSEC unit (314) to the common receive 106 and transmit 204 modules. In some cases this data may first pass through a CMP 312 Bus characteristics are similar to control/data busses. In most INFOSEC applications the black (i.e., low domain) Control/Data busses 29320, etc. can include TRANSEC traffic, thereby eliminating the need for a separate TRANSEC bus.

In some applications information security (INFOSEC) management busses 332 are provided. These busses distribute keys to the appropriate INFOSEC modules and, for programmable INFOSEC modules, download the appropriate configuration programs. When the loading panel is located separately from the INFOSEC Manager 318, a separate INFOSEC load bus 334 is also provided (see FIG. 3). These busses are configured with regard to specific security requirements.

Applique busses, which are parallel busses of moderate speed, may also be employed to connect applique modules in the manner previously described between the common receive and transmit modules and the low speed serial busses that would normally interface with the common modules. It is also possible to configure these applique busses (similar to the implementations for cross-switching CMP modules among common receive and transmit modules in FIG. 22) such that one or more appliques are shared among common receive and transmit modules assigned to different channels.

A (GPS) time bus, although not shown in the figures, can often be included in the architecture, particularly when INFOSEC is included, to distribute GPS timing information to the various modules for various types of synchronization. For applications where system status and availability is paramount, the flexibility of the architecture permits the incorporation of a separate BIT/maintenance bus to verify system status and configuration.

Busses 336 to remote external equipments are preferably of a standard type (1553, ARINC 429, etc.). These busses may either be under control of the CNI controller or under the control of the external equipments.

The backplane that houses the busses, power lines, clocks, reference lines, etc., is preferably tailored to the system application. In many cases elements of the bus interface units such as isolation transformers may be contained in the backplane. With suitable partitioning, the backplane may be comprised of common and non-common segments. By allowing the system designer to choose the backplane interconnections, the radio architecture comprised of the modules described herein is scalable to a wide variety of applications.

Of particular importance to module interfaces is the electrical isolation of the sensitive analog portions of the receive and transmit signal channels and the relatively noisy digital circuits contained anywhere in the overall system. Such analog portions may be contained in RF interface units between the antenna or external RF input/output, and are contained in the common receive and transmit modules. In particular, digital connections between the analog and digital portions of any channel, including within the common receive and transmit modules, as well as between the analog portions of a channel and any other digital portion of the system, including other modules and units, are designed to be well-isolated electrically from each other, by using, for example, line differential (i.e., dual-rail) transmitters (i.e., drivers), receivers and transceivers in the various analog and digital units, or perhaps by using fiber optic connections, and also by employing separate power/ground systems for the analog and digital portions. Also, when it is necessary to send a high-speed clock between digital and analog portions, for example, for the clocked AIU control bus between the digital portion of the common receive module and an AIU, the clock connection is preferably disabled after the control data has been sent over the bus.

Likewise, for analog connections between the analog and digital portions of a channel or of the entire system, for example, the passage of a reference frequency created in an analog portion and passed to a digital portion, such analog connections should also be isolated, preferable via isolation transformers.

Figure 8:
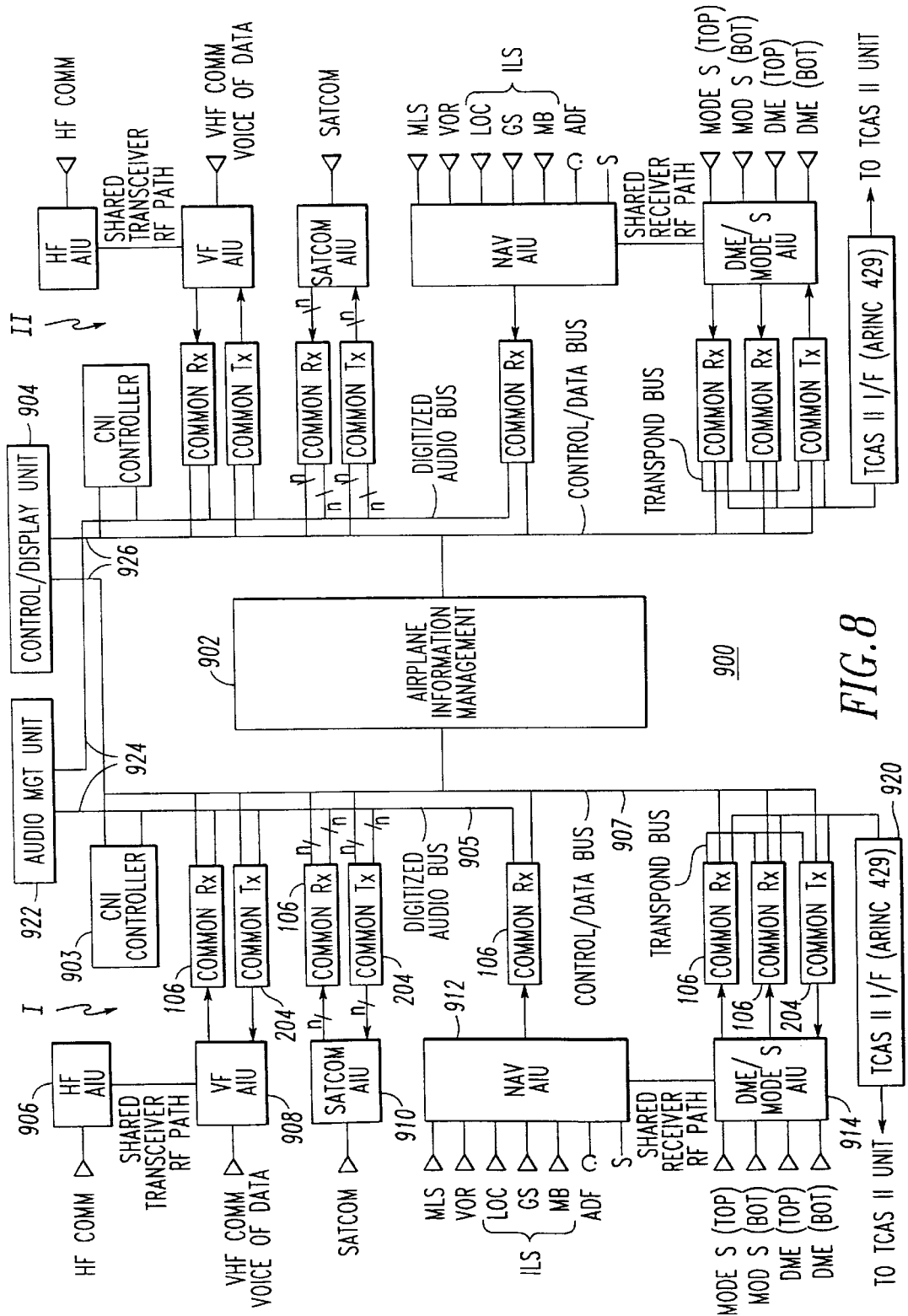
FIG. 8 illustrates a communication system using the architecture of the present invention in a commercial airplane communication suite.

As previously mentioned, the common receiver 106 and transmitter 204 modules can be combined in a number of different configurations. FIG. 8 illustrates a system of moderate complexity and a system configuration 900 suitable for the CNI suite of a commercial airplane. Other possible configurations will be discussed with respect to FIGS. 8, 12–24, 34, 36 and 37. The example embodiments discussed below can be modified by those of ordinary skilled in the art, for example by adding or deleting modules, changing interconnections between modules and module programming, to satisfy the requirements of a wide range of CNI radio applications. The various functions listed in each figure are implemented by downloading software programs from the CNI controller 302. The AIUs 308 illustrated can be subdivided into separate modules as previously discussed and designed for specific radio and system application. Channelized Message Processors (CMPs) can be added to any channel. Bus interfaces (I/Fs) are included in the modules and user terminals. Any embodiment can have multiple terminals, displays, etc. Programmable channels in each embodiment can service various waveform combinations of phase, frequency and amplitude, as well as various types of message and INFOSEC processing. For single-channel mechanizations FIGS. 12 through 16 and 18 through 20, as well as transponder mechanization FIG. 17, a control/data bus is usually sufficient to pass both control information and received/transmitted messages. But additional bus lines (including spare bus lines) can be added in parallel for any mechanization if traffic conditions or implementation complexity warrants. Optional block converters in an AIU 308 can not only extend the approximate 2–2000 MHZ band but can also fill in holes in the frequency coverage of the common Rx and Tx modules. Not all user terminals and peripherals are employed in every application.

By partitioning each channel into the modules and submodules as described with respect to FIGS. 1–7, the present invention results in all sampling rate synchronous control, such as that necessary to control the high-speed parallel interfaces among the elements of the digital submodule 600 within the common receive module 106, and among the elements of the digital submodule 700 in the common transmit module 204 being contained within the submodules 600 or 700 of the respective common receive or transmit modules. Modest speed control such as AGC is performed either between the digital submodule 600 and the analog submodule 500 within the same common receive module 106 or between the common receive module 106 (via its digital submodule 600) and the AIU 104 in its associated channel is self-contained within the receive channel. Modest-speed control such as power amplifier control (or antenna select control for a transponder with antenna diversity) between the common transmit module 204 (via its digital submodule 700) and the AIU 104 in its associated channel is self-contained in the transmit channel. Other real time control, such as switching between antennas and user channel selection is initiated at a lower speed by the controller 302 and configuration control or long term control, such as switching to spares or changes of module function is initiated by the controller 302 at an even lower speed. The channel control signals produced in the respective digital submodules are obtained by internal or external decision making. An example of internal decision making is when a common receive digital submodule 600 measures a signal level and sets receive channel AGC in the associated analog submodule 500 or associated AIU 104 (308). Another example of internal decision making is when a common transmit digital submodule 700 compares receive power from top and bottom antennas (via transpond bus) 321 and commands a switch in the associated AIU (transpond AIU not shown) to switch to a top or bottom antenna position. An example of external decision making is when a digital submodule 600 or 700 in either a common receive module 106 or a common transmit module 204 receives tuning information from the system controller 302 and relays such tuning information to the associated analog submodule 500 or 800 via tune bus, or to the associated AIU 308. Relative to prior art integrated programmable radio systems this results in: A considerably simplified control architecture by making control conflicts basically a non-issue (there is no need to schedule relatively high-rate events among different channels); a simplified design of the CNI controller; an easy scaling of system capacity to various applications by adding or deleting channels without a major impact on control timing considerations; easier re-certification of the entire system including the centralized controller whenever a CNI function is added or modified; the ability to pull channels and test or modify them independently without requiring a sophisticated CNI system controller.

The control architecture of the present invention permits both manual and automatic fault determination, isolation and correction. There are various methods that are well-known to those of skill in the art for determining and isolating faults to the individual modules as well as to the various system busses. The system design can be such that signals are injected and detected at various locations in the receive and transmit chains, usually within the modules, in order to detect and isolate faults. When a fault is detected, either by an operator manually monitoring an output or automatically via a detector, spare (or lower priority) modules are reprogrammed as replacements, either from software already resident in these modules or from software downloaded to the modules from controller 302 (114, 206, etc.) and the appropriate switches such as SPMT switches 1002, 1004, 1102, and 1104 are thrown to route the signal through these replacement modules. AIU faults can be corrected either by supplying redundant AIUs or employing the AIU implementations described in the fault-tolerant AIU application previously referenced. Redundant busses can be easily utilized by those of skill in the art by employing the programmable I/O capability of the various modules. Also, by implementing suitable algorithms in the controller 302, the system can be automatically reconfigured: The fault can be automatically detected, spare modules reprogrammed and switched to replace failed modules, and the fault logged into memory for later maintenance action with the entire operation transparent to the operator except for possible an indication of the failure.

In the system 900 of FIG. 8, an airplane information management system computer 902 communicates with the flight control devices and the aircraft control and display computers 904 as well as with the assemblage of common receivers 106 and transmitters 204 needed for the various separate channel functions. In this particular example two identical but separate groups I and II of radio assets, each with their own CNI controller, are employed for redundancy and although not shown, additional common modules 106 and 204 could be employed as spares within each group I and II similar to FIGS. 10 and 11 and programmed to replace failed common modules previously assigned to one or more radio functions. The control/display units 904 control the system via the CNI controllers 903 discussed previously. For illustrative purposes, only two AIUs are shown for each type of radio, along with redundant CNI controller modules. But, as previously discussed, the invention architecture permits easy scaling to more (or less) radios of each type. If deemed necessary during system planning, additional radio channels, such as VHF channels, can be easily added by appropriately configuring the AIUs and tieing into the digitized voice and/or control/data busses. Except for the Nav AIU 912, which services receive-only radio functions, power amplifiers covering the appropriate bands are included in the AIUs. Digitized audio (including voice and tones such as Morse code or from marker beacon) is passed over a digitized audio bus 905 to the audio management unit 922 for distribution to the aircrew. Information such as navigation data is passed to the appropriate displays 904 over the control data bus 907. Additional busses of each type will be provided for redundancy and for possible additional traffic capacity (such as for VHF data radio). Although not shown, in the event of receive or transmit module failure for any of the CNI radios, lower-priority radio channels (e.g., the passenger SATCOM telephone channels) could be pre-empted and the receive/transmit modules switched in to support avionics functions. Also, redundant programmable common transmit and receive modules used as backups among different radio types are not shown and will be subsequently discussed. (The AIU control busses and transmit control busses are not shown in this example.) The system performs the radio function of and includes the antenna interface units for HF radio, VHF radio (both voice and data), commercial SATCOM, Microwave Landing System (MLS), VHF Omni-Range (VOR), the localizer (LOC), glideslope (GS) and marker beacon (MB) components of the Instrument Landing System (ILS), automatic direction finding (ADF), Mode S and distance measuring equipment (DME). And although the invention architecture can be configured to include Traffic Collision Avoidance System Class II, (TCAS II), TCAS II is provided by separate equipment in this particular example. However, the required Mode S interface to the separate TCAS II equipment is provided via element 920. And although not shown, commercial GPS can be provided. If the GPS update rate can be relatively infrequent, a GPS antenna can be connected to the navigation (Nav) AIUs 912 and the common receive module associated with this AIU can be time-shared with the other indicated Nav CNI radio functions.

For example, AIUs 906 and the associated receive and transmit modules perform two way HF voice communication. AIUs 908 and the associated receive and transmit modules perform two-way VHF communication, either for voice and data. Because HF and VHF radio are not usually used simultaneously, these two communication functions can share the same pair of common receive and transmit modules (which are programmed for either type of communication function) via the shared transceiver RF path connecting the associated AIUs. Single or multiple-channel duplex SATCOM is also provided, via an appropriate frequency multiplexer in the SATCOM AIUs 910, either for voice/data use by the aircrew or for passenger telephone service. A common receive and transmit module pair is used for each channel. The Nav AIUs 912 are implemented to service the receive-only functions MLS, ILS, VOR and ADF. (Although the landing system function is not strictly a navigation function, MLS and ILS are sometimes commonly grouped into the navigation class.) Again, these functions are not normally used simultaneously so they can share the same receive module, which is programmed in advance for the appropriate function. While enroute either VOR or ADF is used for navigation, depending upon which navigation aid is used in the region. During initial landing approach the common receive module is programmed for ILS or MLS, depending upon which type of landing system is employed on the ground. (This same common receive module can also be programmed to support differential GPS landing if used for landing in the future.) If there is a situation whereby the landing signals cannot be acquired and a VOR or ADF navigation update is needed, the timeliness involved permit a cycling between landing and navigation readings until the landing signal is acquired. Also, in this example configuration, distance measuring equipment (DME) time-shares the same receive module via the shared receiver RF path connecting the Nav and DME/Mode S AIUs 914. The DME/Mode S AIUs 914 service the DME and Mode S functions. Mode S antenna diversity is provided via two common receive modules, each connected to a top or bottom antenna in the associated AIU. Identification signal amplitudes from each antenna are made in each receive module, routed to the associated transmit module over the transpond bus, and the transmitted reply is switched to the antenna with the larger received signal on direction from the transmit module over the transmit discrete line indicated in FIG. 3. Also, DME and Mode S time lines permit the sharing of the same transmit module as well as a sharing of the same power amplifier in the DME/Mode S AIU. In this case the DME identifications of a distant ground beacon are scheduled around the higher-priority Mode S replies. FIG. 8 is just one example of how the invention architecture can be configured to provide an integrated CNI radio system for a commercial transport airplane. The architecture can also be scaled to other airplane applications by adding or deleting modules.

Figure 9:
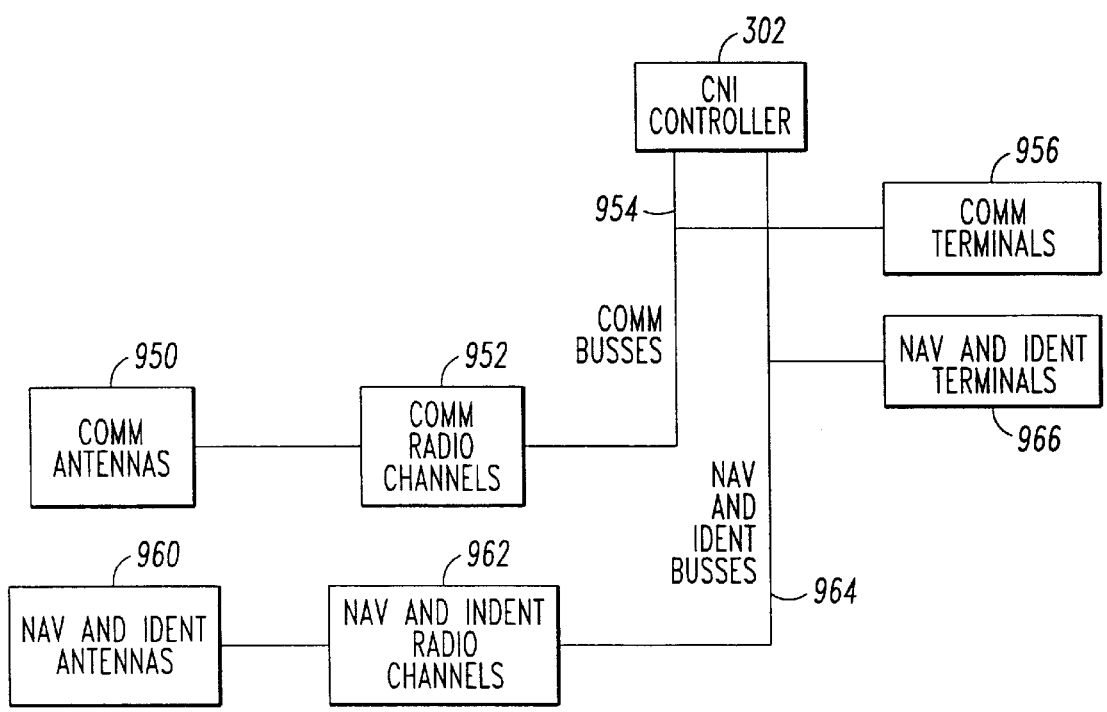
FIG. 9 illustrates an example of bus partitioning.

When multifunction transceiver systems such as that illustrated in FIG. 8 are provided it is possible and sometimes preferred to partition the control functions into two separate busses along functional lines as illustrated in FIG. 9. As can be seen in FIG. 9 the radio functions are partitioned into communication functions and navigation/identification functions. The communication antennas 950 are connected to dedicated communication channel transceivers 952. These transceivers are controlled by a controller 302 through a dedicated communication bus 954 that also carries the communication data to the communication terminals 956. This bus may also be split into separate control and Comm data busses. The navigation/identification antennas 960 are coupled to dedicated transceivers 962 and communication is over a dedicated bus(ses) 964 between the controller 302, navigation/identification terminals and the transceivers 962. This configuration, similar to the configuration of FIG. 8, provides additional bus traffic capacity and permits the formats and protocols of each type bus to be tailored to the type of information passed over the bus. Also, when INFOSEC is involved, usually for military applications but perhaps also future commercial applications, this configuration permits a more easier separation of secure and non-secure channels. For example, busses for secure communication channels are separated from the normally non-secure navigation channels. Although not shown, a separate CNI controller may be desired in this latter case for isolation considerations. Furthermore, if the identification function also includes INFOSEC (e.g., IFF Mode 4), a separate secure channel including bus interfaces can be provided.

Redundancy can be provided in complex systems, such as that of FIG. 10, by providing SPMT switches as previously mentioned. Such a redundant architecture system 1000 is illustrated in FIG. 10. In this architecture each channel includes either a common receive module or a common transmit/receive module pair coupled to the corresponding AIU 308 for that channel, preserving the channelized configuration. The redundancy is provided by transmit and receive switches 1002 and 1004 coupled to spare common receive 1006 and common transmit 1008 modules that can be dynamically programmed to perform any of the transmit or receive functions of the system 1000. These spare modules 1002 and 1004 serve as universal backup modules for all transmit and receive functions of interest. Appropriate conventional power splitters and combiners are provided in the AIUs 308 to allow the routing change to be performed substantially instantaneously.

Redundancy can be further improved by a system 1100 as illustrated in FIG. 11. This system 1100 includes pairs of transmit 1102 and receive 1104 switches and corresponding pairs of spare common transmit 1106 and receive 1108 modules. This in conjunction with suitable fault-tolerant AIUs described in a related application typically increases by several orders of magnitude the available lifetime of system 1100 over system 1000. The system would likely be configured to perform built-in test (BIT) and could also be configured to perform fault-isolation test (FIT) and automatic reconfiguration of replacing the failed channel hardware with a spare backup that is appropriately reprogrammed.

Figure 12:
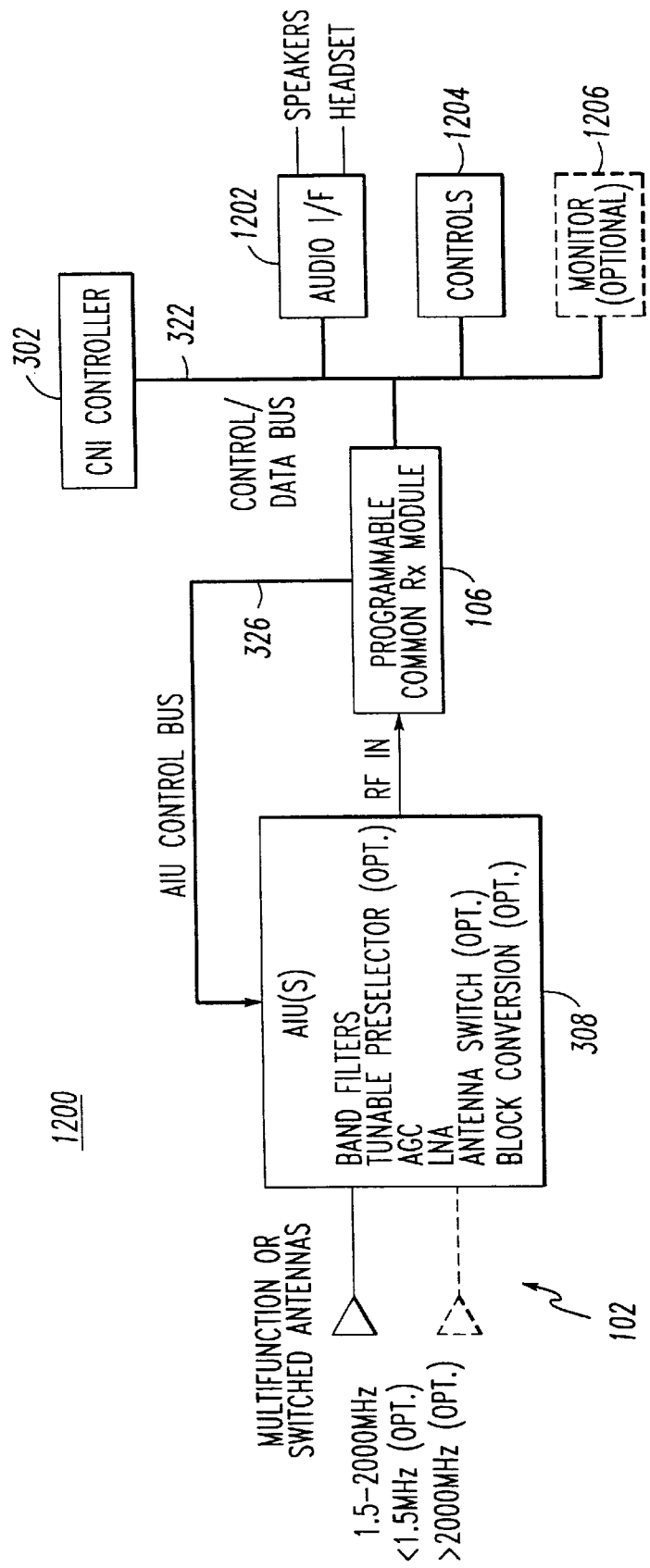
FIG. 12 illustrates a single channel multi-function communication receiver.

FIG. 12 illustrates one of the simplest configurations that can be created using the architecture of the present invention. A multi-band receiver system 1200 is illustrated that includes a single channel receive only function such as are provided by commercial broadcast radio using a single programmable common receive module 106. The system can include standard audio components 1202 and the necessary controls 1204 for switching between channels as well as an appropriate monitor 1206, if needed. The various receive channels of such a system when in a scanner mode can be time-multiplexed in a "scanner" that senses activity in any one of the channels that are included in the set to be scanned. The fastest lock-on to an active channel occurs when the receiver demodulation program(s) are resident in the common receive module 106. Somewhat longer lock-on occurs when the demodulation corresponding to a received waveform must be downloaded from the CNI controller 302 prior to monitoring the activity on a particular channel. For those functions which require special additional processing, a channelized message processor (CMP) module or an information security (INFOSEC) module can be provided in the channel between the receiver module 106 and the control data bus 322. The modules can also be provided in parallel with the control data bus 322 such that the controller 302 includes separate buses for these modules. In addition separate control and message buses can be provided.

Figure 13:
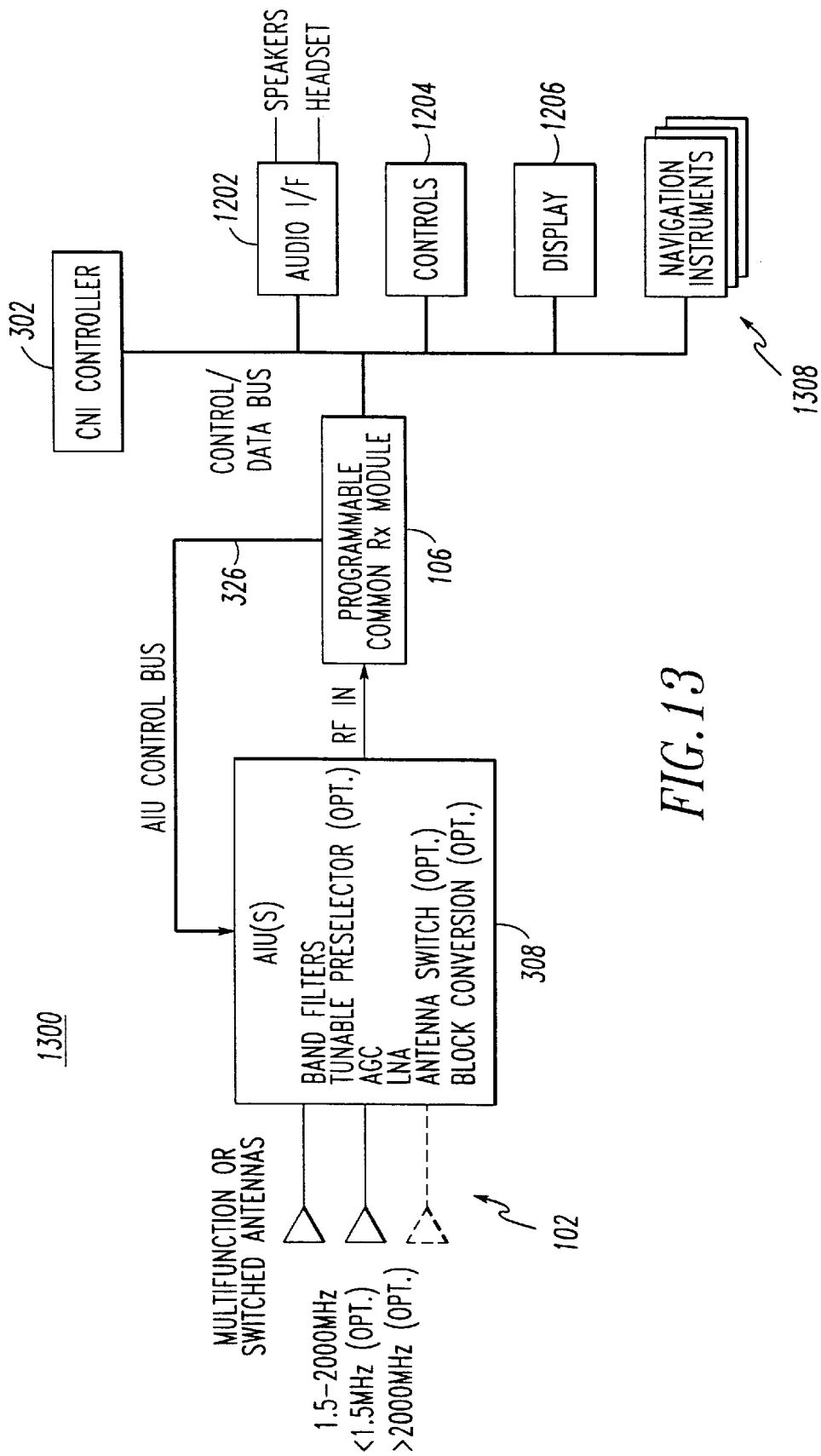
FIG. 13 depicts a multifunction navigation receiver using a single channel.

FIG. 13 depicts a multi-function navigation receiver system 1300 that provides a single programmable channel. This system 1300 includes the user interface 1202, controls 1304 and display 1306 as in the system of FIG. 11, however, the controls 1204 control the multiplexed loading of the programmable characteristics of the different type of navigation functions to be performed depending on the particular navigation instruments 1308 provided. The three functions (localizer, glideslope, marker beacon) comprising the ILS function can be rapidly scanned (multiplexed) to produce a composite output for display and audio purposes while the antennas 102 are also multiplexed accordingly.

Figure 14:
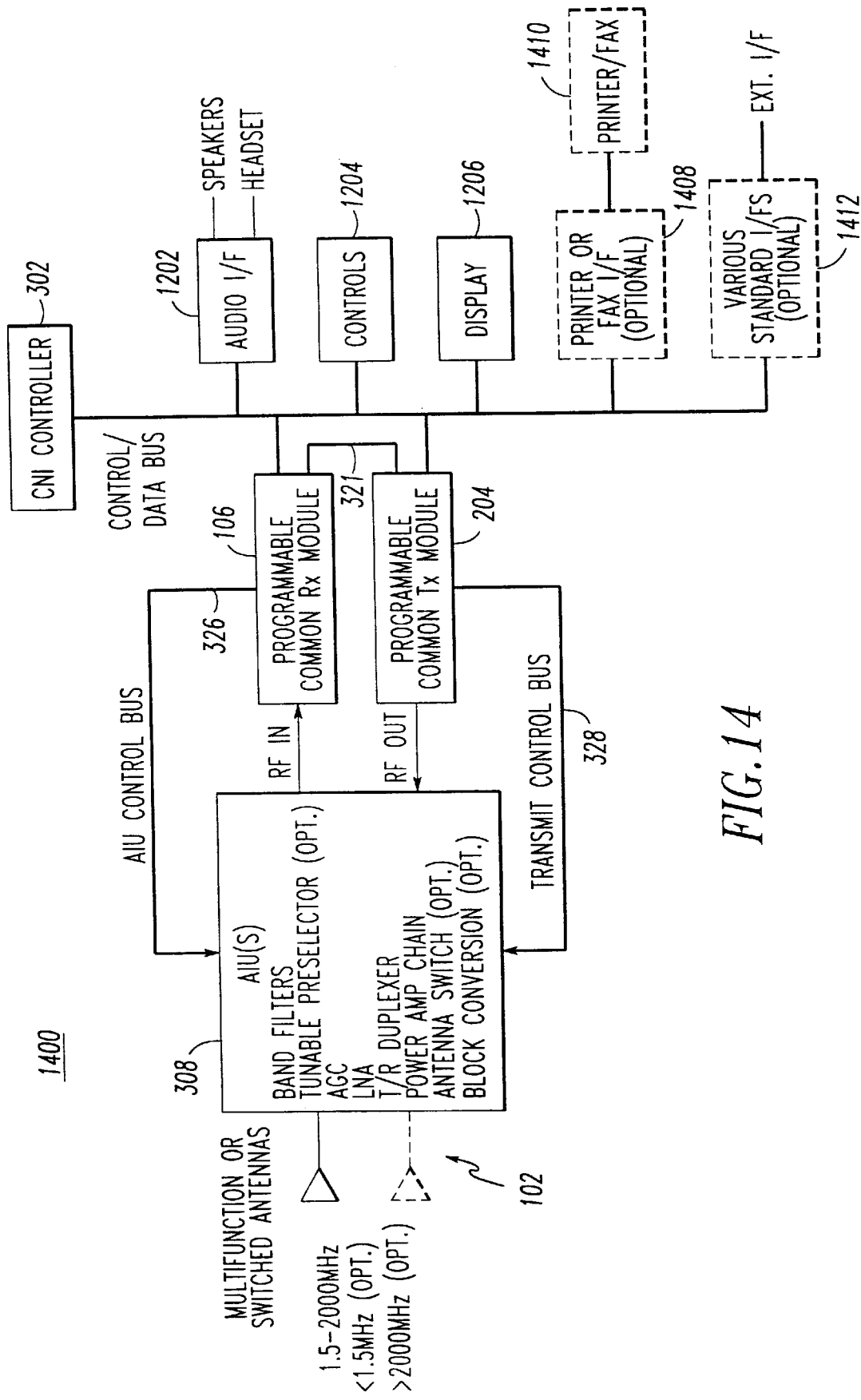
FIG. 14 shows a multifunction communication transceiver using a single channel.

The system 1400 of FIG. 14 is a multiband transceiver with a single programmable channel having both a common receiver module 106 and a common transmitter module 204. In addition to the peripherals provided with respect to the previous embodiments this embodiment can include other transceiver type peripherals 1408, 1410 and 1412. Both half-duplex and full-duplex operation can be provided by using the control busses 326 and 328. Homing on a distant transmitter can be achieved by comparing the phase of two or more time-multiplexed antennas 102 by controlling antenna switching over bus 326. As in previous embodiments, a channelized message processor (CMP) module and/or an information security module can be provided between each of the transmit 204 and receive 106 modules and the controller 302. The bus 321 can be utilized for either a transponder or relay function, or to share processing resources between the common receive and transmit modules.

Figure 15:
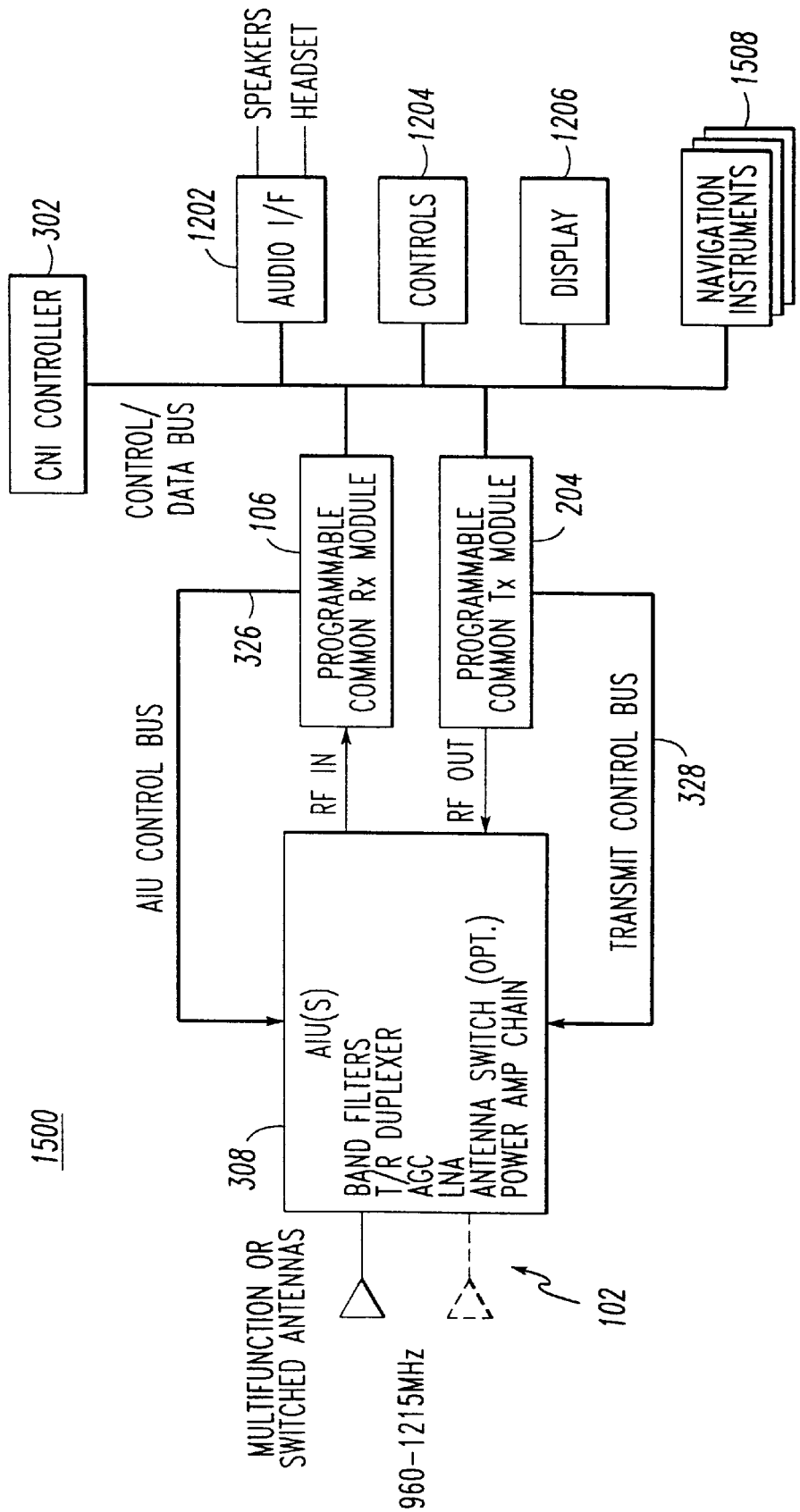
FIG. 15 depicts a multifunction navigation transceiver.

A multifunction navigation transceiver system 1500 is illustrated in FIG. 15. This system 1500 includes many of the same components as in FIG. 12 except that the navigation instruments 1508 include both transmit and receive components, such as DME, TACAN and TCAS. When timeliness permit, functions can be interleaved with transponder and identification functions of later figures.

Figure 16:
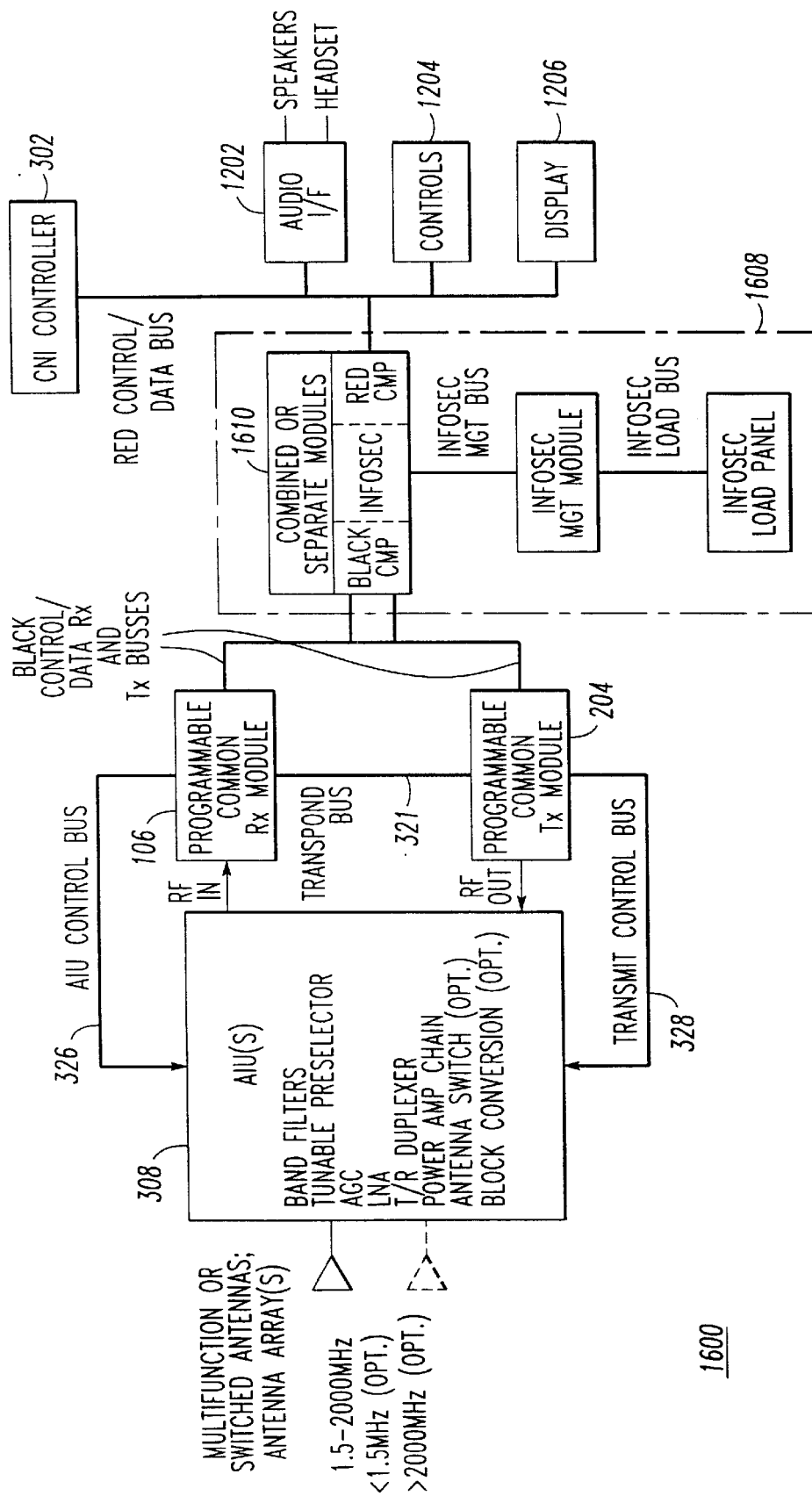
FIG. 16 illustrates a radio repeater/transponder with or without the option of information security (INFOSEC)

FIG. 16 depicts a system 1600 that provides identification and transponder functions. In commercial systems the CMP and INFOSEC module sections 1610 would normally be absent. The CMP functions are different than the INFOSEC functions, although both are often present in many applications. However, there are applications that require additional CMP without INFOSEC: For example, HF radio with automatic link establishment (ALE); data or digital voice communications in the HF, VHF, UHF, SATCOM or other band that require bit stream interleaving/deinterleaving to overcome atmospheric fading or jamming, or that require higher levels of forward error correction than can be afforded in the common receive and transmit modules, or that require modulation bandwidth reduction for voice via, e.g., linear predictive coding (LPC); various forms of network processing; etc. Also, there could potentially be some simple future communication (or even navigation or identification) applications that do not require nonsecure message processing that the common receive and transmit modules cannot provide but that require some measure of information security. So we should not routinely refer to CMP plus INFOSEC as a security section. In such a system 1600 replies to valid identifications are transmitted in an allotted time period using the transpond bus 321. When either CMP functionality or INFOSEC functionality is included in section 1608, instead of using the transpond bus 321 between the common Rx 106 and Tx 204 modules, the transpond loop is formed through the INFOSEC and/or CMP section 1608, which may be comprised of a single or separate CMP and INFOSEC modules. In this system 1600 repeater operation is possible with or without INFOSEC. The transpond bus can also be used for a low-delay repeater from one carrier frequency to another carrier frequency with a limited amount of error correction. Waveform transformation and a limited amount of error correction is also possible. The AIU 308 must be suitably designed to pass the repeater traffic. Repeater operation is also possible by closing the repeater loop through the CMP modules, with or without INFOSEC. So doing provides benefits afforded by additional CMP and/or INFOSEC processing, including higher levels of error correction, internetworking (including the changing of INFOSEC formatting), and routing between different communications functionality.

Figure 17:
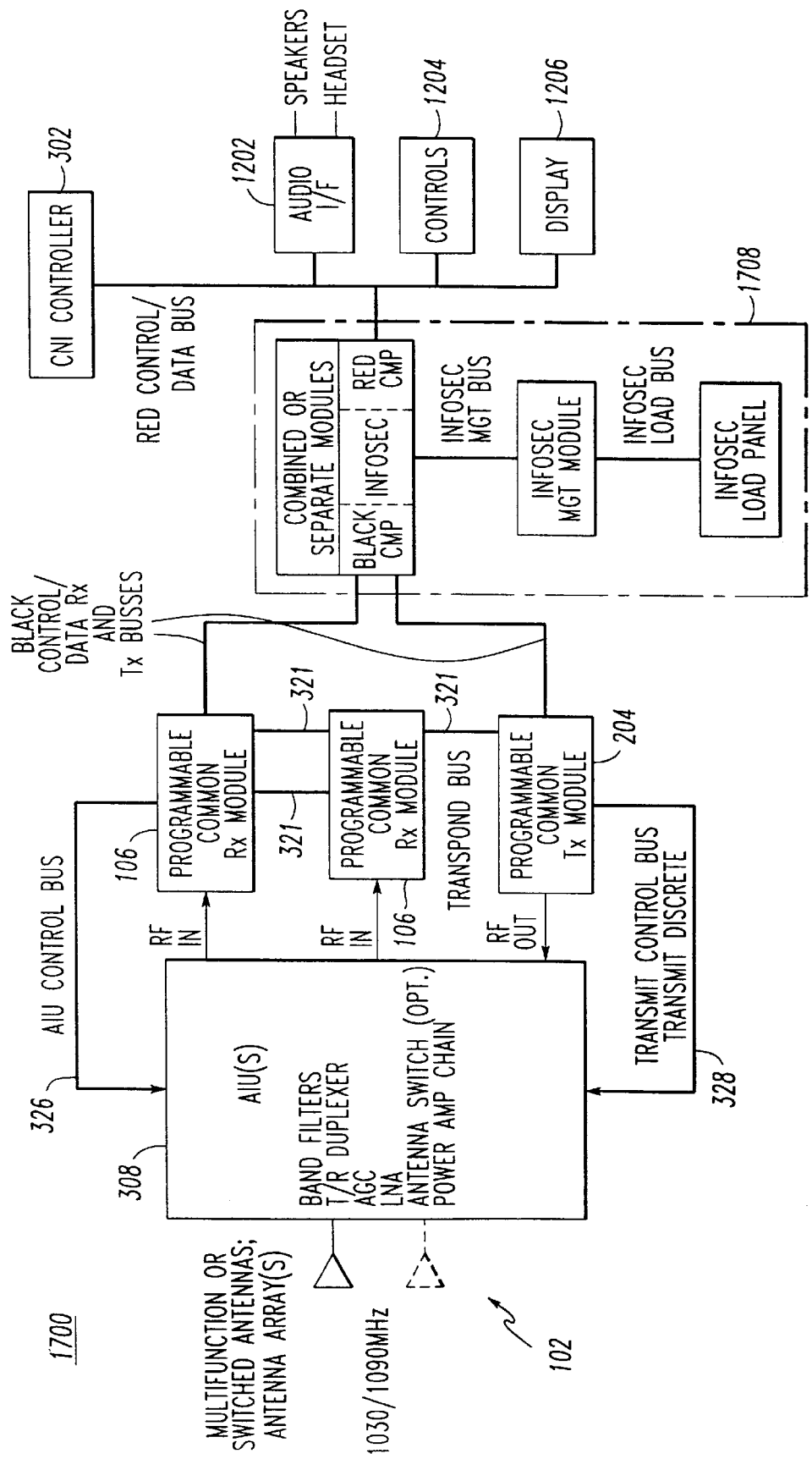
FIG. 17 illustrates an identification transponder providing antenna diversity with the option of security.

The system 1700 of FIG. 17 is an identification system with antenna diversity between two antennas 102 and thus includes two common programmable receive modules 106 and, thus, two receive channels. Transponder replies to valid identifications are transmitted in the allotted time period back through the antenna that receives the larger identification signal requiring that the transmitter module 204 be programmed according to the channel in which the transmitted response is to occur. Once again INFOSEC and/or CMP sections 1708 can be provided or omitted. Section 1708 is omitted, for example, for Mode S, Air Traffic Control Radar Beacon System (ATCRBS) or TACAN radio functions, but is provided, for example, for Interrogate Friend-or Foe (IFF) Mode 4 functionality. Instead of using the transpond bus between the common Rx and Tx modules, the transpond loop is formed through the INFOSEC/CMP module.

Figure 18:
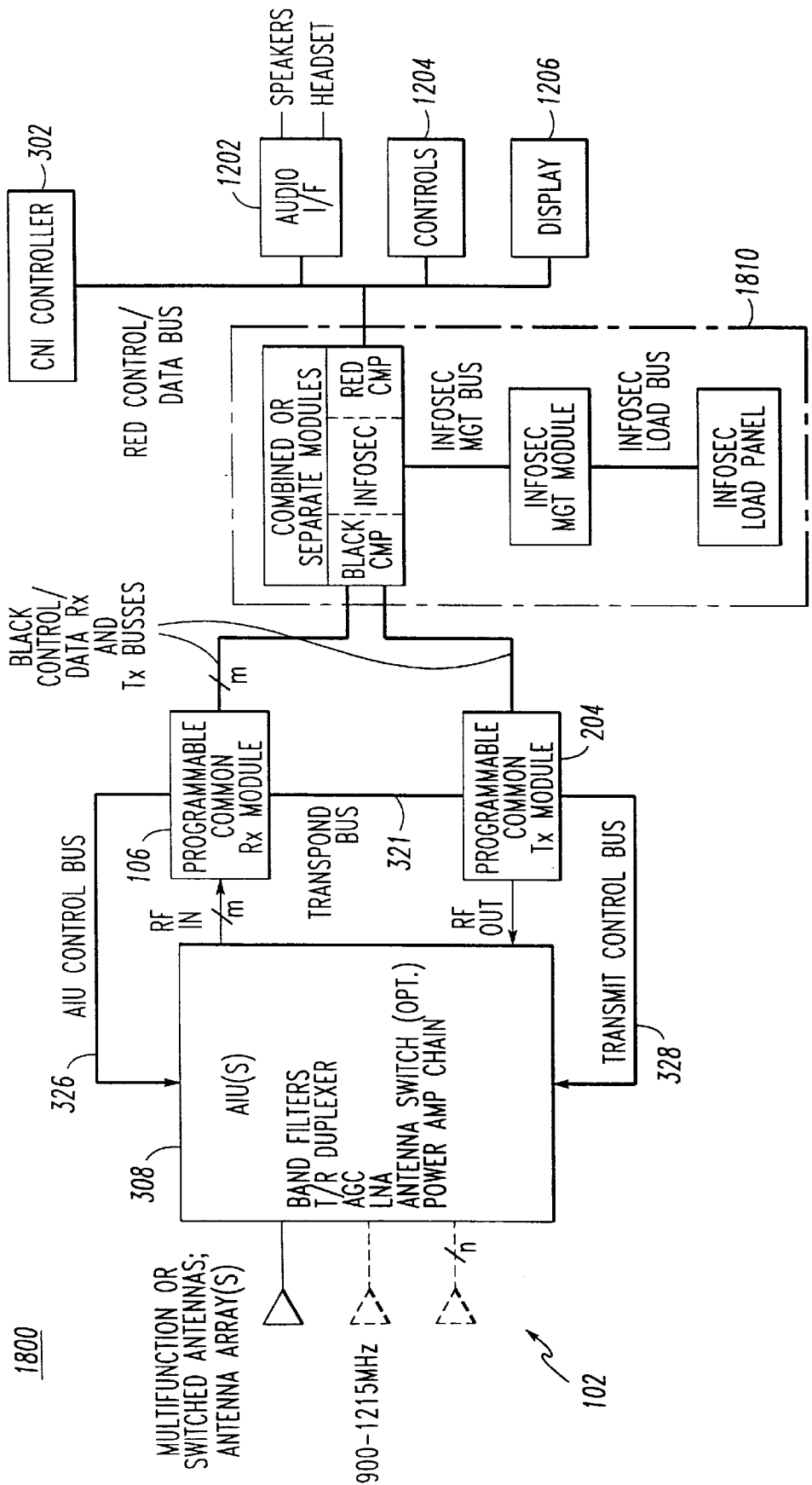
FIG. 18 depicts a multiple receive channel transceiver system.

FIG. 18 illustrates a system 1800 that provides multiple (m) programmable receive channels for identification and identification functions by programming the single common receive channel module 106 for each different function. Identifications are transmitted and angles-of-arrival of received replies may be measured by comparing monopulse phase and/or amplitude received from multiple (n) antenna elements 102. In this case the receive modules may be suitably configured for a common phase reference by providing an additional analog interconnection among them such that the synthesizer in one of the receive modules is the common synthesizer source (not shown). The number of required multiple receive channels (as well as the number of antennas) depends upon the system mechanization for obtaining angle-of-arrival information. The system can include or omit portions of the INFOSEC/CMP section 1810. The same basic embodiment with only a single antenna can be used as a JTIDS terminal. In this case, the number of receive channels depends upon the required lockup time of the security section.

Figure 19:
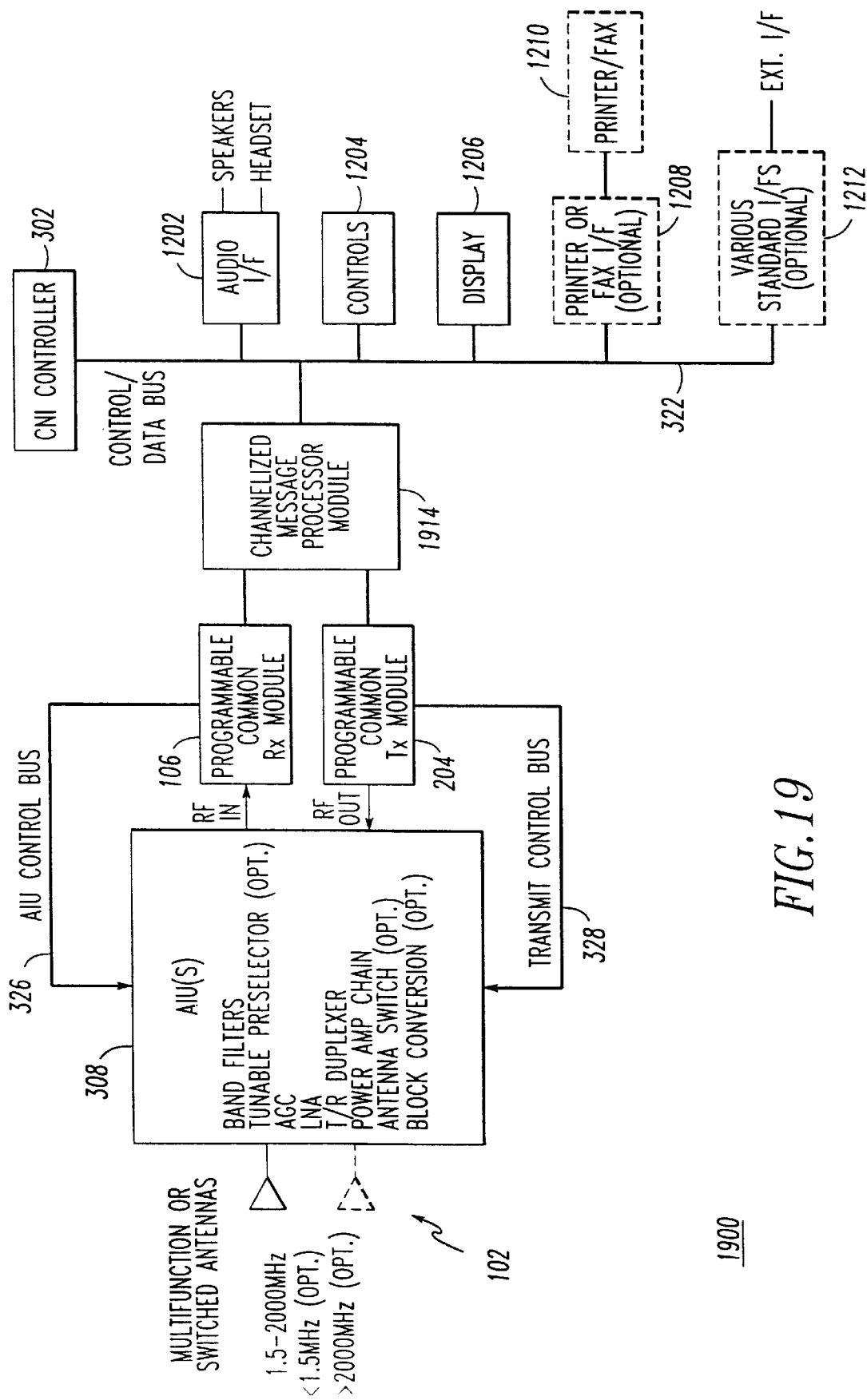
FIG. 19 depicts a single channel radio system requiring additional message processing.

The system 1900 illustrated in FIG. 19 comprises a message intensive radio, such as a commercial avionics VHF radio that requires channelized message processing 1914 similar to the CMP discussion with respect to FIG. 16 and provided typically by a general purpose processor. These radio functions require message processing that cannot be provided by the processing included in the common receive 106 or transmit 204 modules. Nonetheless, the bus interface between these units 106/204 and the CMP 1914 is usually low-speed serial. Of course a security section (not shown) can be provided between the common radio modules and the control/data bus if desired.

Figure 20:
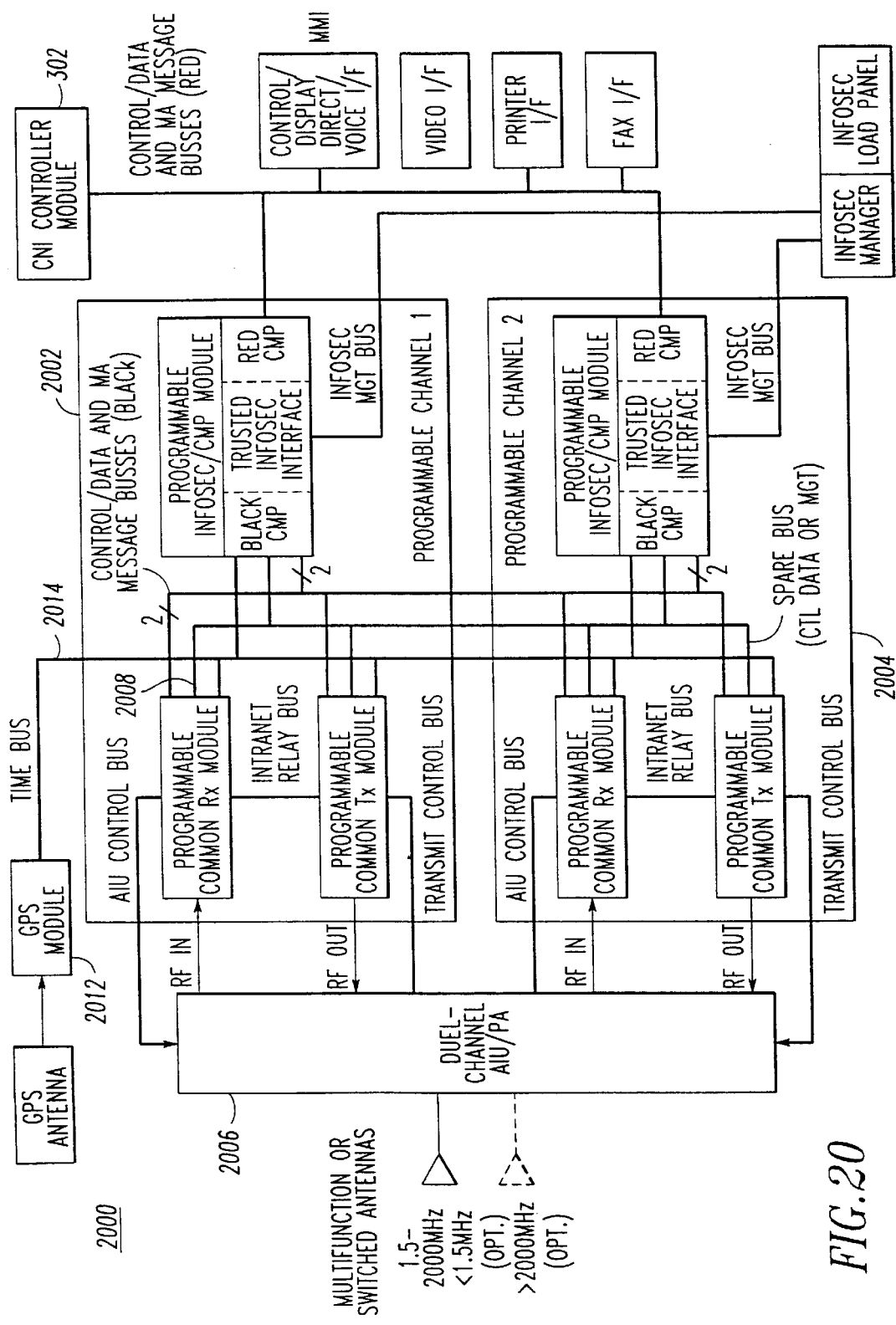
FIG. 20 illustrates a two channel transceiver with the option of security and additional message processing.

FIG. 20 shows an example of the simplicity of scaling radio capacity from a first channel 2002 to a second channel 2004 by adding a channel and a dual channel AIU 2006. Note each channel is tied either to the same antenna or to a different antenna. A message bus (not shown separately) may be added (as an example) to increase traffic capacity or to reduce protocol complexity. This figure also shows an example of adding a spare bus line 2008 that can be programmed as either a control/data bus or as a message bus. One channel can be used as a repeater; the other channel as a user station; or both channels can be used as repeaters or as user stations. INFOSEC/CMP functionality 2010 may or may not be employed. A time reference may be provided via a GPS module 2012 and a time bus 2014, to be used, for example for INFOSEC timing.

Figure 21:
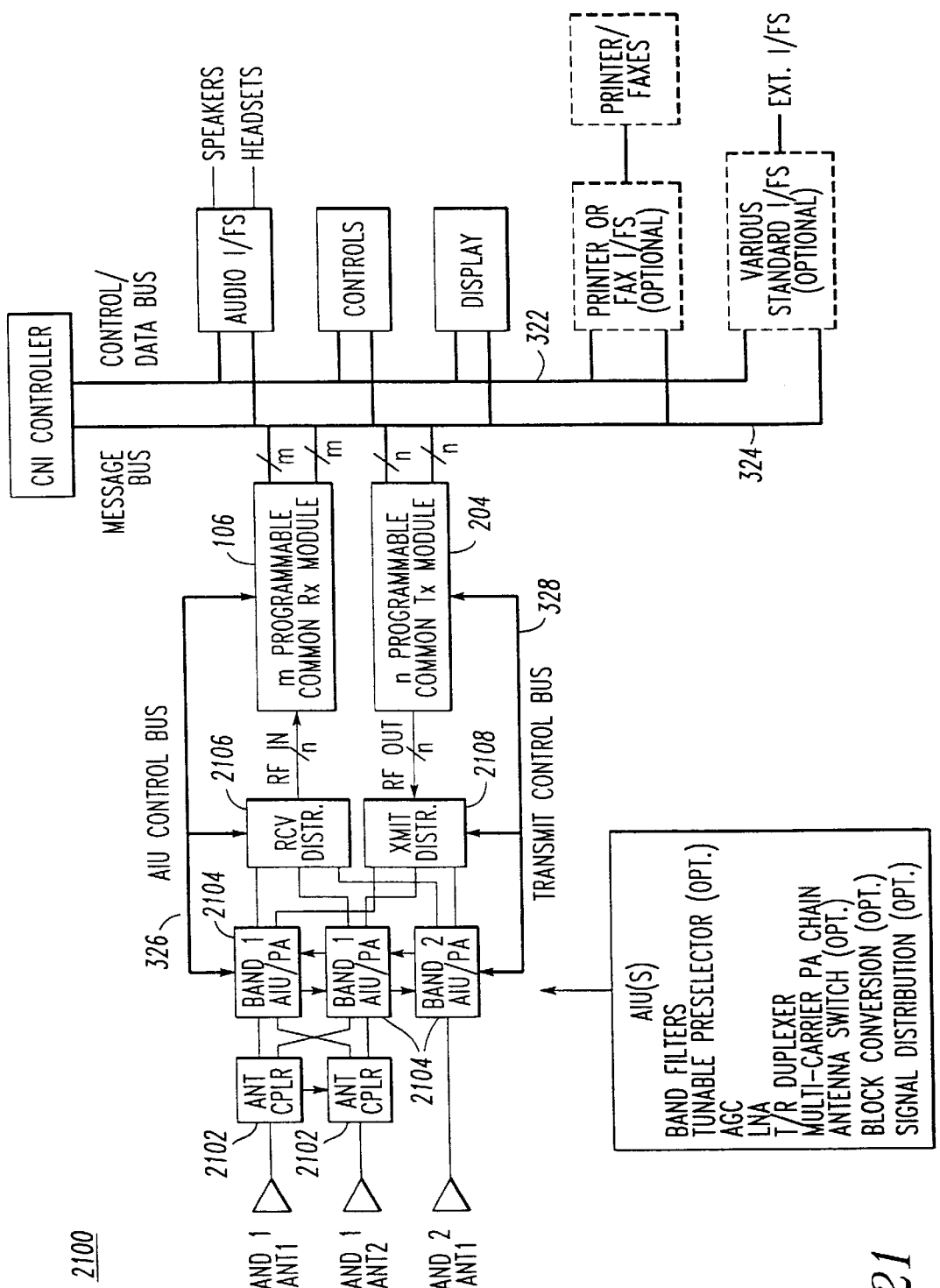
FIG. 21 depicts a multiband transceiver using multiple modules.

A multiband transceiver system 2100 which provides multiple programmable channels and multiple carrier power amplifiers is shown in FIG. 21, although the system can be configured such that each power amplifier handles only a single carrier for efficiency or prime power consideration. Multiple antenna couplers 2102 provide antenna switching between multiple AIUs 2104. Receive 2106 and transmit 2108 RF signal distribution modules route signals for the multiple (m) common receive 106 and multiple (n) common transmit 204 modules. In this system 2100 each power amplifier in each AIU 2104 could be designed to handle multiple carriers, thus permitting two or more independent transmit carrier channels. The message bus 324 can be configured to be multiple access (i.e., intercom) from multiple user stations.

FIG. 22 illustrates the expansion of the multichannel system of FIG. 21 into a system 2200 that includes multiple (m) specialized channel processors 2202. The figure shows one example of connectivity between the common receive/transmit modules and the special processors 2214 that may include INFOSEC/CMP. Other forms of connectivity are possible. Although some of the Rx/Tx channels may be clear, all com channels must pass through a trusted INFOSEC interface as shown.

FIG. 22 shows a generalized example of how INFOSEC may be provided with the invention when INFOSEC capability is included in various channels, and with the channelized message processors in this example. Only several antennas are shown for simplicity but the CNI functionality could be similar to that shown in FIG. 23, except where information security is provided for at least some of the channels in FIG. 23, for example some of the HF, VHF and UHF channels. With respect to FIG. 22, and also with respect to FIG. 3, the red CMP functionality 312, the black CMP functionality 316 and the INFOSEC functionality 314 are all combined into a single CMP/INFOSEC module 2214. Furthermore, because security is to be provided for 2 half-duplex radio channels, for example Rx1/Tx1 for VHF Comm and Rx2/Tx2 for UHF Comm, there are 2 separate CMP/INFOSEC modules, CMP1 and CMP2, that control the flow of secure information via COMSEC by encrypting or decrypting message traffic. That is, M=2 in FIG. 22 such that two secure channels of different type encryption/decryption can be simultaneously active at the same time. (In addition, these CMP/INFOSEC modules can control the secure TRANSEC operation such as frequency hopping or direct sequence spread spectrum, both according to a secure key, of the programmable receive and transmit modules via ctl/data busses 2230 and 2232, or via separate TRANSEC busses 29330a and 29330b shown in FIG. 30 and 31.) Note, however, that not only the secure channels but also the clear channels, in this case Rx3/Tx3 and Rx4, must also pass through INFOSEC control to insure that secure information is not transmitted, either through the clear transmit path or through leakage out of a clear receive path. Although a simple embodiment only requires that all channels pass through a single CMP/INFOSEC module, the connectivity diagram 2230 in FIG. 22 shows a level of redundancy whereby all receive and transmit modules are connected to both CMP/INFOSEC modules, such that if one of the CMP/INFOSEC modules fails all clear channels can continue to operate through the other CMP/INFOSEC module. Furthermore, if both CMP/INFOSEC modules are INFOSEC programmable to handle the INFOSEC modes of interest, both secure channels (VHF Comm and UHF Comm in this example) can at least shared secure operation through the CMP/INFOSEC module that has not failed. In this case each CMP/INFOSEC module has a switch (e.g., an FPGA switch) at its I/O that is under control of the operational INFOSEC software that routes the secure signals to the internal INFOSEC processing and routes the clear signals straight through. Upon receipt the clear and decrypted secure signals are fed from the common receive modules to a CMP/INFOSEC module, processed accordingly as secure or clear signals, and are time multiplexed onto the high domain (i.e., red) serial message bus in the proper time slot. Upon transmission the clear and secure signals are time demultiplexed from the proper time slot of the high domain (i.e., red) serial message bus, encrypted if appropriate and not if otherwise, and switched to the appropriate common transmit module. In addition to and similar to the channelized messages, control signals passing to/from the CNI controller to/from the common receive and transmit modules are likewise under the control of the CMP/INFOSEC modules to insure that secure information is not accidentally passed to the common receive and transmit modules on the low domain (i.e., black) control/data busses.

The mechanization shown in FIG. 22 is particularly attractive when INFOSEC is employed and when there is a large number of individual user stations comprised of various equipment interfaces such as 2204, 2206, 2208, 2210 and/or 2212, and where various user stations desire the capability to access some or all of the receive and transmit radio channels afforded by common receive modules 106 and common transmit modules 204. In this case the INFOSEC/CMP sections 2214 receive data (including digitized voice if appropriate) from the various common receive modules 106, performs the appropriate CMP and INFOSEC processing including formatting, and time-multiplexes the data into the assigned time slot on message bus 2216. Similarly, the INFOSEC/CMP sections 2214 receive data from various time slots on message bus 2216, performs the appropriate CMP and INFOSEC processing including formatting, and routes the data to the appropriate transmit module 204 corresponding to each time slot. Since most applications require INFOSEC capability in relatively few channels at the same time, usually no more than 5 or 6 and often only 2 or 3, there is no need to provide, as shown in FIG. 24, an INFOSEC terminal for each user device which could number more than 10 or 20 for some multi-station applications, albeit some user equipments such as control/display units could operate off the same INFOSEC unit. The INFOSEC terminals in FIG. 24 would normally contain only COMSEC-type functionality, and TRANSEC functionality, if employed but not shown, would likely be associated with the common modules in each radio channel as discussed previously. Also, if employed, the red CMP portion of the channelized message processing must also be provided at each user station. On the other hand, the INFOSEC/CMP section 2214 is somewhat more sophisticated than the INFOSEC/CMP portions 2402 shown in FIG. 24 because section 2214 must properly multiplex and demultiplex secure and sometimes non-secure data to and from message bus 2216. If desired the message bus 2214 could be segregated into separate busses to handle additional traffic and/or different levels of security.

For some applications the TDM message slots of message bus 2216 (which could also include control data) may be configured where the bus provides intercom functions between user stations in addition to the radio channel connectivity described above. For example, time slots could be assigned to various user stations and to various radio channels such that any user station could communicate with any other user station, or with any radio channel. In this case the controller 2220 controls the operation of the time-division multiplexed bus.

FIG. 22 also serves to illustrate the flexible networking capabilities of a communication node. For example, radio channel/CMP (and possibly INFOSEC) combinations could be assigned to various radio networks, such as SINCGARS (Single-Channel Ground-to-Air Radio System), EPLRS (Enhanced Position Location and Reporting System) and DAMA (UHF) SATCOM. (Networking functionality is performed in the CMP units and, when INFOSEC is also employed, within the red CMP units.) For example, a user employing a computer control 2206 and display 2208 may desire to communicate with a distant radio station that is also tied into a radio network. The user may not even know (or care about) the exact nature of the net employed by the distant station (which may even be different from the above networks, including land line network) or, for that matter, even know or care about the intervening nets (which may also be different from the above networks) connecting the user with the distant station. The user places the call using the local or wide area address of the distant station or person, and the channelized message processing for the respective networks establishes connectivity, if possible, to the distant station via various links to the next relay stations and additional relay stations according to the predetermined rules for network establishment and usually under the overall direction of the CNI controller. For example, the connection to the distant station can be sequentially attempted on all available radio networks, or can be attempted simultaneously depending upon the priority level of the call. Also, INFOSEC functionality can also be inserted if necessary according to the standard practice associated with each radio. Multiple radio networking choices for the user connection to a distant station is highly desirable for intervening mobile radio networks, where the connectivity of different radio links can change depending upon motion or environmental conditions.

Similar to the above connection of a local user to a distant station using various radio networks, the radio architecture in FIG. 22 can also serve as a network relay for a given network or as a network router between different types of networks. Signals from one type of radio network can be received with a common receive module programmed for the proper radio channel, appropriately formatted in an associated CMP module, routed, for example, over a message bus to another CMP module where it is appropriately formatted for another radio network, passed to common transmit module for proper signal modulation, and passed to the associated AIU and antenna for retransmission into free space.

FIG. 23 shows a system for a military transport airplane. The system is similar to the commercial transport airplane CNI system of FIG. 8 except that military CNI radio functions are implemented. The major functional differences for this particular example is that SATCOM, Mode S and DME are not employed and UHF communication (Comm), IFF and TACAN are employed. The military portion of the VHF Comm band and UHF Comm is included by adding the appropriate filtering in the V/UHF AIU 2312. IFF transponder is integrated with Mode S and the TACAN interrogator replaces the DME interrogator. Similar to the system of FIG. 8, the common receive and transmit modules are grouped according to the Comm AIUs 2310 and 2312, Nav AIU 2314 and transponder/interrogator AIU 2316. Also, the HF AIU 2310 connects to an antenna tuning unit (ATU) rather than directly to an HF antenna. Antenna switches are provided in the various AIUs 2312, 2314 and 2316 to route RF signals to/from the desired antennas. Similar to the system of FIG. 8, the system has dual independent redundancy and, at any one time, can service 2 Comm channels, 2 navigation channels or interrogators, and 2 transponders. Similar to DME operation in FIG. 8, a common receive module 2326 is used either with the Nav functions or with TACAN via the shared receiver RF path 2340. Also, similar to FIG. 8, a Mode S interface 920 is provided to separate TCAS II equipment which is not shown. In addition, an extra common receive module 2322 is assigned to the each Comm function in order to rapidly scan through any desired combination of HF, VHF and UHF SSB or AM guard channels for activity. Control of the system is through the dual-redundant CNI controllers 2344 and 2346 which are, in turn, controlled externally by users or aircraft equipment via (normally preferred) MIL-STD-1553 busses 2348 and 2350. The interfaces to external equipments 2352 depend upon the application but they are typically similar to the interfaces 924 and 926 to the audio and control/display units of FIG. 8. Analog and/or digital inter-rack connections 2354 can also be provided if desired for additional usage of common circuitry, for example, if an AIU fails in rack #1 the associated common receive and transmit modules could be connected via fault-tolerant switching to operate with the appropriate AIU in rack #2.

Figure 34:
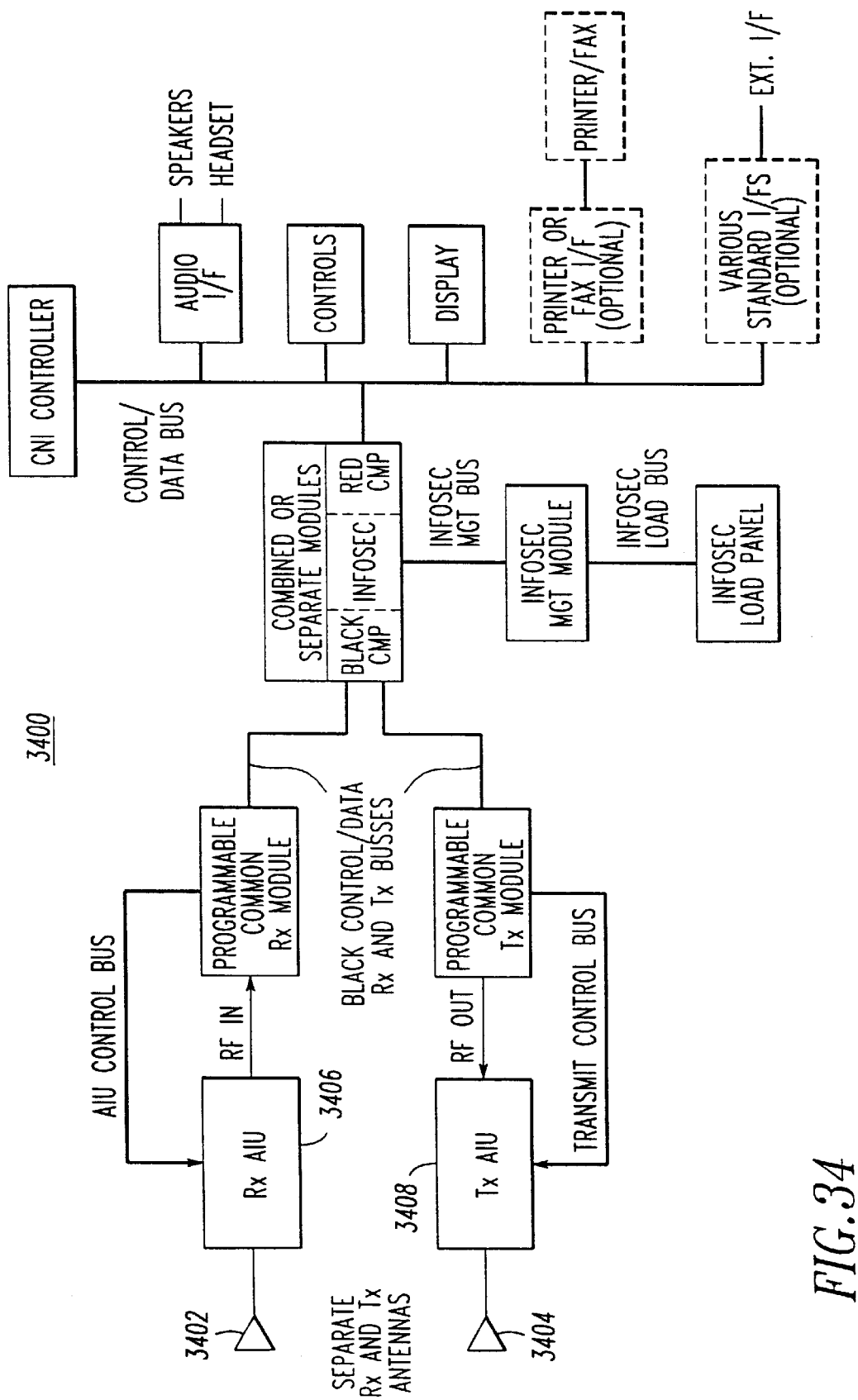
FIG. 34 depicts separate antenna interface units for receive and transmit paths associated with the same (fullduplex) radio function.

FIG. 34 shows a case where separate antennas (and in this case separate AIUs) are employed for the receive and transmit paths associated with a particular radio function. This implementation might be used for full-duplex operation, for example in commercial SATCOM, cellular phone or other type of radio operation, where signal reception on one frequency channel can occur simultaneously with relatively high-power signal transmission on another channel, and the antennas are in separate locations to minimize transmitter-to-receiver interference. In this case there is not need for a T/R duplexer in either of the AIUs.

The programmable digital radio architecture of the present invention is one where the radio channels are partitioned into hardwired modules, non-common and common as discussed above, where the common portion can be rapidly programmed to service a wide variety of CNI functions, and for which the partitioning minimizes hardware overhead in the common portions to make it practical for these common portions to be replicated many times in a given application as well as among different applications, and such that the total hardware for an integrated multiple-function CNI radio system application is dramatically reduced because the programmable common channels can be time-shared among various CNI radio functions, and where the total cost for an integrated multiple-function CNI radio system application is dramatically reduced because of less total hardware and because of economy of scale cost benefits realized by fewer module types used within and among applications.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, the receiver module 106 can be improved with respect to flexibility by A/D converting at an earlier IF stage and the transmitter module 204 can be improved by D/A converting at a later IF stage such that more IF conversion is done in the digital submodules when the evolution of such conversion technology exists in order to reduce the relatively bulky and somewhat expensive analog circuits in these modules. The special application modules 310 can be configured to handle advanced and future waveforms which require processing in another domain such as frequency. As processing speed gets greater, or processing hardware gets smaller, message processor and security functions can be included within the common modules 106 and 204. For special waveform processing the output of the A/D switch 606 can be provided through a special output port to a specialized very high speed processor.

With respect to FIG. 7B and FIG. 5, an alternate partitioning of circuitry between the analog submodule 800 (of the common transmit module 204) and an AIU such as 104 is obvious to those of skill in the art in order to reduce overall system hardware for some applications. The embodiment shown in FIG. 7B includes an RF portion consisting of a switched filter bank comprised of switches 826, 840, 842 and 844, filters 828, 830, 831, 832 and 833, and medium power RF amplifiers 834, 835 and 838. For example, if the common transmit module 204 is employed with an AIU configured for a radio function somewhere in the 1.5 to 88 MHz band, switches 826 and 840 are thrown to route the signal through low pass filter 828 and medium power amplifier 834 and then externally to the AIU. If the common transmit module 204 is employed with a different AIU, the switches are thrown to route the signal to the appropriate AIU. The purpose of this RF portion is to raise the level of the signal output that will be routed externally to the appropriate AIU in order for this signal level to be sufficiently higher than extraneous signals that may be picked up in the same path. Because signal linearity must be maintained for a wide variety of radio functions, the RF amplifiers 834, 835 and 838 must be of sufficiently high compression point power relative to the signal out of mixer 824. Multiple RF amplifiers 834, 836 and 838 are employed because present technology does not permit a single medium power amplifier to cover the entire 2–2000 MHz band, and because it is prudent to perform selected filtering prior to such amplification. If the common transmit module 204 is utilized, but not simultaneously, with multiple AIUs operating in different frequency regions, the hardware overhead for the overall system is minimal. However, for many applications a specific common transmit module will be connected only to AIUs operating in one of the subbands covered by each of the amplifiers 834, 835 and 838, and perhaps even the further subbands covered by the filters 828, 830, 831, 832 and 833. Provided the signal between the common transmit module and its AIU can be sufficiently isolated from extraneous signals, a preferred embodiment would be to place only the appropriate filter and medium power amplifier in the AIU and thereby eliminate the remaining filters and RF amplifiers as well as most or all of the switches. For example, if the common transmit module 204 is employed with an AIU configured for a radio function somewhere in the 1.5 to 88 MHz band, and switches 826, 840, 842 and 844, filters 828, 830, 831, 832 and 833, and medium power RF amplifiers 834, 835 and 838 are deleted from the common transmit module 204 and the signal out of mixer 818 is routed directly to the AIU, only the low pass filter 828 and medium power amplifier 834 need be included in the AIU. Furthermore, it is possible to fine tailor the low pass filter 828 to the radio function of the associated AIU.

With respect to FIG. 6A and FIG. 5, an alternate partitioning of circuitry between the analog submodule 500 (of the common receive module 106) and an AIU such as 104 is obvious to those of skill in the art in order to reduce overall system hardware and improve receiver performance for some applications. In some applications the common receive module 106 is used in conception with only one (or a few) AIUs, and the radio function associated with this AIU utilizes only one of the first IF filters in filter bank 508. So if the tunable L 01 504 and mixer 506 is placed in the associated AIU, it is then possible to place only the first IF filter(s) in filter bank 508 that is (are) used in conjunction with the associated AIUs, and thereby eliminate the other IF filters (and possibly the filter switches in the filter bank) for the associated application. Moreover, it is possible to fine tailor the mixer 506 as well as the IF AIU rather than design the mixer or filter to work in conjunction with different radio requirements (i.e., different AIUs). Also, if the tunable LO1 804 and mixer 824 of analog submodule 800 in FIG. 7B were also moved to the associated AIU, half-duplex radio functions could share the same tunable portion of LO1 and thereby reduce overall hardware by not requiring two such tunable portions of LO1. Although these alternate embodiments can reduce overall system hardware, and perhaps improve performance for some system applications, they are not necessarily preferred embodiments because they segregate the tunable and fixed portions of the overall synthesizers in the common receive and common transmit modules, because they require additional synthesizer control lines between the common modules and the AIUs, and because they place some of the common circuitry in noncommon AIUs and thus reduce savings due to economy of scale.

Alternate partitioning of the functional elements, for example within a channel, is also possible.

Detailed descriptions of the various modules and units, to include antenna interface units such as exemplified by 304, common receive module 106, common transmit module 104, CMP modules including black CMP module 312 and red CMP module 316, INFOSEC module 314, INFOSEC management module 318, INFOSEC Load Panel/Load Device 320, Bus Interface Unit 304, system (or CNI) controller 302, processing applique 310 as well as the details of the associated busses, discretes and other connections between these modules are primarily given for illustrative purposes, and the digitally programmable radio system invention described herein consisting of the various modules and interconnections provides an open architecture whereby any supplier can supply its own design for individual elements (modules, units, busses, etc.) as long as such elements satisfy the interface and other requirements of said elements.

The present invention can also be applied outside the traditional radio band in the areas of RADAR, electronic intelligence (ELINT) electronic surveillance measures (ESM), electronic counter measures (ECM) and other systems up to and beyond hundreds of gigahertz when appropriate frequency translation is performed in an AIU. For example, ELINT and ESM can be accommodated by scanning appropriate frequency bands and monitoring radio activity. For ECM, transponder-type functionality can be employed to receive a(n) (unfriendly) RF signal, appropriately distort the signal, and retransmit the distorted signal. Operation at virtually an RF signal frequency, for example in a radar band at 9 GHz to 10 GHz, can be accomplished via block frequency translation in the AIU as previously discussed.

What is claimed is:

1. A digitally programmable multifunctional radio comprising:

a common transmit module, internally programmably reconfigurable and self-contained for channelized operation in each of a plurality of different radio modes, for digitally processing a bit stream into a digital signal, converting the digital signal into an analog signal and frequency translating the analog signal into an RF signal;

an antenna; and an antenna interface module, coupled to said antenna and said common transmit module, for performing further processing of the RF signal and for providing the further processed RF signal to said antenna for transmission, said common transmit module and said antenna interface module being optimally partitioned such that said common transmit module includes components that are programmably reconfigurable for operation in all of the plurality of different radio modes and said antenna interface module includes only components that are dedicated for operation only in a single or relatively few of the plurality of different radio modes.

2. The digitally programmable multifunctional radio of claim 1, further comprising a memory for storing configuration data for said common transmit module, said common transmit module being internally programmably reconfigurable for channelized operation in each of the plurality of different radio modes in accordance with the stored configuration data.

3. The digitally programmable multifunctional radio of claim 1, wherein said common transmit module comprises a field programmable gate array that is internally programmably reconfigurable.

4. The digitally programmable multifunctional radio of claim 1, wherein said common transmit module includes an analog submodule and a digital submodule that are internally programmably reconfigurable.

5. The digitally programmable multifunctional radio of claim 4, wherein said digital submodule controls reconfiguration of said analog submodule.

6. The digitally programmable multifunctional radio of claim 1, further comprising a plurality of common transit modules, each internally programmably reconfigurable and self-contained for channelized operation in each of the plurality of different radio modes, for respectively digitally processing plural bit streams into plural digital signals, respectively converting the plural digital signals into plural analog signals and respectively frequency translating the plural analog signals into plural RF signals.

7. The digitally programmable multifunctional radio of claim 6, wherein said antenna interface module is coupled to said plurality of additional common transmit modules and respectively performs further processing on the plural RF signals and provides the further processed plural RF signals to said antenna for transmission.

8. The digitally programmable multifunctional radio of claim 7, wherein said antenna comprises plural antennas, coupled to said antenna interface module, for respectively transmitting the further processed RF signal and the further processed plural RF signals.

9. The digitally programmable multifunctional radio of claim 8, wherein said antenna interface module comprises a plurality of antenna interface modules, coupled to said plurality of common transmit modules, for further processing the plural RF signals and the RF signal and providing the further processed RF signal and the further processed plural RF signals to said plural antennas.

10. The digitally programmable multifunctional radio of claim 6, wherein said common transmit module and said plurality of common transmit modules operate on different channels in parallel.

11. The digitally programmable multifunctional radio of claim 6, wherein said common transmit module and said plurality of common transmit modules are identical and interchangeable as plug-in units.

12. The digitally programmable multifunctional radio of claim 6, further comprising a spare common transmit module connectable to said antenna interface module upon failure of any of said common transmit module and said plurality of common transmit modules.

13. The digitally programmable multifunctional radio of claim 6, wherein said antenna comprises plural antennas for respectively transmitting the further processed RF signal and the further processed plural RF signals, said antenna interface module including component groups for respectively performing further processing on the RF signal and the plural RF signals to provide the further processed RF signal and the further processed plural RF signals.

14. The digitally programmable multifunctional radio of claim 6, wherein said common transmit module and said plural common transmit modules are internally programmably reconfigured for operation in respective different ones of the plurality of different radio modes.

15. A digitally programmable multifunctional radio comprising:

an antenna for receiving an RF signal;

an antenna interface module, coupled to said antenna, for performing preprocessing of the RF signal; and a common receive module, coupled to said antenna interface module and internally programmably reconfigurable and self-contained for channelized operation in each of a plurality of different radio modes, for frequency translating the preprocessed RF signal into an analog signal, converting the analog signal into a digital signal and digitally processing the digital signal into a bit stream, said common receive module and said antenna interface module being optimally partitioned such that said common receive module includes components that are programmably reconfigurable for operation in all of the plurality of different radio modes and said antenna interface module includes only components that are dedicated for operation only in a single or relatively few of the plurality of different radio modes.

16. The digitally programmable multifunctional radio of claim 15, further comprising a memory for storing configuration data for said common receive module, said common receive module being internally programmably reconfigurable for channelized operation in each of the plurality of different radio modes in accordance with the stored configuration data.

17. The digitally programmable reconfigurable multifunctional radio of claim 15, wherein said common receive module comprises a field programmable gate array that is internally programmably reconfigurable.

18. The digitally programmable multifunctional radio of claim 15, wherein said common receive module includes an analog submodule and a digital submodule that are internally programmably reconfigurable.

19. The digitally programmable multifunctional radio of claim 18, wherein said digital submodule controls reconfiguration at said analog submodule.

20. The digitally programmable multifunctional radio of claim 15, wherein said antenna receives plural RF signals and said antenna interface module performs preprocessing of the plural RF signals.

21. The digitally programmable multifunctional radio of claim 20, further comprising a plurality of common receive modules, each internally programmably reconfigurable and self-contained for channelized operation in each of the plurality of different radio modes, for respectively frequency translating the preprocessed plural RF signals into plural analog signals, respectively converting the plural analog signals into plural digital signals and respectively digitally processing the plural digital signals into plural bit streams.

22. The digitally programmable multifunctional radio of claim 21, wherein said antenna comprises plural antennas for respectively receiving the RF signal and the plural RF signals.

23. The digitally programmable multifunctional radio of claim 22, wherein said antenna interface module comprises a plurality of antenna interface modules, coupled to said plural antennas, for preprocessing the RF signal and the plural RF signals and providing the preprocessed RF signal and the preprocessed plural RF signals respectively to said common receive module and said plural common receive modules.

24. The digitally programmable multifunctional radio of claim 21, wherein said common receive module and said plural common receive modules operate on different channels in parallel.

25. The digitally programmable multifunctional radio of claim 21, wherein said common receive module and said plural common receive modules are identical and interchangeable as plug-in units.

26. The digitally programmable multifunction radio of claim 21, further comprising a spare common receive module connectable to said antenna interface module upon failure of any of said common receive module and said plural common receive modules.

27. The digitally programmable multifunction radio of claim 21, wherein said common receive module and said plural common receive modules are internally programmably reconfigured for operation in respective different ones of the plurality of radio modes.

28. A digitally programmable multifunctional radio comprising:

a common transmit module, internally programmably reconfigurable and self-contained for channelized operation in each of a plurality of different radio modes, for digitally processing a first bit stream into a first digital signal, converting the first digital signal into a first analog signal and frequency translating the first analog signal into a first RF signal;

an antenna for receiving a second RF signal;

an antenna interface module, coupled to said antenna and said common transmit module, for performing further processing of the first RF signal, providing the further processed first RF signal to said antenna for transmission and performing preprocessing of the second RF signal; and a common receive module, coupled to said antenna interface module and internally programmably reconfigurable and self-contained for channelized operation in each of the plurality of different radio modes, for frequency translating the preprocessed second RF signal into a second analog signal, converting the second analog signal into a second digital signal and digitally processing the second digital signal into a second bit stream, said common transmit module, said common receive module and said antenna interface module being optimally partitioned such that said common transmit module and said common receive module include components that are programmably reconfigurable for operation in all of the plurality of different radio modes and said antenna interface module includes only components that are dedicated for operation only in a single or relatively few of the plurality of different radio modes.

\* \* \* \* \*